US008660084B2

(12) United States Patent
Noh et al.

(10) Patent No.: US 8,660,084 B2
(45) Date of Patent: Feb. 25, 2014

(54) METHOD AND APPARATUS FOR TRANSMITTING REFERENCE SIGNAL IN WIRELESS COMMUNICATION SYSTEM

(75) Inventors: Min Seok Noh, Anyang-si (KR); Han Gyu Cho, Anyang-si (KR); Jae Hoon Chung, Anyang-si (KR); Moon Il Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 13/259,122

(22) PCT Filed: Apr. 9, 2010

(86) PCT No.: PCT/KR2010/002208

§ 371 (c)(1),
(2), (4) Date: Sep. 22, 2011

(87) PCT Pub. No.: WO2010/117240

PCT Pub. Date: Oct. 14, 2010

(65) Prior Publication Data

US 2012/0020323 A1 Jan. 26, 2012

Related U.S. Application Data

(60) Provisional application No. 61/168,229, filed on Apr. 10, 2009, provisional application No. 61/168,943, filed on Apr. 14, 2009, provisional application No. 61/236,889, filed on Aug. 26, 2009, provisional application No. 61/248,330, filed on Oct. 2, 2009.

(51) Int. Cl.
*H04W 72/04* (2009.01)

(52) U.S. Cl.
USPC .......... 370/330

(58) Field of Classification Search
USPC ......... 370/319–321, 328–330, 335–336, 342; 455/101, 436, 450, 509; 375/260
See application file for complete search history.

(56) References Cited

U.S. PATENT DOCUMENTS

| | | | | |
|---|---|---|---|---|
| 7,990,920 | B2 * | 8/2011 | Zhang et al. | 370/329 |
| 8,503,375 | B2 * | 8/2013 | Malladi et al. | 370/329 |
| 2008/0080476 | A1 | 4/2008 | Cho et al. | |
| 2008/0318608 | A1 * | 12/2008 | Inoue et al. | 455/509 |
| 2009/0088148 | A1 | 4/2009 | Chung et al. | |
| 2009/0201863 | A1 * | 8/2009 | Pi | 370/329 |
| 2010/0041350 | A1 * | 2/2010 | Zhang et al. | 455/101 |
| 2010/0167743 | A1 * | 7/2010 | Palanki et al. | 455/436 |
| 2010/0189038 | A1 * | 7/2010 | Chen et al. | 370/328 |
| 2010/0195748 | A1 * | 8/2010 | Nam et al. | 375/260 |
| 2010/0238877 | A1 * | 9/2010 | Nam et al. | 370/329 |
| 2013/0178221 | A1 * | 7/2013 | Jung et al. | 455/450 |

FOREIGN PATENT DOCUMENTS

KR 10-2006-0038305 5/2006

* cited by examiner

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

A method and apparatus of transmitting a reference signal in a wireless communication system is provided. Demodulation Reference Signals (DMRSs) for a plurality of respective antennas is generated. The DMRSs are mapped to a resource region, and transmitted through the respective corresponding antennas. The DMRSs are multiplexed using at least one of frequency division multiplexing (FDM), code division multiplexing (CDM), and time division multiplexing (TDM) methods and mapped in the resource region. Also, a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped.

12 Claims, 90 Drawing Sheets

Antenna 0

Fig. 15

| | | | | | | | | | | | | | |
|---|---|---|---|---|---|---|---|---|---|---|---|---|---|
| | | | | | | | | | | | | | |
| | | | | | | 1/2 | | | | | | 1/2 | |
| R1 | R3 | | | R0 | | | R1 | R2 | | | R0 | | |
| | | | 1/2 | | | | | | 1/2 | | | | |
| | | | | | | | | | | | | | |
| R0 | R2 | | | R1 | | 1/2 | R0 | R3 | | | R1 | 1/2 | |
| | | | | | | | | | | | | | |
| | | | 1/2 | | | | | | 1/2 | | | | |
| R1 | R3 | | | R0 | | | R1 | R2 | | | R0 | | |
| | | | | | | 1/2 | | | | | | 1/2 | |
| | | | | | | | | | | | | | |
| R0 | R2 | | 1/2 | R1 | | | R0 | R3 | 1/2 | | R1 | | |

Fig. 17

| | | | | | | | | | | | |
|---|---|---|---|---|---|---|---|---|---|---|---|
| | | | | | | | 1/2 | | | | |
| | | | | | | | | | | | |
| R1 | R3 | | R0 | 1/2 | | R1 | R2 | | R0 | 1/2 | |
| | | | | | | | 1/2 | | | | |
| | | | | | | | | | | | |
| R0 | R2 | | R1 | 1/2 | | R0 | R3 | | R1 | 1/2 | |
| | | | | | | | 1/2 | | | | |
| | | | | | | | | | | | |
| R1 | R3 | | R0 | 1/2 | | R1 | R2 | | R0 | 1/2 | |
| | | | | | | | 1/2 | | | | |
| | | | | | | | | | | | |
| R0 | R2 | | R1 | 1/2 | | R0 | R3 | | R1 | 1/2 | |

(b)

(a)

(c)

(a) (b) (c) (d)

(a) (b) (c) (d)

(a) (b) (c) (d)

(b)

(a)

(a) (b) (c) (d)

(b)

(a)

(b)

(a)

(a) (b) (c) (d)

(a) (b) (c) (d)

(a) (b) (c) (d)

(a) (b) (c) (d)

(b)

(a)

(a) (b) (c) (d)

(a) (b) (c) (d)

(a)

(b)

(c)

(d)

METHOD AND APPARATUS FOR TRANSMITTING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/002208, filed on Apr. 9, 2010, which claims the benefit of U.S. Provisional Application Ser. Nos. 61/168,229, filed on Apr. 10, 2009, 61/168,943, filed on Apr. 14, 2009, 61/236,889, filed on Aug. 26, 2009, and 61/248,330, filed on Oct. 2, 2009, the contents of which are hereby incorporated by reference herein in their entirety.

TECHNICAL FIELD

The present invention relates to wireless communication, and more particularly, to a method and apparatus for transmitting a reference signal in a wireless communication system.

BACKGROUND ART

The next-generation multimedia wireless communication systems which are recently being actively researched are required to process and transmit various pieces of information, such as video and wireless data as well as the initial voice-centered services. The 4$^{th}$ generation wireless communication systems which are now being developed subsequently to the 3$^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on.

An OFDM system is being considered after the 3$^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system.

MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a resource element used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in $y=h\cdot p+n$. Here, since the receiver already knows the reference signal p, it can estimate a channel information value $\hat{h}$ using Equation 1 in the case in which a Least Square (LS) method is used.

$$\hat{h}=y/p=h+n/p=h+\hat{n} \quad \text{[Math.1]}$$

The accuracy of the channel estimation value $\hat{h}$ estimated using the reference signal p is determined by the value $\hat{n}$ To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

A reference signal includes a UE-specific reference signal which is specific to a User Equipment (UE). The UE-specific reference signal can be used for data demodulation. Meanwhile, Long Term Evolution (LTE) rel-9 system and LTE-A systems support dual layer beam-forming. The LTE-A system is configured to support up to 8 transmission antennas and to improve the throughput. Accordingly, there is a need for a pattern of a UE-specific reference signal for supporting the systems.

SUMMARY OF INVENTION

Technical Problem

The present invention provides a method and apparatus for transmitting a reference signal in a wireless communication system.

Solution to Problem

In an aspect, A method of transmitting a reference signal in a wireless communication system is provided. The method include generating Demodulation Reference Signals (DMRSs) for a plurality of respective antennas, mapping the DMRSs to a resource region, and transmitting the mapped DMRSs through the respective corresponding antennas, wherein the DMRSs are multiplexed using at least one of frequency division multiplexing (FDM), code division multiplexing (CDM), and time division multiplexing (TDM) methods and mapped in the resource region, and a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped. A number of the plurality of antennas may be 2 or 8. Part of or all the DMRSs may be multiplexed using the CDM method and mapped in a neighbor OFDM symbol within a same subcarrier. a number of the neighbor OFDM symbols may be 2, and the neighbor OFDM symbols may be multiplexed using the CDM method on a basis of an orthogonal sequence having a length of 2. Part of or all the DMRSs may be multiplexed using the CDM method and mapped in a neighbor subcarrier within an OFDM symbol. A number of the neighbor subcarriers may be 2, and the neighbor subcarriers may be multiplexed using the CDM method on a basis of an orthogonal sequence having a length of 2. Part or all the DMRSs may be mapped to a resource element to which a legacy dedicated reference signal (DRS) is mapped in the resource region. The DMRSs may be mapped at intervals of regular subcarriers within an OFDM symbol to which the DMRSs are mapped.

In another aspect, a Base Station (BS) in a wireless communication system is provided. The BS include a DMRS generating unit for generating DMRSs for a plurality of respective antennas, a DMRS mapper for mapping the DMRSs to a resource region, and an RF unit for sending the DMRSs and a radio signal through the plurality of antennas, wherein the DMRSs are multiplexed using at least one of frequency division multiplexing (FDM), code division multiplexing (CDM), and time division multiplexing (TDM) methods and mapped in the resource region, and a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped. A number of the plurality of antennas may be 2 or 8. Part of or all the DMRSs may be multiplexed using the CDM method and mapped in a neighbor OFDM symbol within a same subcarrier. Part of or all the DMRSs may be multiplexed using the CDM method and mapped in a neighbor subcarrier within an OFDM symbol.

In another aspect, a user equipment (UE) in a wireless communication system is provided. The UE include a receive circuitry for receiving a radio signal and a plurality of DMRSs, and a processor for demodulating the radio signal on a basis of the plurality of DMRSs, wherein the plurality of DMRSs is multiplexed using at least one of frequency division multiplexing (FDM), code division multiplexing (CDM), and time division multiplexing (TDM) methods and mapped in the resource region, and a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped. Part of or all the DMRSs may be multiplexed using the CDM method and mapped in a neighbor OFDM symbol within a same subcarrier. Part of or all the DMRSs may be multiplexed using the CDM method and mapped in a neighbor subcarrier within a same OFDM symbol.

Advantageous Effects of Invention

In accordance with the present invention, there are provided patterns of Demodulation Reference Signals (DMRSs) which support dual layer beam-forming of an LTE rel-9 system and eight transmission antennas of an LTE-A system. Accordingly, data can be efficiently demodulated.

BRIEF DESCRIPTION OF DRAWINGS

FIGS. 12 to 28 show examples of DMRS patterns according to the proposed method of transmitting a reference signal.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
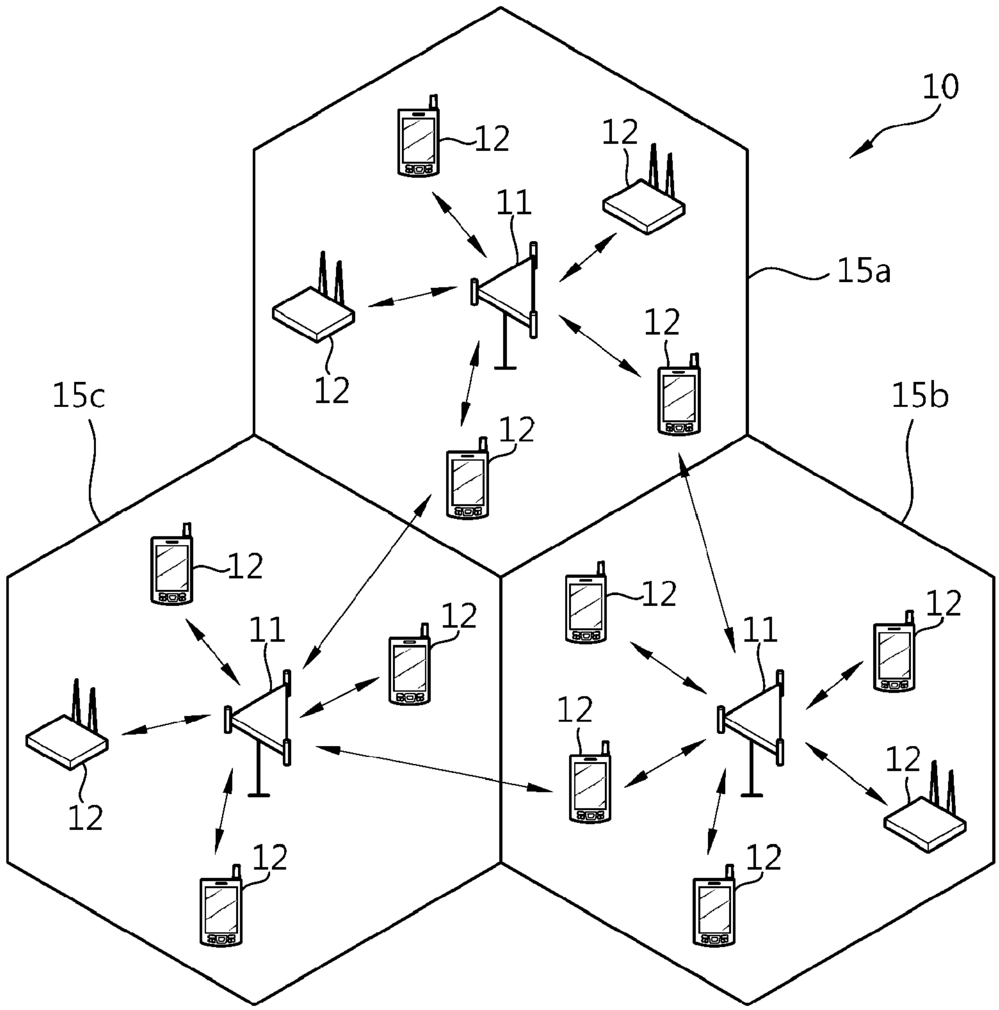
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15*a*, 15*b*, and 15*c*. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
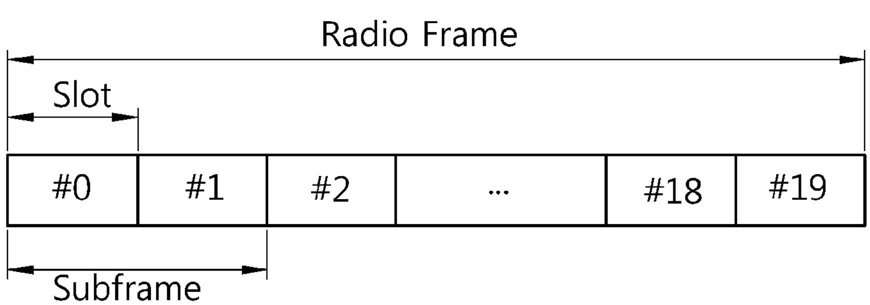
FIG. 2 shows the structure of a radio frame in the 3GPP LTE specifications.

FIG. 2 shows the structure of a radio frame in the 3GPP LTE specifications. For the radio frame structure, reference can be made to Paragraph 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 2, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 3:
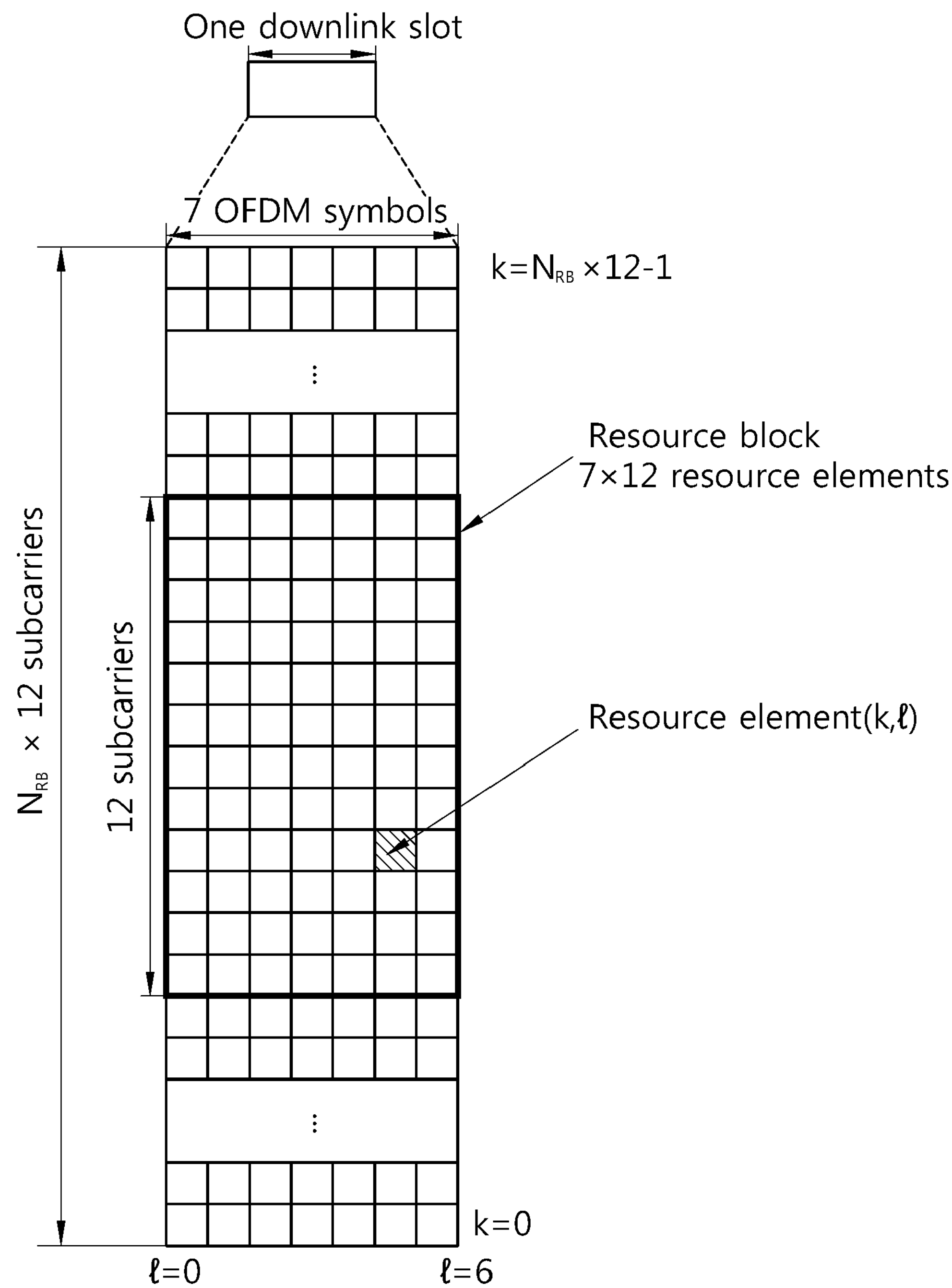
FIG. 3 shows an example of a resource grid for one downlink slot.

FIG. 3 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, k ($k=0, \ldots, N_{RB}\times 12-1$) denotes a subcarrier index in the frequency domain, and l ($l=0, \ldots, 6$) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 4:
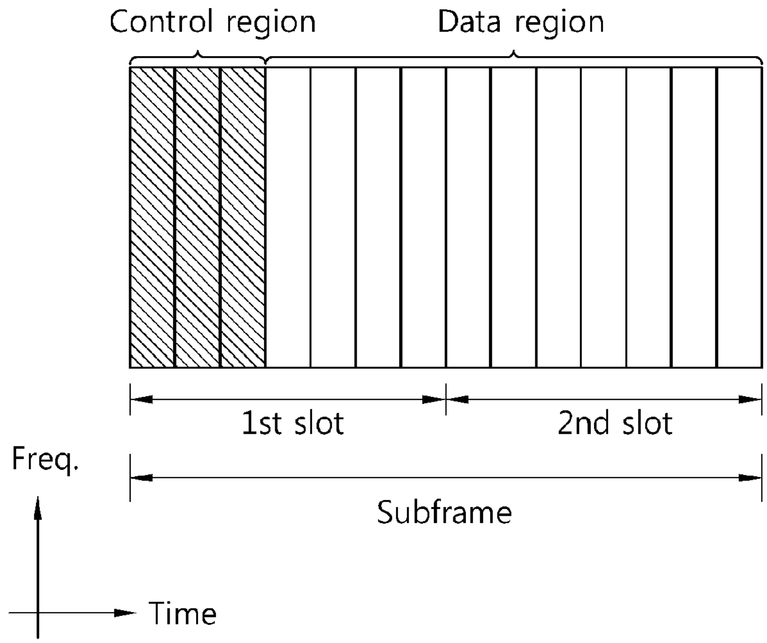
FIG. 4 shows the structure of a downlink sub-frame.

FIG. 4 shows the structure of a downlink sub-frame.

The downlink sub-frame includes two slots in the time domain. Each of the slots includes 7 OFDM symbols in the normal CP. A maximum of three OFDM symbols of the first slot within the sub-frame correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a sub-frame carries information about the number of OFDM symbols (that is, the size of a control region) which is used to transmit control channels within the sub-frame. The PHICH carries an Acknowledgement (ACK)/Not-Acknowledgement (NACK) signal for an uplink Hybrid Automatic Repeat Request (HARQ). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 5:
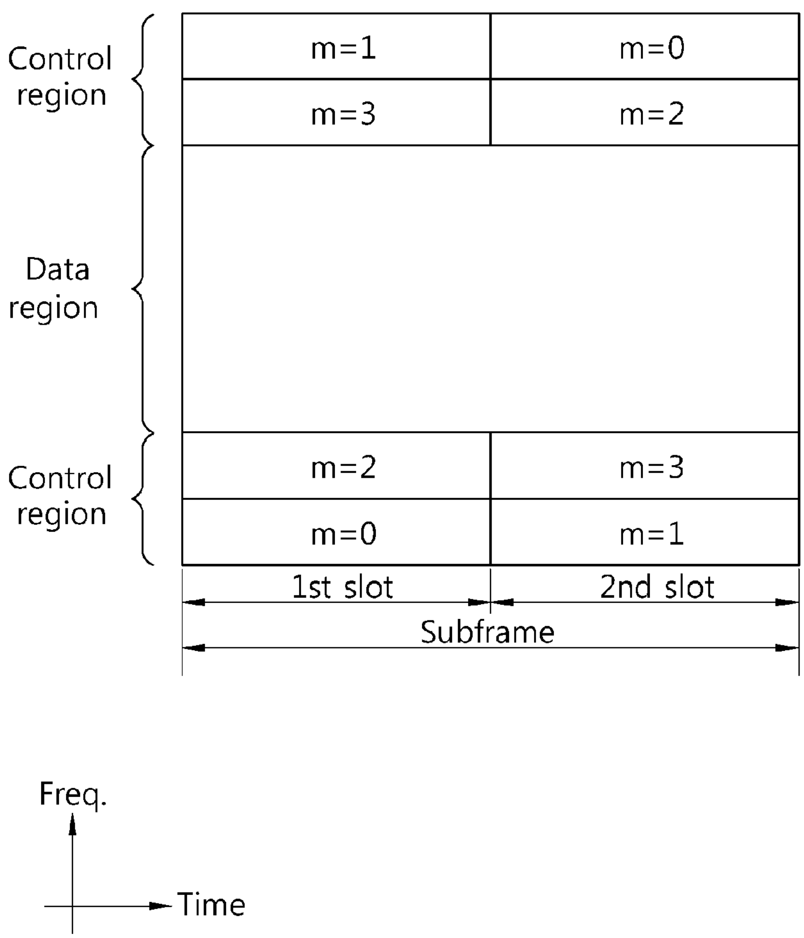
FIG. 5 shows the structure of an uplink sub-frame.

FIG. 5 shows the structure of an uplink sub-frame.

The uplink sub-frame can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a sub-frame and are then allocated. The RBs included in the RB pair occupy different subcarriers of respective slots. It is said that a RB pair allocated to a PUCCH is frequency-hopped at the slot boundary.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell. The UE-specific reference signal is chiefly used by a specific UE or a specific UE group for the purpose of data demodulation.

Figure 6:
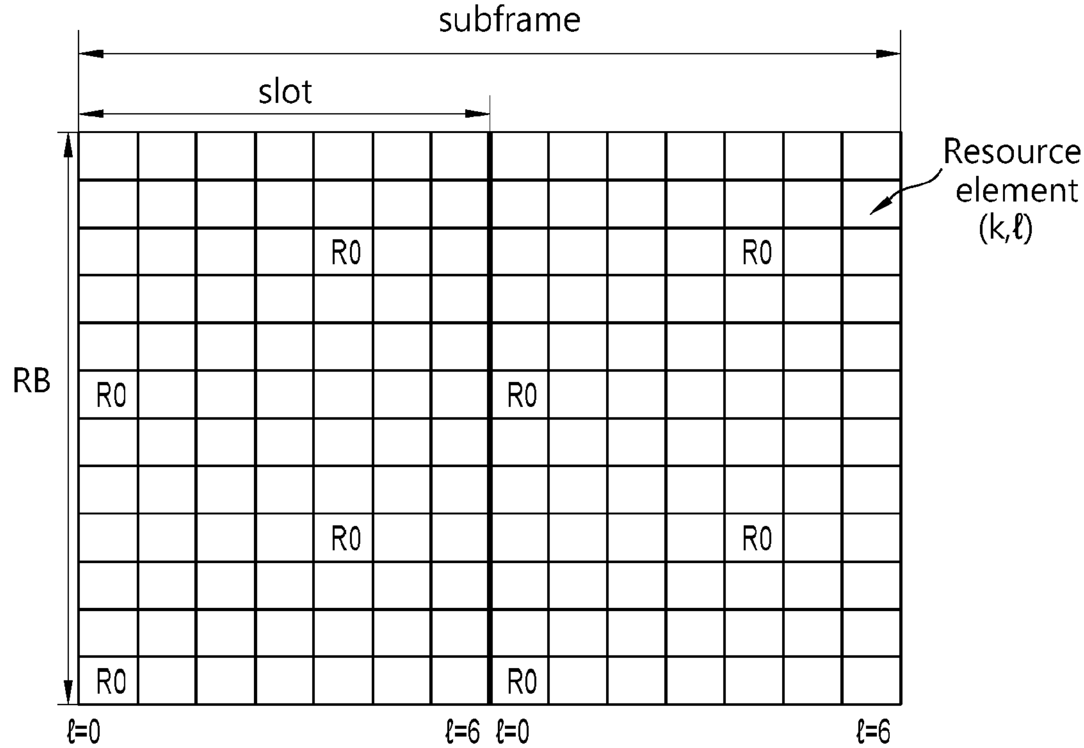
FIG. 6 shows an exemplary CRS structure when a BS uses one antenna.
Figure 7:
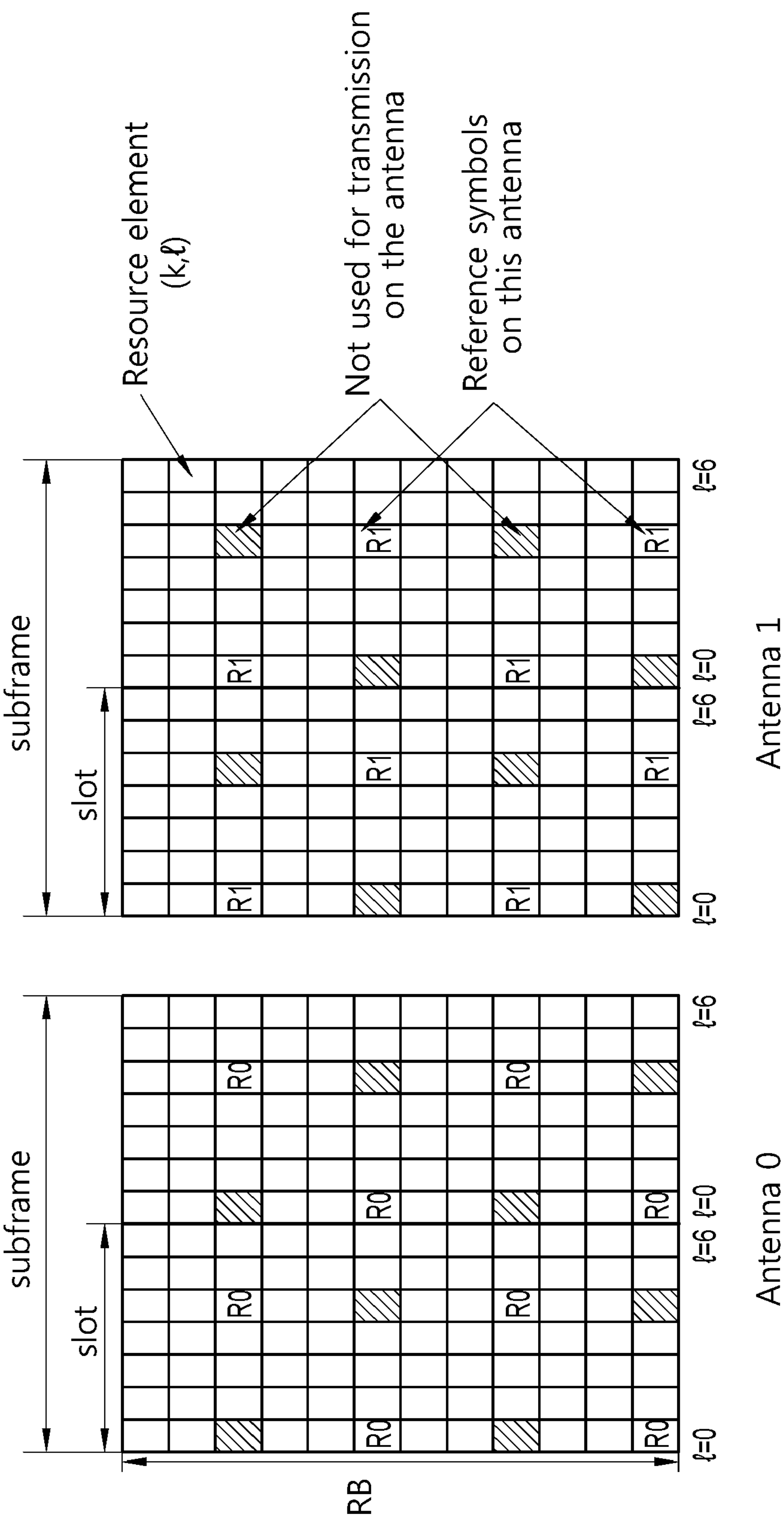
FIG. 7 shows an exemplary CRS structure when a BS uses two antennas.
Figure 8:
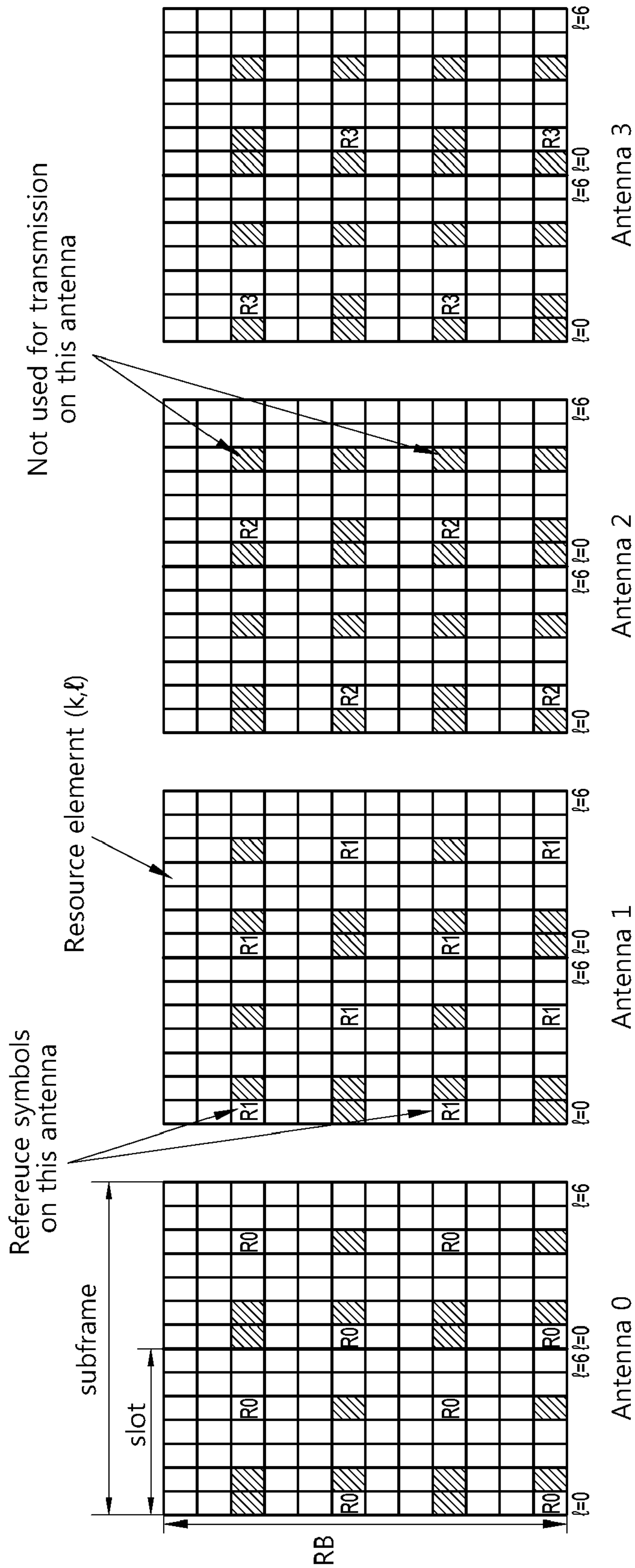
FIG. 8 shows an exemplary CRS structure when a BS uses four antennas.

FIG. 6 shows an exemplary CRS structure when a BS uses one antenna. FIG. 7 shows an exemplary CRS structure when a BS uses two antennas. FIG. 8 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc.

Referring to FIG. 6 to FIG. 8, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index t, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is 2($N_{RB}$. Therefore, a length of the CRS sequence is 2($N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m + 1)) \quad \text{[Math. 2]}$$

Herein, m is 0, 1, . . . , $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 2 shows an example of a gold sequence c(n).

$$c(n)=(x_1(n+N_C)+x_2(n+N_C))\bmod 2$$

$$x_1(n+31)=(x_1(n+3)+x_1(n))\bmod 2$$

$$x_2(n+31)=x_2(n+3)+x_2(n+2)+x_2(n+1)+x_2(n))\bmod 2 \quad \text{[Math.3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of 2($N_{RB}$ can be selected from an RS sequence generated in a length of 2($N_{RB,max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE.

A Dedicated Cell-specific Reference Signal (hereinafter referred to as a DRS) is described below.

Figure 9:
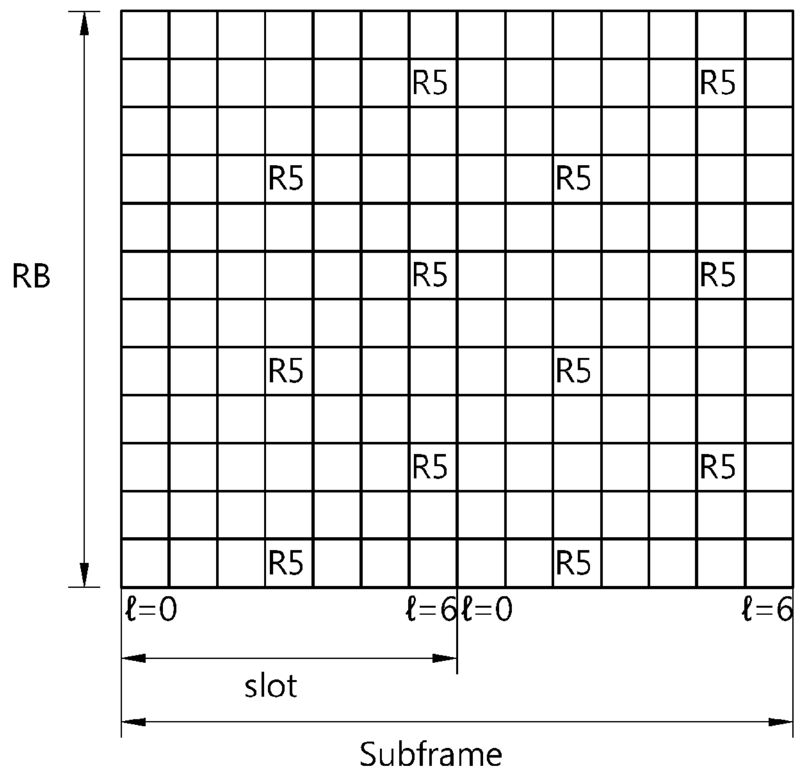
FIGS. 9 and 10 show examples of a DRS structure.
Figure 10:
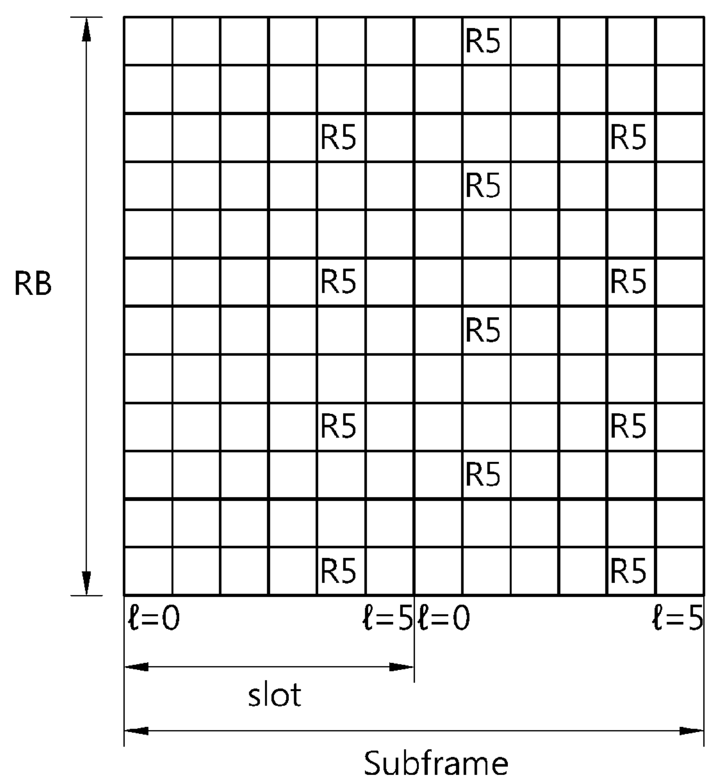

FIGS. 9 and 10 show examples of a DRS structure. FIG. 9 shows an example of the DRS structure in the normal CP (Cyclic Prefix). In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 10 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12\times N_{RB}^{PDSCH}$. Accordingly, the length of the DRS sequence is $12\times N_{RB}^{PDSCH}-1$. In the case in which DRS sequences are generated using Equation 2, m is 0, 1, . . . , $12N_{RB}^{PDSCH}-1$. The DRS sequences are sequentially mapped to reference symbols. The DRS sequence is first mapped to the reference symbol and then to a next OFDM symbol, in ascending powers of a subcarrier index in one OFDM symbol.

In the LTE-A system, a DRS can be use in PDSCH demodulation. Here, a PDSCH and a DRS can comply with the same precoding operation. The DRS can be transmitted only in a resource block or layer scheduled by a Base Station (BS), and orthogonality is maintained between layers.

Further, a Cell-specific Reference Signal (CRS) can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In the LTE rel-8 system, a DRS can support single layer beam-forming, and a DRS can also be used for the purpose of single layer beam-forming. An LTE rel-9 system and an LTE-A system are configured to support dual layer beam-forming. Accordingly, there is a need for the structure of a DRS for supporting dual layer beam-forming. Hereinafter, the DRS of an LTE rel-9 system and an LTE-A systems is referred to as a DMRS (Demodulation Reference Signal). Further, the LTE-A system is configured to improve the throughput by supporting up to eight transmission antennas, and so there is a need for a structure of the DMRS for supporting the eight transmission antennas.

Figure 11:
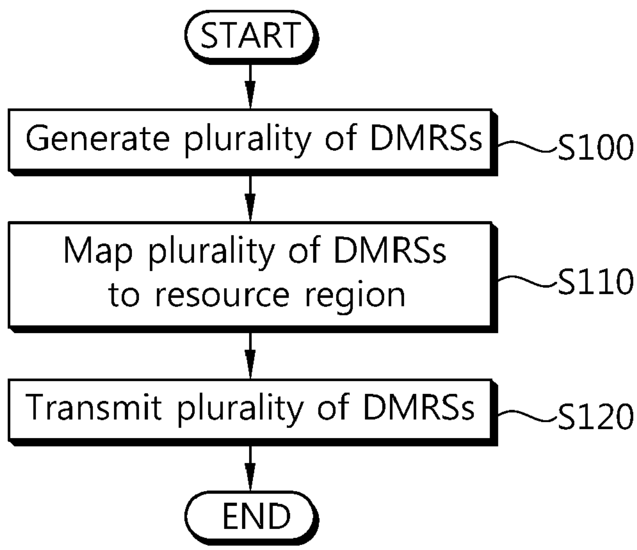
FIG. 11 illustrates an embodiment of a proposed method of transmitting a reference signal.

FIG. 11 illustrates an embodiment of a proposed method of transmitting a reference signal.

At step S100, a BS generates DMRSs for a plurality of respective antennas. At step S110, the BS maps the DMRSs to a resource region on the basis of a specific DMRS pattern. At step S120, the BS transmits the mapped DMRSs through respective corresponding antennas. The DMRS can be multiplexed on the basis of at least one of frequency division multiplexing (FDM), code division multiplexing (CDM), and time division multiplexing (TDM) methods in the resource region and mapped. Further, in the resource region, the positions of an orthogonal frequency division multiplexing (OFDM) symbol to which the DMRSs are respectively mapped can be OFDM symbols to which a physical downlink control channel (PDCCH) and a legacy CRS (Cell-specific Reference Signal) are not mapped.

Hereinafter, a DMRS pattern to which DMRSs are mapped is described as an example. In an LTE-A system, any one of DMRS patterns to be described later can be used according to an MIMO mode, the number of layers, and so on. The present invention can be applied to the MIMO mode using eight transmission antennas in downlink, but the DMRS patterns according to the proposed method of transmitting a reference signal can be applied to beam-forming, transmission of a Coordinated Multi-Point (CoMP), and uplink. In particular, in a rank 1 and a rank 2, the DMRS patterns can be used as DMRS patterns for dual layer beam-forming supported in the LTE rel-9 system.

A DMRS pattern which uses a DRS pattern supporting single layer beam-forming of an LTE rel-8 system without change is first described. By using the DRS of an LTE rel-8 system without change, backward compatibility with the LTE rel-8 system can be maintained, dual layer beam-forming of an LTE rel-9 system and an LTE-A system can be supported, and forward compatibility between an LTE rel-9 system and an LTE-A system can be maintained. In all the DMRS patterns described hereinafter, R0, R1, R2, and R3 indicate respective positions in which cell-specific reference signals are mapped to four transmission antennas of an LTE rel-8 system. Further, '1' indicates a position to which the DMRS of a first rank (or a first layer) (hereinafter, a first DMRS) is mapped, and '2' indicates a position to which the DMRS of a second rank (or a second layer) (hereinafter, a second DMRS) is mapped. However, the positions to which the DMRSs are mapped can be exchanged between the ranks.

The first DMRS and the second DMRS can be multiplexed through a variety of methods, such as FDM, CDM, and FDM/CDM hybrid methods. In examples described hereinafter, in the case in which a plurality of rank indices is represented in one resource element, it means that the DMRSs of corresponding ranks are multiplexed through the CDM method. In the case in which the DMRSs are multiplexed through the CDM method, an orthogonal sequence needs to be used as a DMRS sequence. Various kinds of sequences, such as Walsh codes, DFT coefficients, and CAZAC sequences, can be used as the orthogonal sequences. For example, a Walsh code (having a length of 2 or 4), a DFT matrix (having a length of 2 to 4), or a CAZAC sequence (having a length of N) can be used as the orthogonal sequence depending on the number of OFDM symbols to which DMRSs are mapped (but when the number of OFDM symbols is 2 or more). If the number of OFDM symbols to which DMRSs are mapped is 1, a CAZAC sequence having a length of 12 can be used as the orthogonal sequence in the frequency domain.

Figure 12:
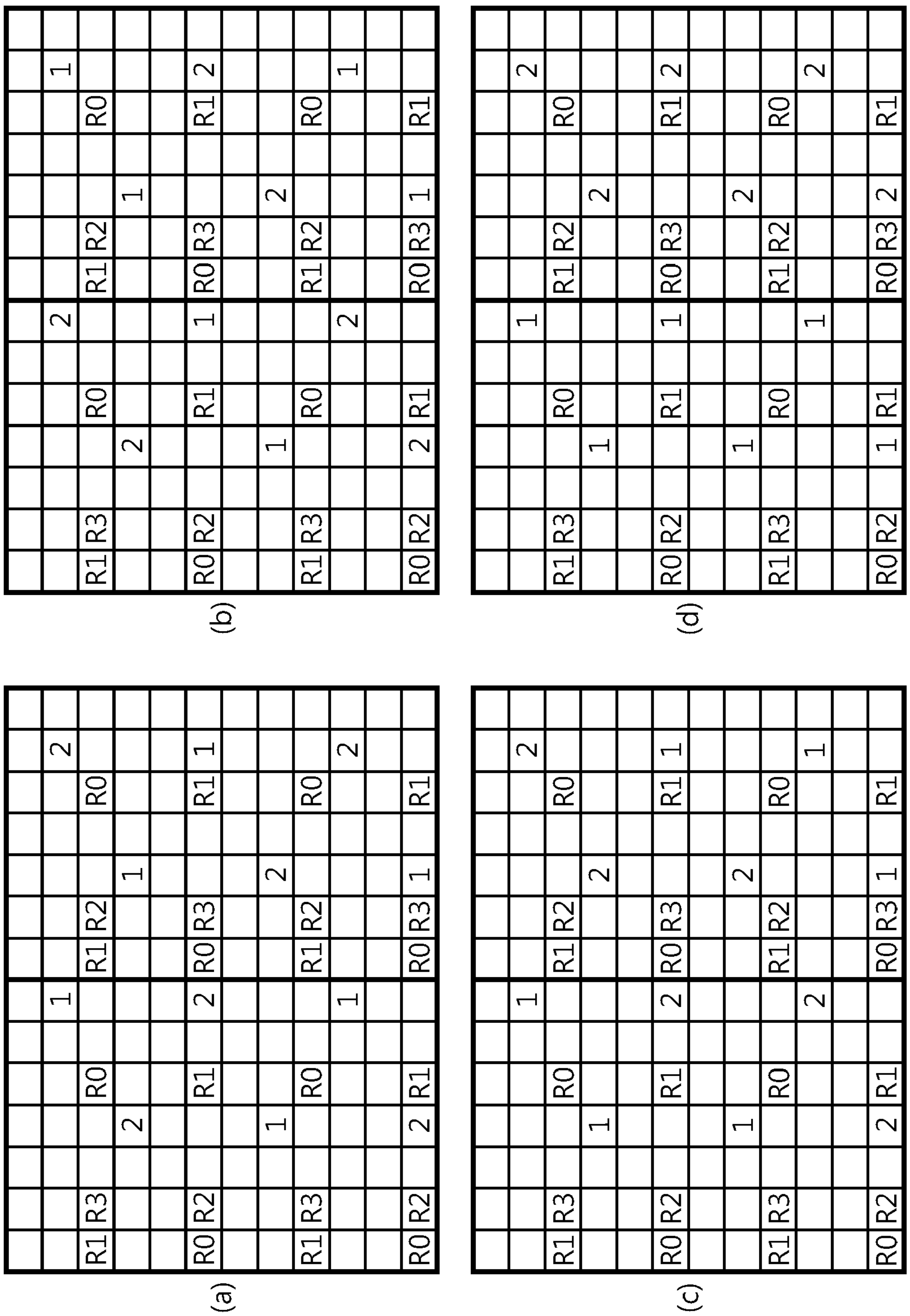
Figure 13:
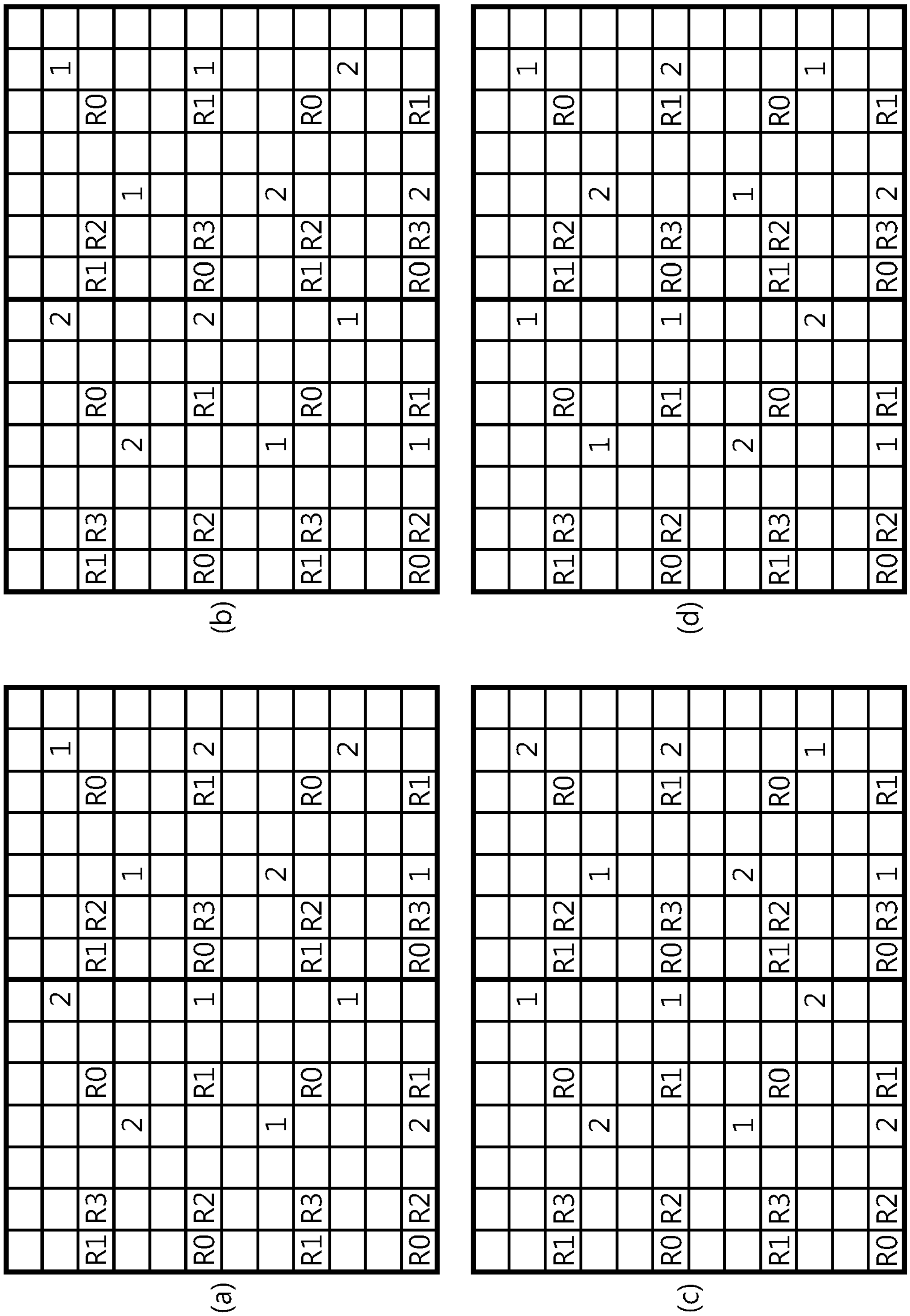
Figure 14:
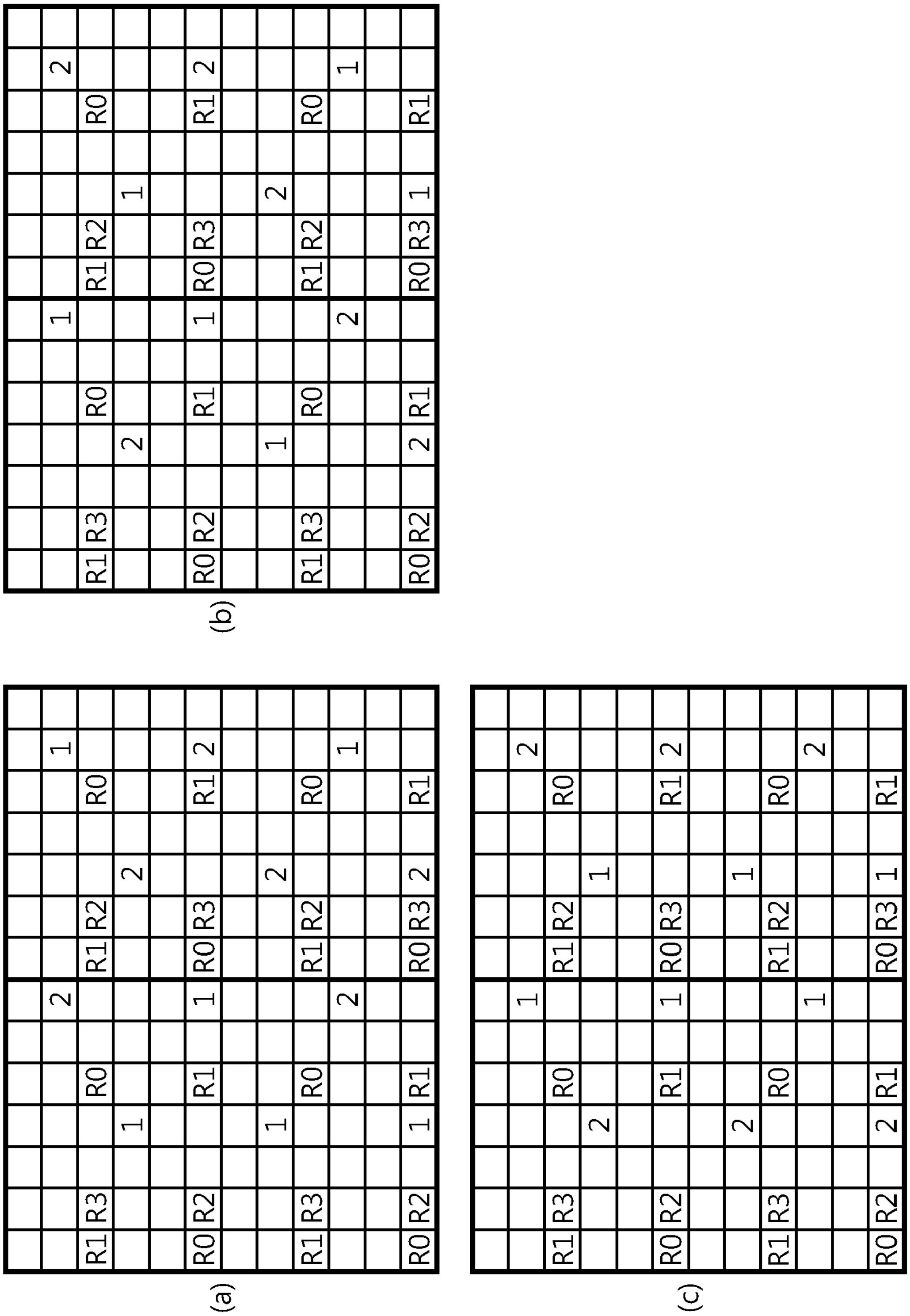

FIGS. 12 to 14 show examples of DMRS patterns according to the proposed method of transmitting a reference signal. FIGS. 12 to 14 illustrate the cases in which the normal CP, a first DMRS and a second DMRS are multiplexed through the FDM method. Positions in which the first DMRS and the second DMRS are transmitted are the same as those of the resource elements R5 in which the DRSs of an LTE rel-8 system are transmitted in FIG. 9. One resource block can include the same number of the first DMRS and the second DMRS, or the first DMRS can be mapped to a first slot and the second DMRS can be mapped to a second slot for every subframe.

FIG. 15 shows another example of a DMRS pattern according to the proposed method of transmitting a reference signal. FIG. 15 shows a case in which in the normal CP, a first DMRS and a second DMRS are multiplexed through the CDM method. Positions in which the first DMRS and the second DMRS are transmitted are the same as those of the resource elements R5 in which the DRSs of the LTE rel-8 system are transmitted in FIG. 9. In each of the resource elements to which the DMRS is mapped, each of the first DMRS and the second DMRS is multiplexed through the CDM method.

Figure 16:
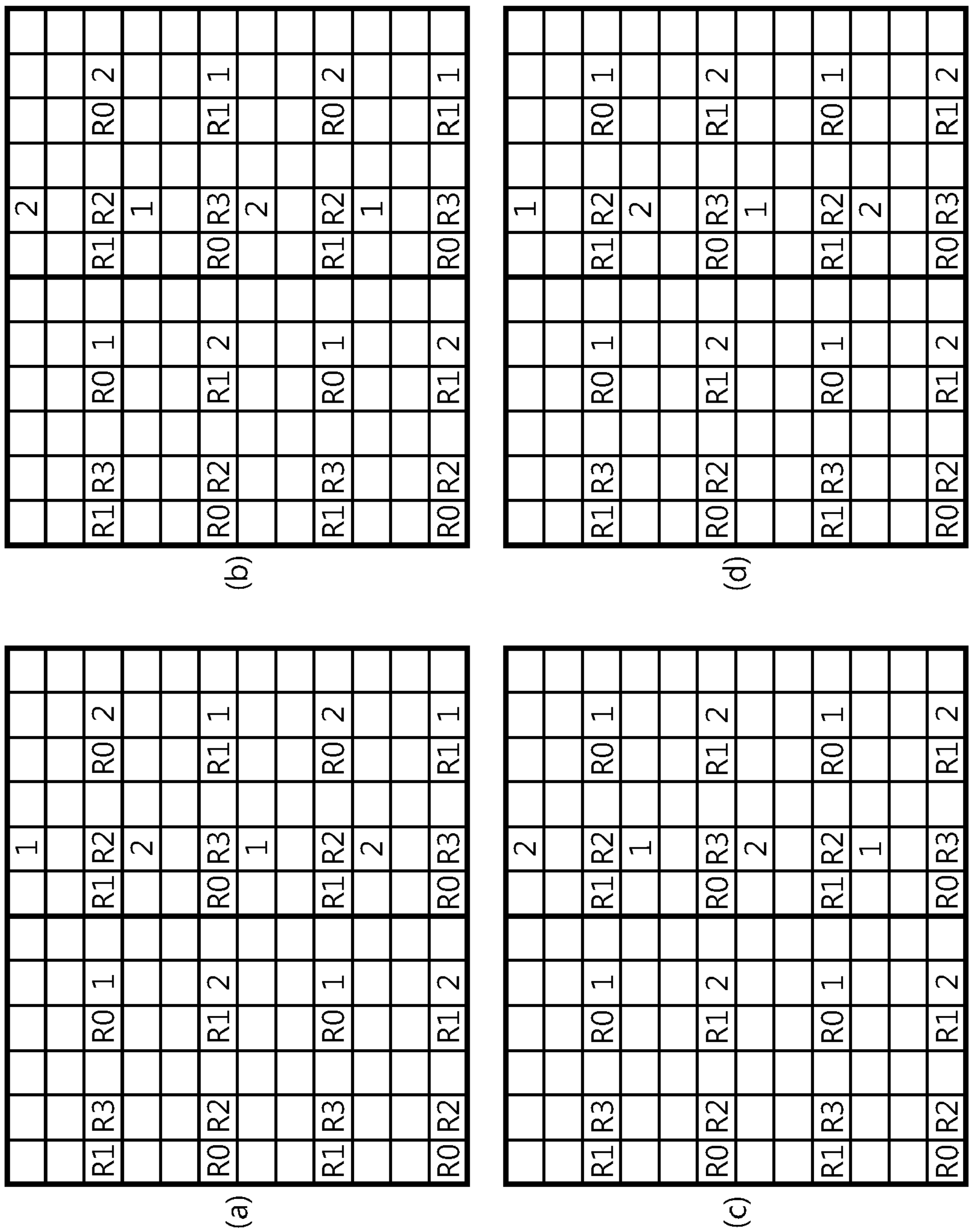

FIG. 16 shows another example of DMRS patterns according to the proposed method of transmitting a reference signal. FIG. 16 illustrates the case in which in the extended CP, a first DMRS and a second DMRS are multiplexed through the FDM method. Positions in which the first DMRS and the second DMRS are transmitted are the same as those of the resource elements R5 in which the DRSs of the LTE rel-8 system are transmitted in FIG. 10.

FIG. 17 shows another example of a DMRS pattern according to the proposed method of transmitting a reference signal. FIG. 17 illustrates the case in which in the extended CP, a first DMRS and a second DMRS are multiplexed through the CDM method. Positions in which the first DMRS and the second DMRS are transmitted are the same as those of the resource elements R5 in which the DRSs of the LTE rel-8 system are transmitted in FIG. 10. In each of the resource elements to which the DMRSs are mapped, each of the first DMRS and the second DMRS is multiplexed through the CDM method.

DMRSs of a third rank to an eighth rank (hereinafter referred to as a third DMRS to an eighth DMRS, respectively) can be additionally mapped to the DMRS patterns described with reference to FIGS. 12 to 17. The third DMRS to the eighth DMRS, additionally mapped to the first DMRS and the second DMRS shown in FIGS. 12 to 17, can be multiplexed through the TDM method. Further, each of the third DMRS to the eighth DMRS can be multiplexed through the CDM or FDM/CDM hybrid method. In examples described hereinafter, in the case in which a plurality of rank indices is represented in one resource element, it means that the DMRSs of corresponding ranks are multiplexed through the CDM method. In the case in which the DMRSs are multiplexed through the CDM method, an orthogonal sequence needs to be used as a DMRS sequence. Various kinds of sequences, such as Walsh codes, DFT coefficients, and CAZAC sequences, can be used as the orthogonal sequences. For example, a Walsh code (having a length of 2 or 4), a DFT matrix (having a length of 2 to 4), or a CAZAC sequence (having a length of N) can be used as the orthogonal sequence depending on the number of OFDM symbols to which DMRSs are mapped (but when the number of OFDM symbols is 2 or more). If the number of OFDM symbols to which DMRSs are mapped is 1, a CAZAC sequence having a length of 12 can be used as the orthogonal sequence in the frequency domain.

Figure 18:
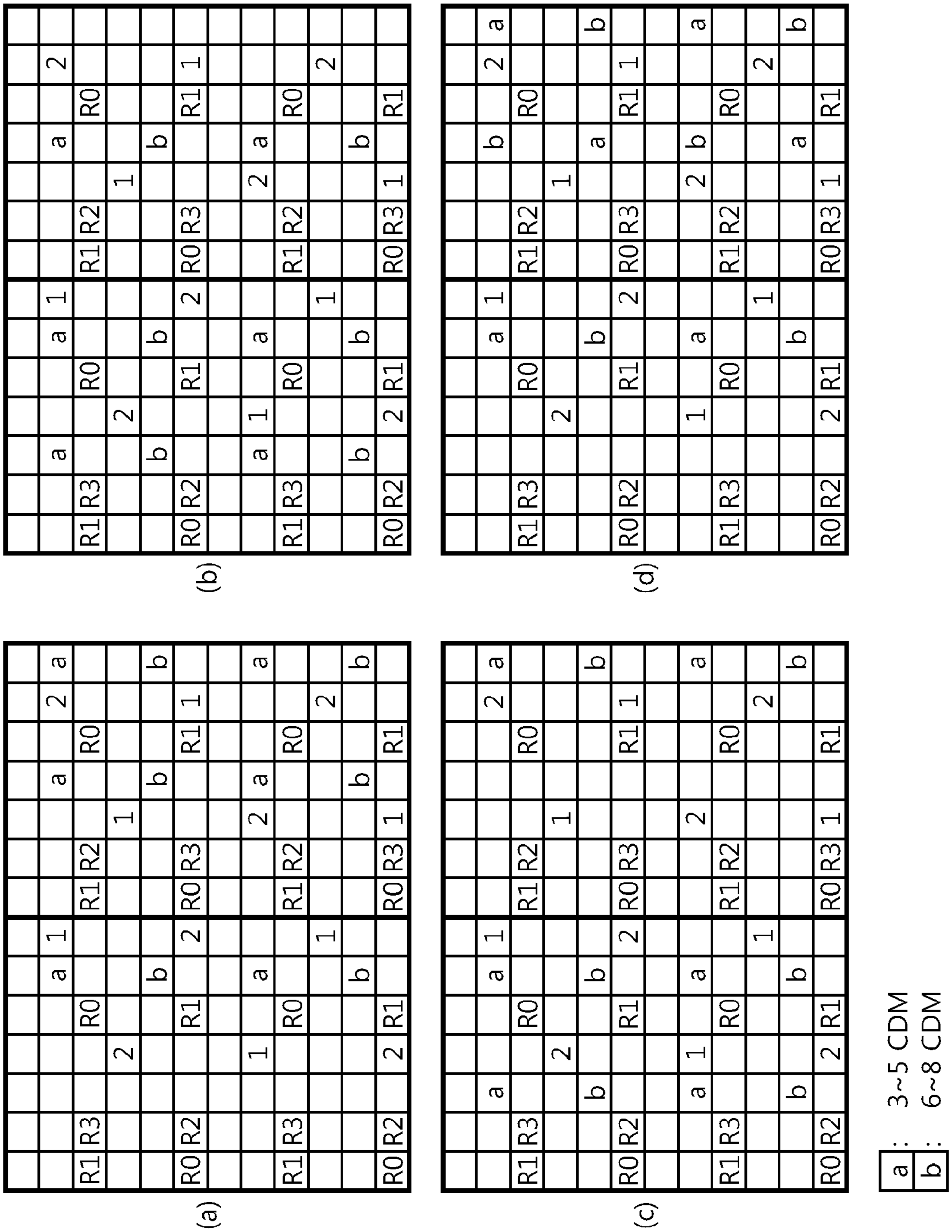
Figure 19:
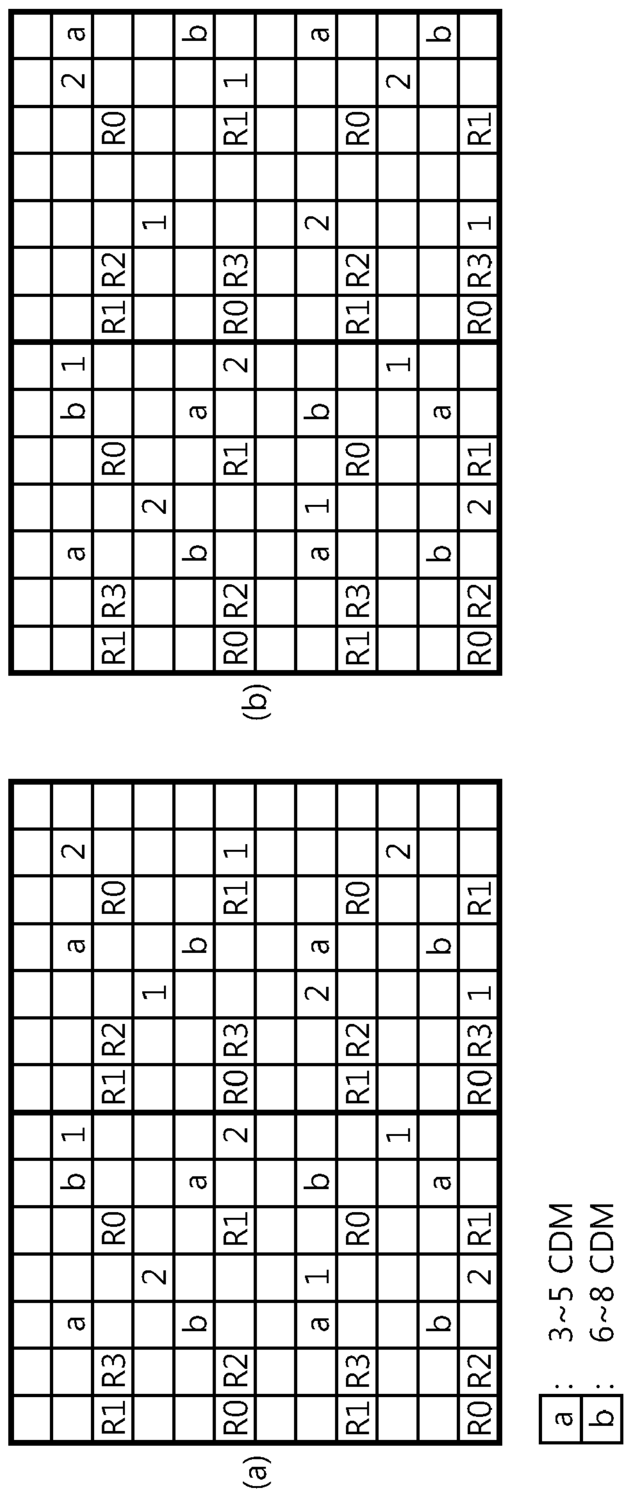

FIGS. 18 and 19 show another example of DMRS patterns according to the proposed method of transmitting a reference signal. FIGS. 18 and 19 illustrate the cases in which in the normal CP, a third DMRS to an eighth DMRS are multiplexed through the FDM/CDM hybrid method and mapped over three OFDM symbols. Positions in which a first DMRS and a second DMRS are transmitted are the same as those of the resource elements R5 in which the DRSs of the LTE rel-8 system are transmitted in FIG. 9. The third DMRS to the eighth DMRS are mapped over three OFDM symbols and can be mapped to three OFDM symbols of the third, sixth, eleventh, and fourteenth OFDM symbols (having respective indices 2, 5, 10, and 13) of a subframe. Six antennas are divided into two groups 3~5 and 6~8 each including three antennas, each of the groups is multiplexed through the CDM method, and the DMRSs of each group are mapped at intervals of 6 subcarriers within one OFDM symbol. Positions of the subcarriers to which the third DMRS to the eighth DMRS can be mapped can be second, fifth, eighth, and eleventh subcarriers (having respective indices 1, 4, 7, and 10). However, the present invention is not limited to the above example. For example, the third DMRS to the eighth DMRS can be mapped to first, fourth, seventh, and tenth subcarriers (having respective indices 0, 3, 6, and 9) or to third, sixth, ninth, and twelfth subcarriers (having respective indices 2, 5, 8, and 11).

Figure 20:
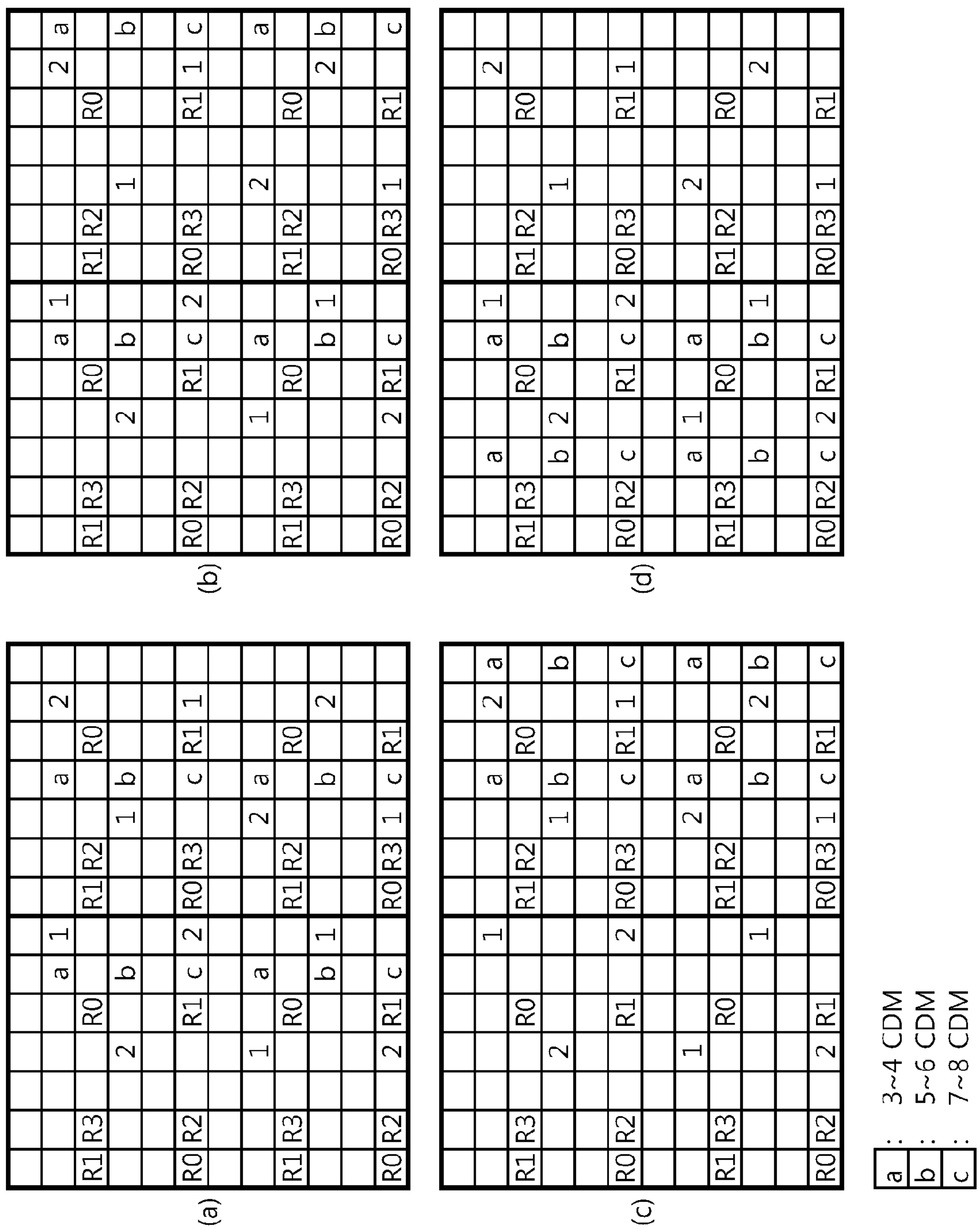
Figure 21:
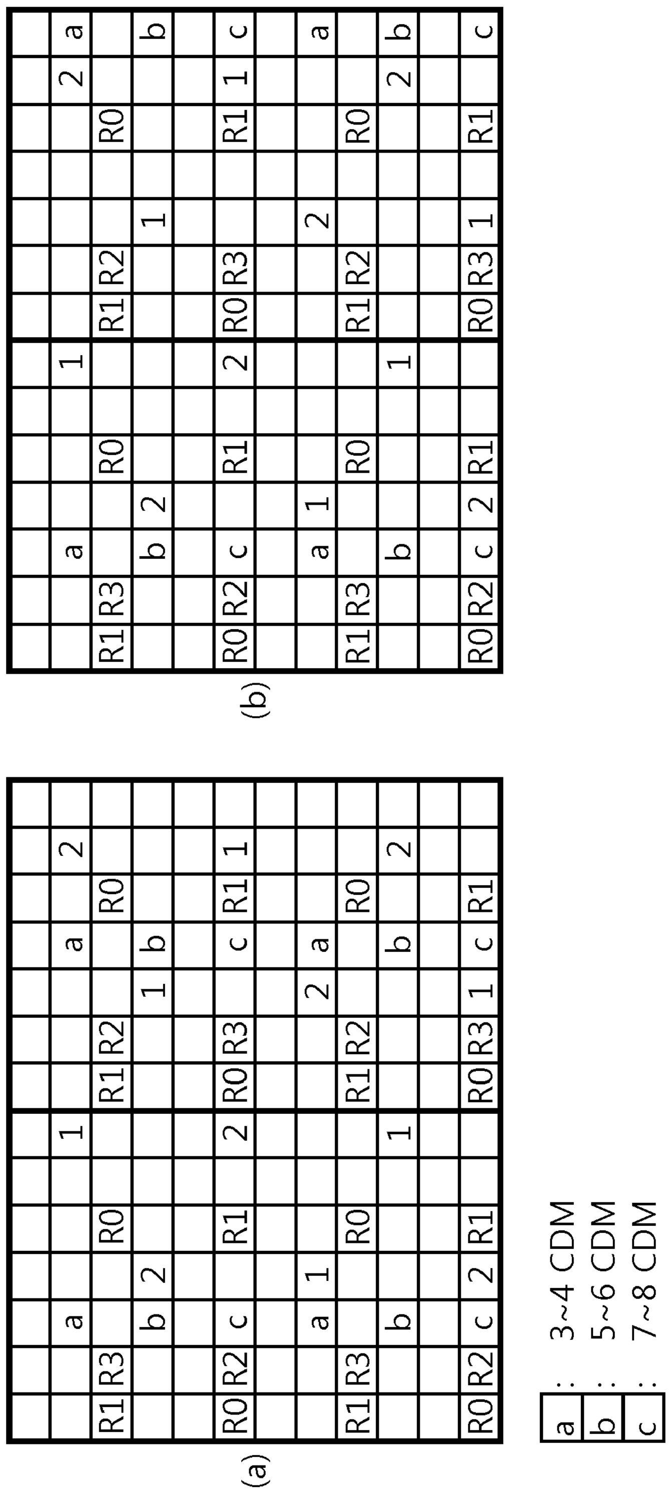

FIGS. 20 and 21 show another example of DMRS patterns according to the proposed method of transmitting a reference signal. FIGS. 20 and 21 illustrate the cases in which in the normal CP, a third DMRS to an eighth DMRS are multiplexed through the FDM/CDM hybrid method and mapped over two OFDM symbols. Positions in which a first DMRS and a second DMRS are transmitted are the same as those of the resource elements R5 in which the DRSs of the LTE rel-8 system are transmitted in FIG. 9. The third DMRS to the eighth DMRS are mapped over three OFDM symbols and can be mapped to two OFDM symbols of the third, sixth, eleventh, and fourteenth OFDM symbols (having respective indices 2, 5, 10, and 13) of a subframe. Six antennas are classified into three groups 3~4, 5~6, and 7~8 each including two antennas, each of the groups is multiplexed through the CDM method, and the DMRSs of each group are mapped at intervals of 6 subcarriers within one OFDM symbol. Positions of the subcarriers to which the third DMRS to the eighth DMRS can be mapped can be second, fourth, sixth, eighth, tenth, and twelfth subcarriers (having respective indices 1, 3, 5, 7, 9, and 11). However, the present invention is not limited to the above example. For example, the third DMRS to the eighth DMRS may be mapped to first, third, fifth, seventh, ninth, and eleventh subcarriers (having respective indices 0, 2, 4, 6, 8, and 10).

Figure 22:
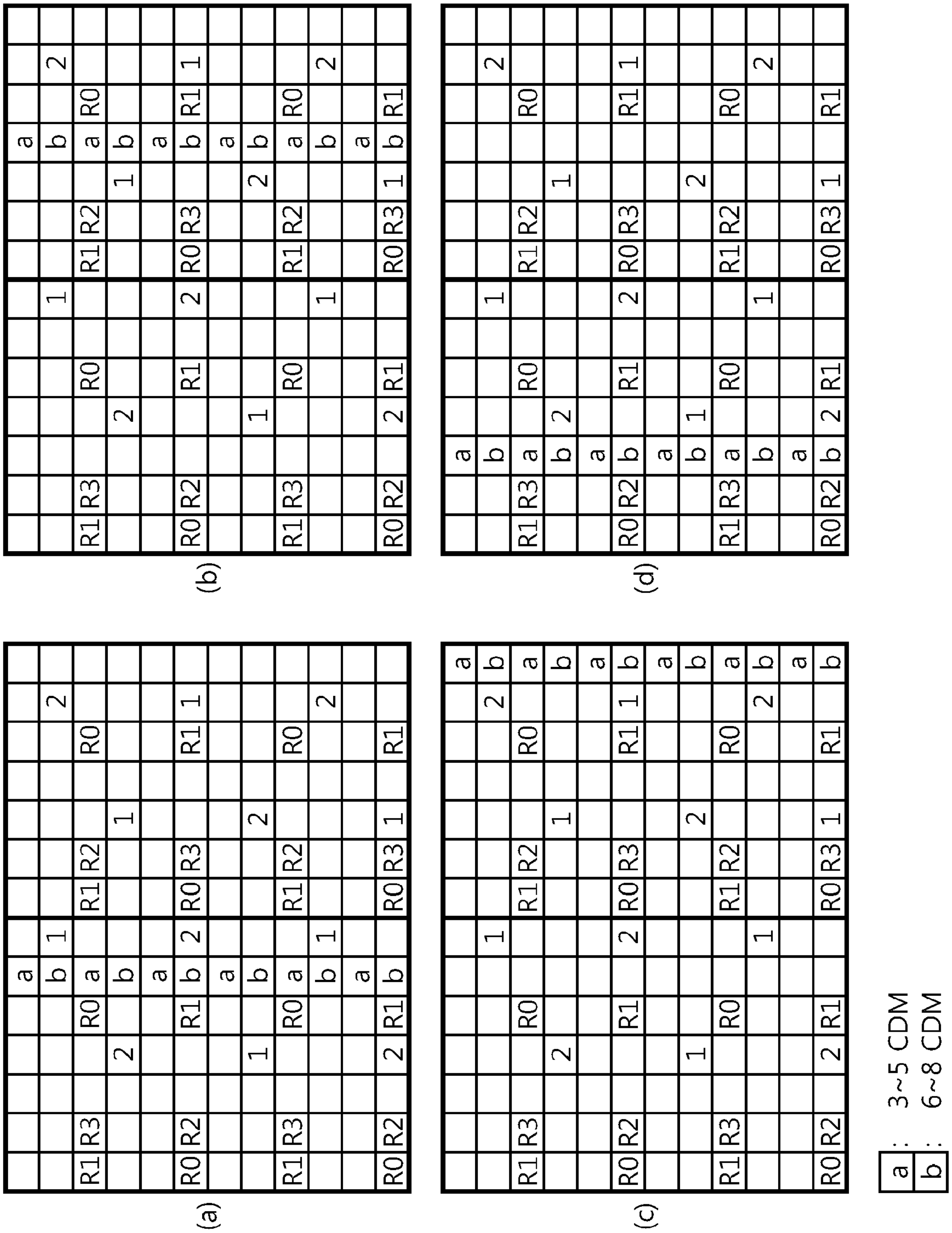

FIG. 22 shows another example of DMRS patterns according to the proposed method of transmitting a reference signal. FIG. 22 illustrates the case in which in the normal CP, a third DMRS to an eighth DMRS are multiplexed through the FDM/CDM hybrid method and mapped over one OFDM symbol. Positions in which a first DMRS and a second DMRS are transmitted are the same as those of the resource elements R5 in which the DRSs of the LTE rel-8 system are transmitted in FIG. 9. The third DMRS to the eighth DMRS are mapped over one OFDM symbol and can be mapped to one of the third, sixth, eleventh, and fourteenth OFDM symbols (having respective indices 2, 5, 10, and 13) of a subframe. Six antennas are divided into two groups 3~5 and 6~8 each including three antennas, each of the groups is multiplexed through the CDM method, and the DMRSs of each group are mapped at intervals of two subcarriers within one OFDM symbol. The third DMRS to the eighth DMRS are mapped to all the subcarrier of a corresponding OFDM symbol.

Figure 23:
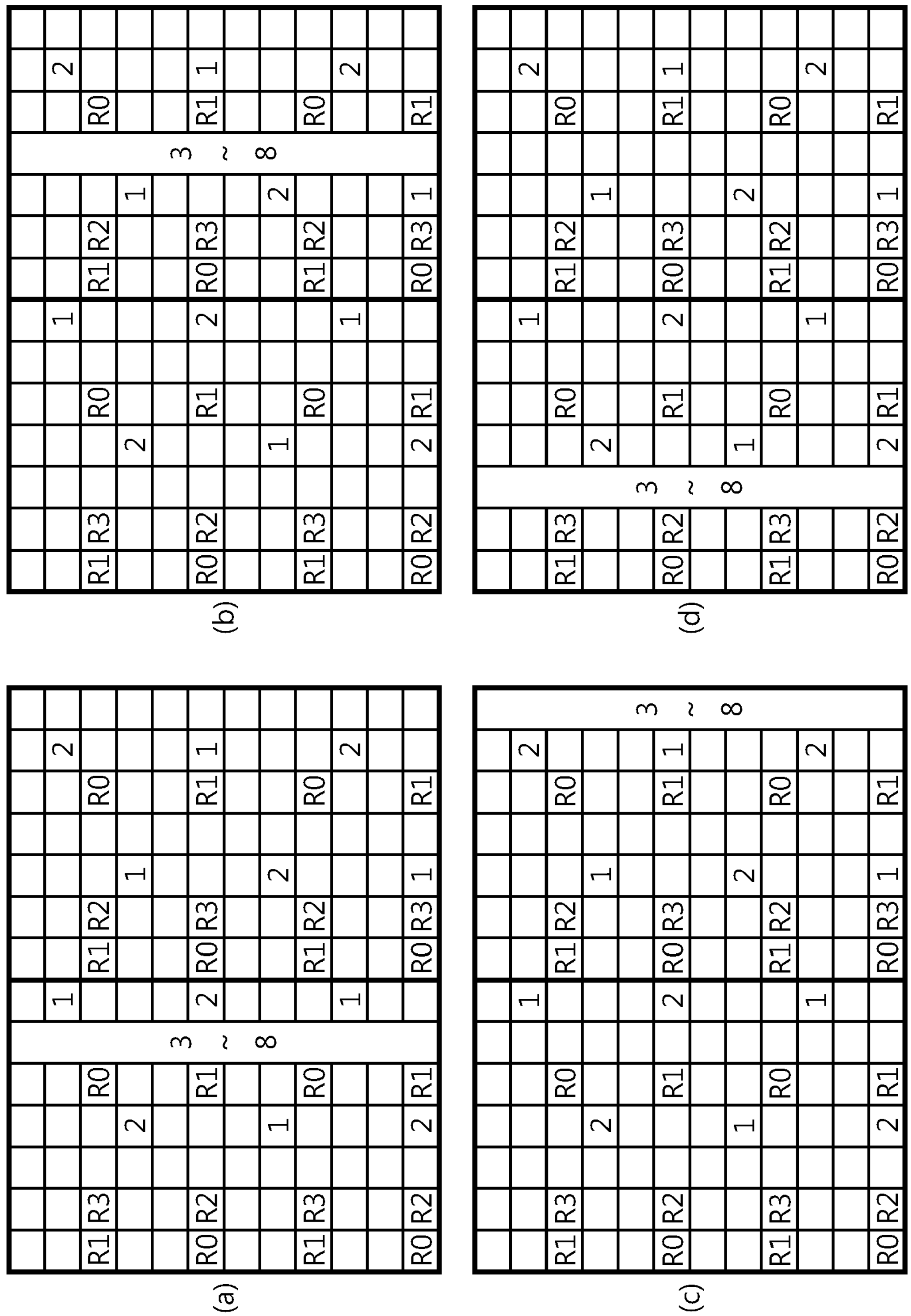

FIG. 23 shows another example of DMRS patterns according to the proposed method of transmitting a reference signal. FIG. 23 illustrates the case in which in the normal CP, a third DMRS to an eighth DMRS are multiplexed through the CDM method and mapped over one OFDM symbol. Positions in which a first DMRS and a second DMRS are transmitted are the same as those of the resource elements R5 in which the DRSs of the LTE rel-8 system are transmitted in FIG. 9. The third DMRS to the eighth DMRS are mapped over one OFDM symbol and can be mapped to one of the third, sixth, eleventh, and fourteenth OFDM symbols (having respective indices 2, 5, 10, and 13) of a subframe. Six antennas are multiplexed through the CDM method and mapped to all the subcarriers of a corresponding OFDM symbol.

Figure 24:
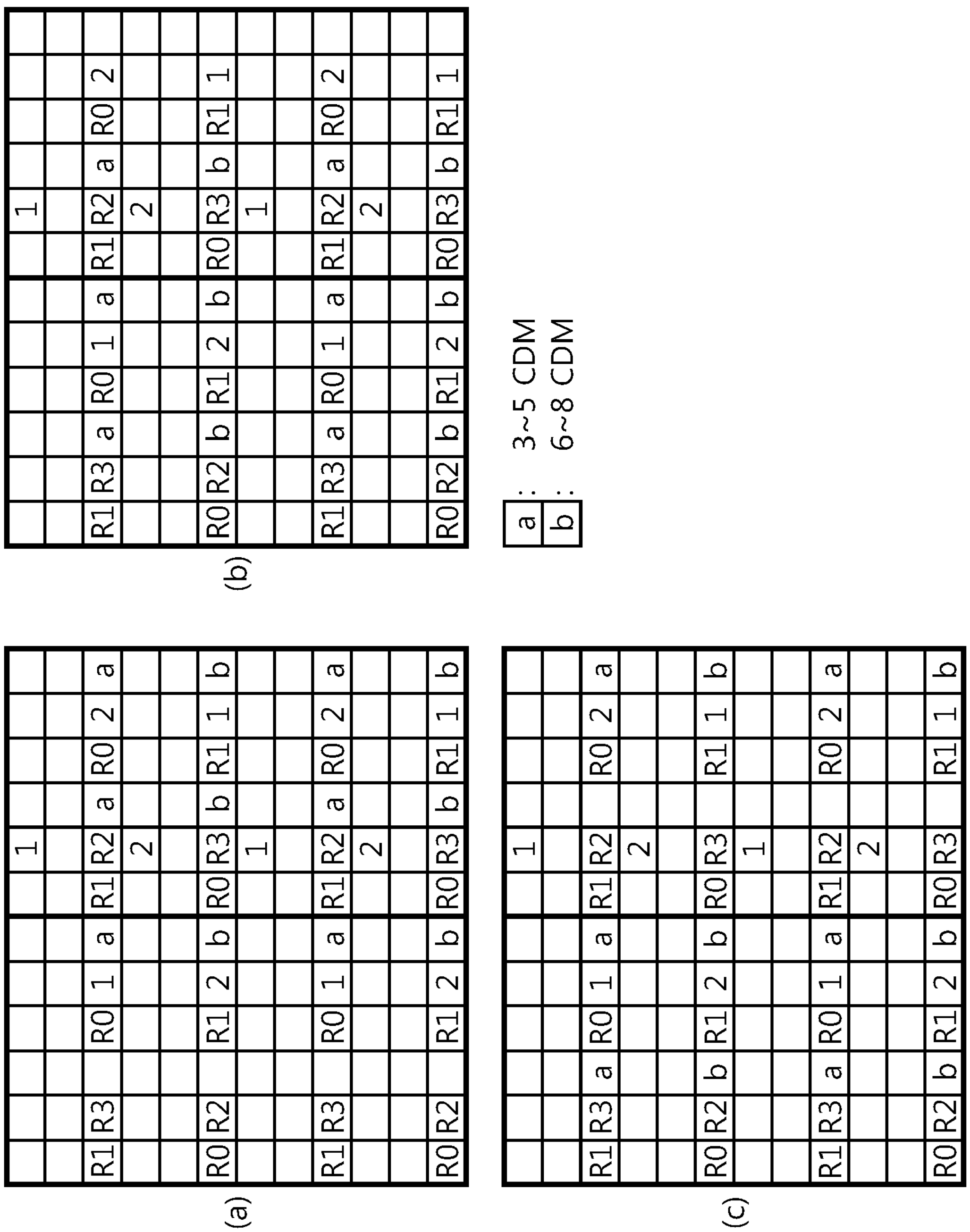

FIG. 24 shows another example of DMRS patterns according to the proposed method of transmitting a reference signal. FIG. 24 illustrates the case in which in the extended CP, a third DMRS to an eighth DMRS are multiplexed through the FDM/CDM hybrid method and mapped over three OFDM symbols. Positions in which a first DMRS and a second DMRS are transmitted are the same as those of the resource elements R5 in which the DRSs of the LTE rel-8 system are transmitted in FIG. 10. The third DMRS to the eighth DMRS are mapped over three OFDM symbols and can be mapped to three OFDM symbols of the third, sixth, ninth, and twelfth OFDM symbols (having respective indices 2, 5, 8, and 11) of a subframe. Six antennas are divided into two groups 3~5 and 6~8 each including three antennas, each of the groups is multiplexed through the CDM method, and the DMRSs of each group are mapped at intervals of 6 subcarriers within one OFDM symbol. The positions of subcarriers to which the third DMRS to the eighth DMRS can be mapped can be third, sixth, ninth, and twelfth subcarriers (having respective indices 2, 5, 8, and 11). However, the present invention is not limited to the above example. For example, the third DMRS to the eighth DMRS can be mapped to first, fourth, seventh, and tenth subcarriers (having respective indices 0, 3, 6, and 9) or to second, fifth, eighth, and eleventh subcarriers (having respective indices 1, 4, 7, and 10).

Figure 25:
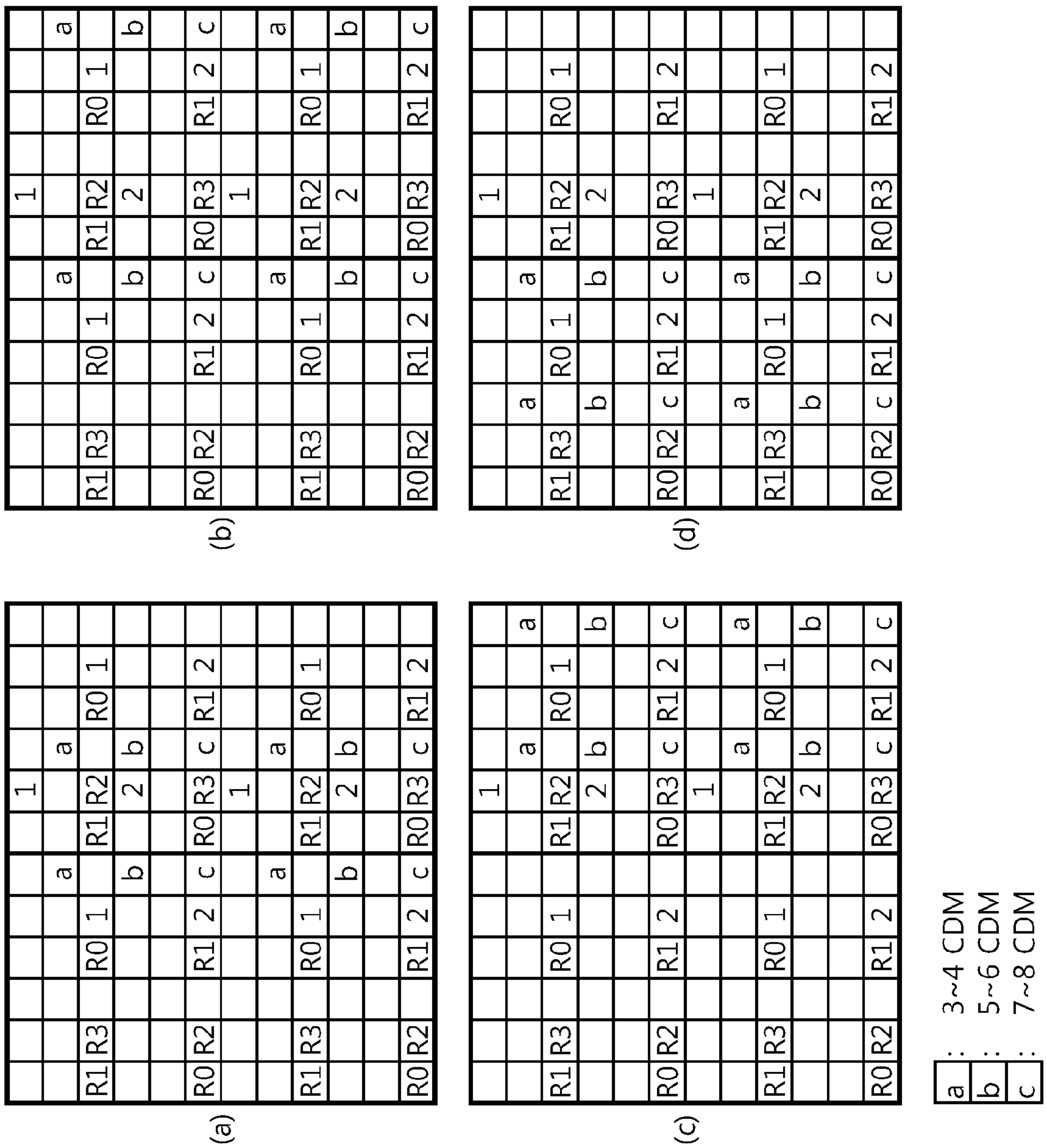
Figure 26:
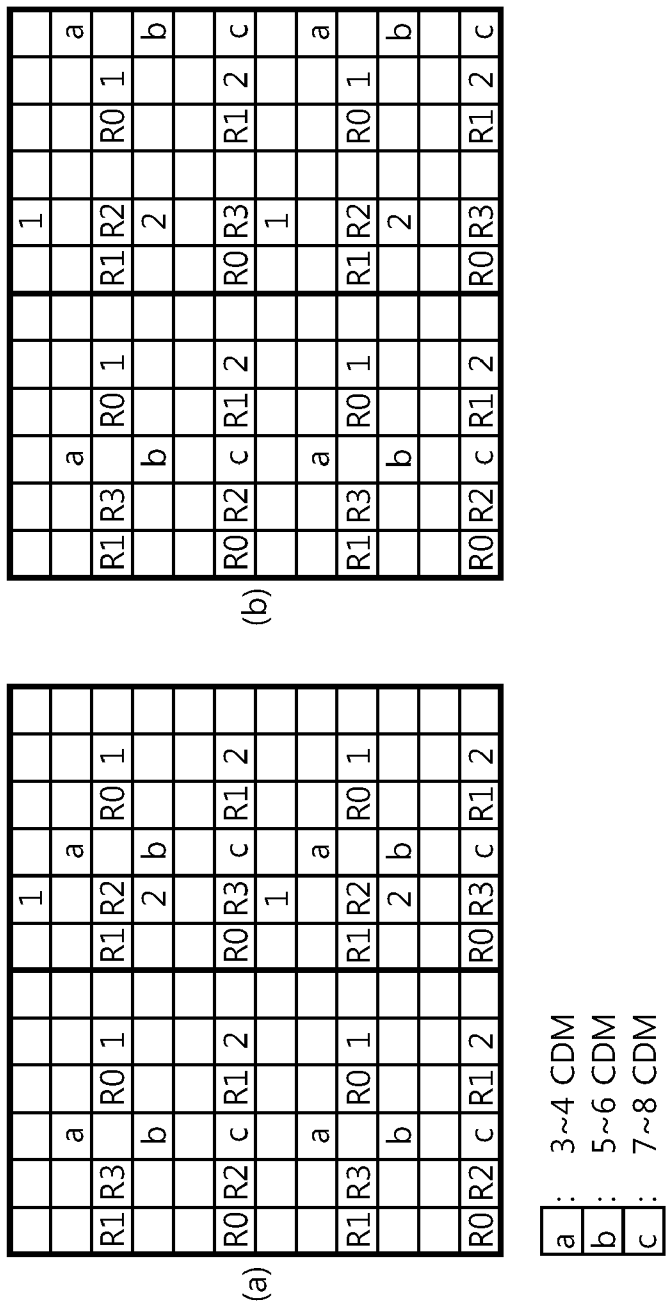

FIGS. 25 and 26 show another example of DMRS patterns according to the proposed method of transmitting a reference signal. FIGS. 25 and 26 illustrate the cases in which in the extended CP, a third DMRS to an eighth DMRS are multiplexed through the FDM/CDM hybrid method and mapped over two OFDM symbols. Positions in which a first DMRS and a second DMRS are transmitted are the same as those of the resource elements R5 in which the DRSs of the LTE rel-8 system are transmitted in FIG. 10. The third DMRS to the eighth DMRS are mapped over three OFDM symbols and can be mapped to two OFDM symbols of the third, sixth, ninth, and twelfth OFDM symbols (having respective indices 2, 5, 8, and 11) of a subframe. Six antennas are classified into three groups 3~4, 5~6, and 7~8 each including two antennas, each of the groups is multiplexed through the CDM method, and the DMRSs of each group are mapped at intervals of 6 subcarriers within one OFDM symbol. The positions of subcarriers to which the third DMRS to the eighth DMRS can be mapped can be second, fourth, sixth, eighth, tenth, and twelfth subcarriers (having respective indices 1, 3, 5, 7, 9, and 11). However, the present invention is not limited to the above example. For example, the third DMRS to the eighth DMRS can be mapped to first, third, fifth, seventh, ninth, and eleventh subcarriers (having respective indices 0, 2, 4, 6, 8, and 10).

Figure 27:
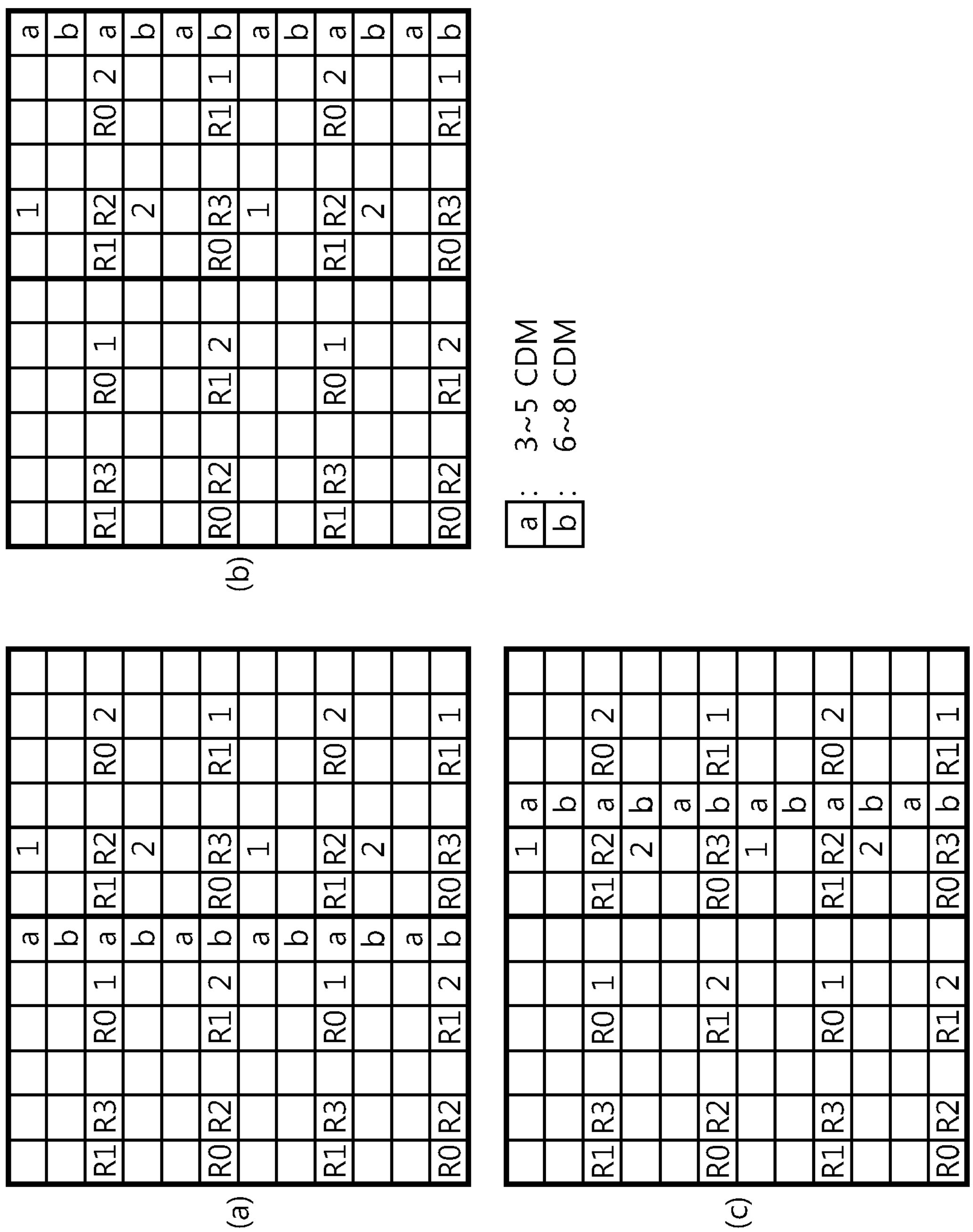

FIG. 27 shows another example of DMRS patterns according to the proposed method of transmitting a reference signal. FIG. 27 illustrates the case in which in the extended CP, a third DMRS to an eighth DMRS are multiplexed through the FDM/CDM hybrid method and mapped over one OFDM symbol. Positions in which a first DMRS and a second DMRS are transmitted are the same as those of the resource elements R5 in which the DRSs of the LTE rel-8 system are transmitted in FIG. 9. The third DMRS to the eighth DMRS are mapped over one OFDM symbol and can be mapped to one of the third, sixth, ninth, and twelfth OFDM symbols (having respective indices 2, 5, 8, and 11) of a subframe. Six antennas are divided into two groups 3~5 and 6~8 each including three antenna, each of the groups is multiplexed through the CDM method, and the DMRS of each group are mapped at intervals of two subcarriers within one OFDM symbol. The third DMRS to the eighth DMRS are mapped to all the subcarriers of a corresponding OFDM symbol.

Figure 28:
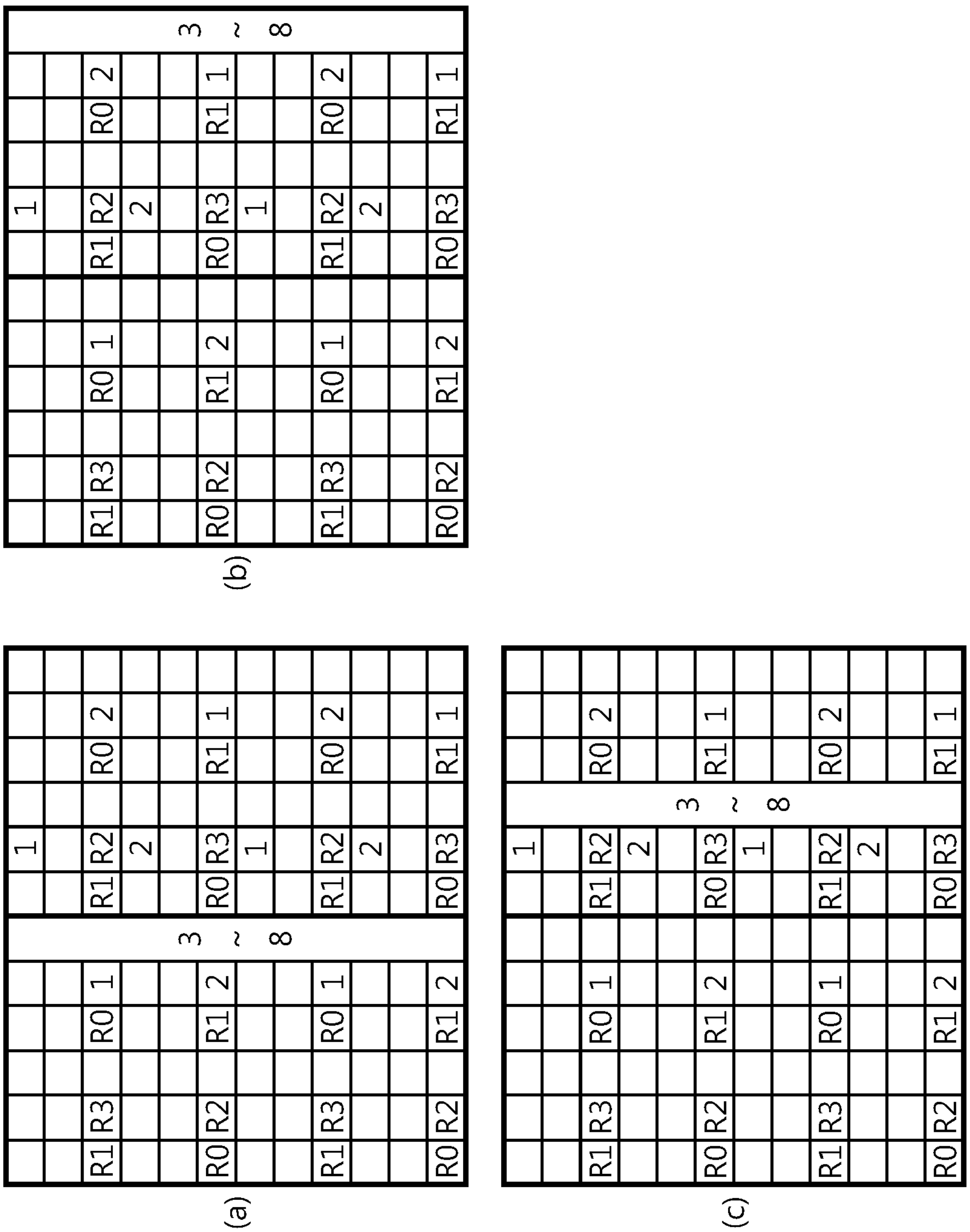

FIG. 28 shows another example of DMRS patterns according to the proposed method of transmitting a reference signal. FIG. 28 illustrates the case in which in the extended CP, a third DMRS to an eighth DMRS are multiplexed through the CDM method and mapped over one OFDM symbol. Positions in which a first DMRS and a second DMRS are transmitted are the same as those of the resource elements R5 in which the DRSs of the LTE rel-8 system are transmitted in FIG. 9. The third DMRS to the eighth DMRS are mapped over one OFDM symbol and can be mapped to one of the third, sixth, ninth, and twelfth OFDM symbols (having respective indices 2, 5, 8, and 11) of a subframe. Six antennas are multiplexed through the CDM method and mapped to all the subcarriers of a corresponding OFDM symbol.

The DMRS patterns of FIGS. 18 to 28 are illustrated to have the patterns of the third DMRS to the eighth DMRS on the basis of the DMRS patterns of FIGS. 12 to 17. However, the patterns of the third DMRS to the eighth DMRS can be formed on the basis of other DMRS patterns described with reference to FIGS. 12 to 17. Further, numbers 1 to 8 in FIGS. 18 to 28 indicate the number of ranks or layers, and the corresponding number does not indicate the index of a rank or a layer. For example, in FIG. 18, a number 3~5 means that the DMRSs of three different ranks or layers are multiplexed through the CDM method and transmitted in one resource element, but is not limited to that the DMRSs of a rank 3 to a rank 5 are transmitted. The DMRSs of a rank 3, a rank 5, and a rank 7 can be transmitted or the DMRSs of three different antennas can be transmitted.

DMRS patterns supporting single layer beam-forming of an LTE rel-8 system and new DMRS patterns are described below. In the case in which DMRS patterns for supporting an LTE rel-9 system or an LTE-A system are newly defined, the following conditions can be fulfilled.

1) A relay backhaul link needs to be taken into consideration.

2) The position of a subcarrier to which a DMRS is mapped can be the same as the position of a subcarrier to which a CRS is mapped.

3) The position of an OFDM symbol to which a DMRS is mapped can differ from the position of an OFDM symbol to which a CRS is mapped. This is for the power boosting of a DMRS.

4) The DMRSs of a low rank (e.g., a first DMRS and a second DMRS) can be chiefly mapped to an OFDM symbol in which a PDCCH is not transmitted.

5) The DMRSs of a low rank (e.g., a first DMRS and a second DMRS) can be multiplexed through the FDM method, and multiplexing can be performed between the DMRSs of a high rank (e.g., a third DMRS to an eighth DMRS) through the CDM method.

6) A DMRS multiplexed through the CDM method can be mapped to an OFDM symbol corresponding to a center portion not the edges of one subframe.

7) A Channel State Information Reference Signal (CSI-RS) for measuring the CSI of an LTE-A system needs to be transmitted within a relay backhaul duration so that a relay station can measure a downlink channel.

8) The puncturing of a DMRS of a low rank because of a PDCCH needs to be minimized.

Figure 29:
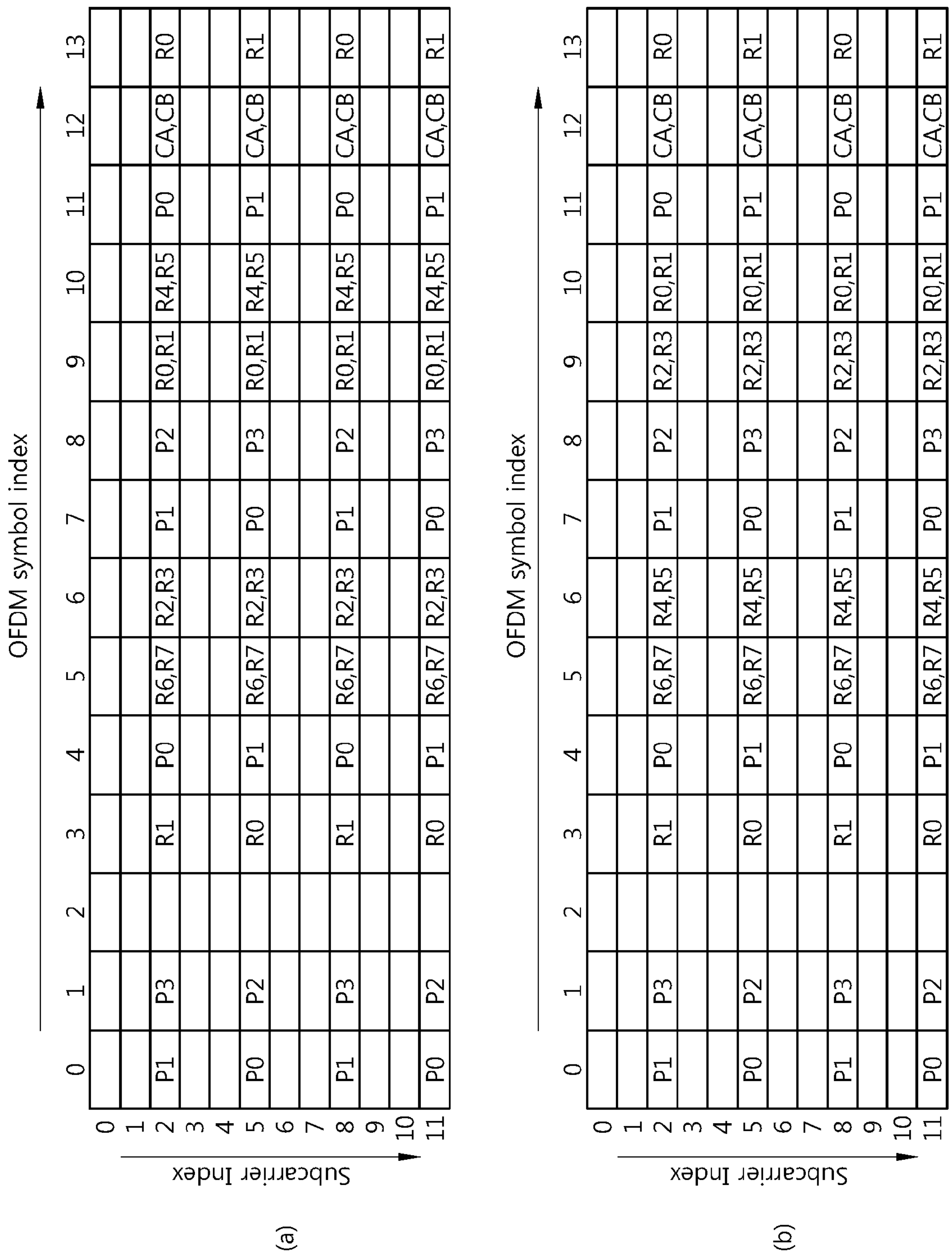
FIG. 29 shows examples of DMRS patterns when the number of legacy CRSs is four (P0 to P3) in the normal CP.
Figure 30:
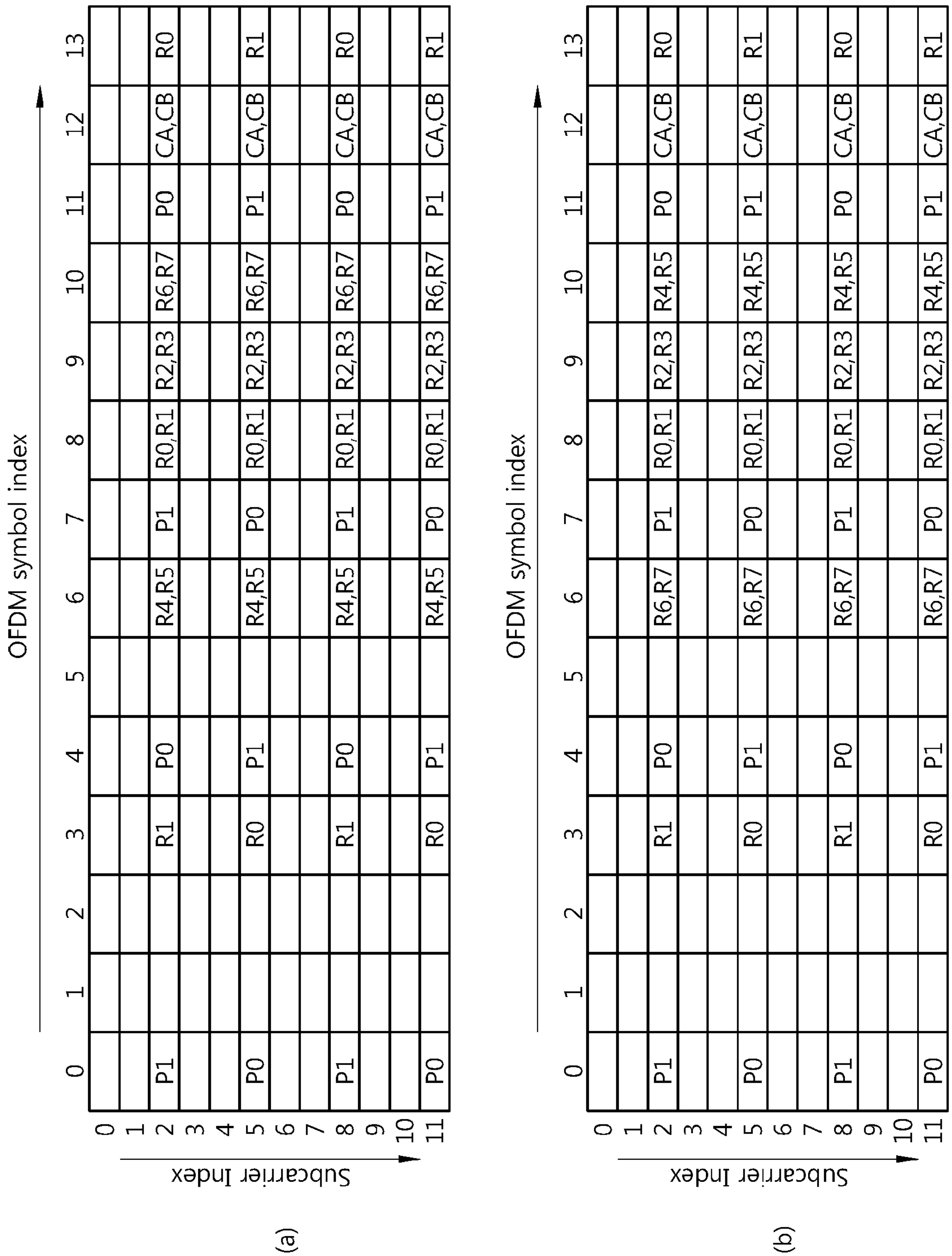
FIG. 30 shows examples of DMRS patterns when the number of legacy CRSs is two (P0 and P1) in the normal CP.
Figure 31:
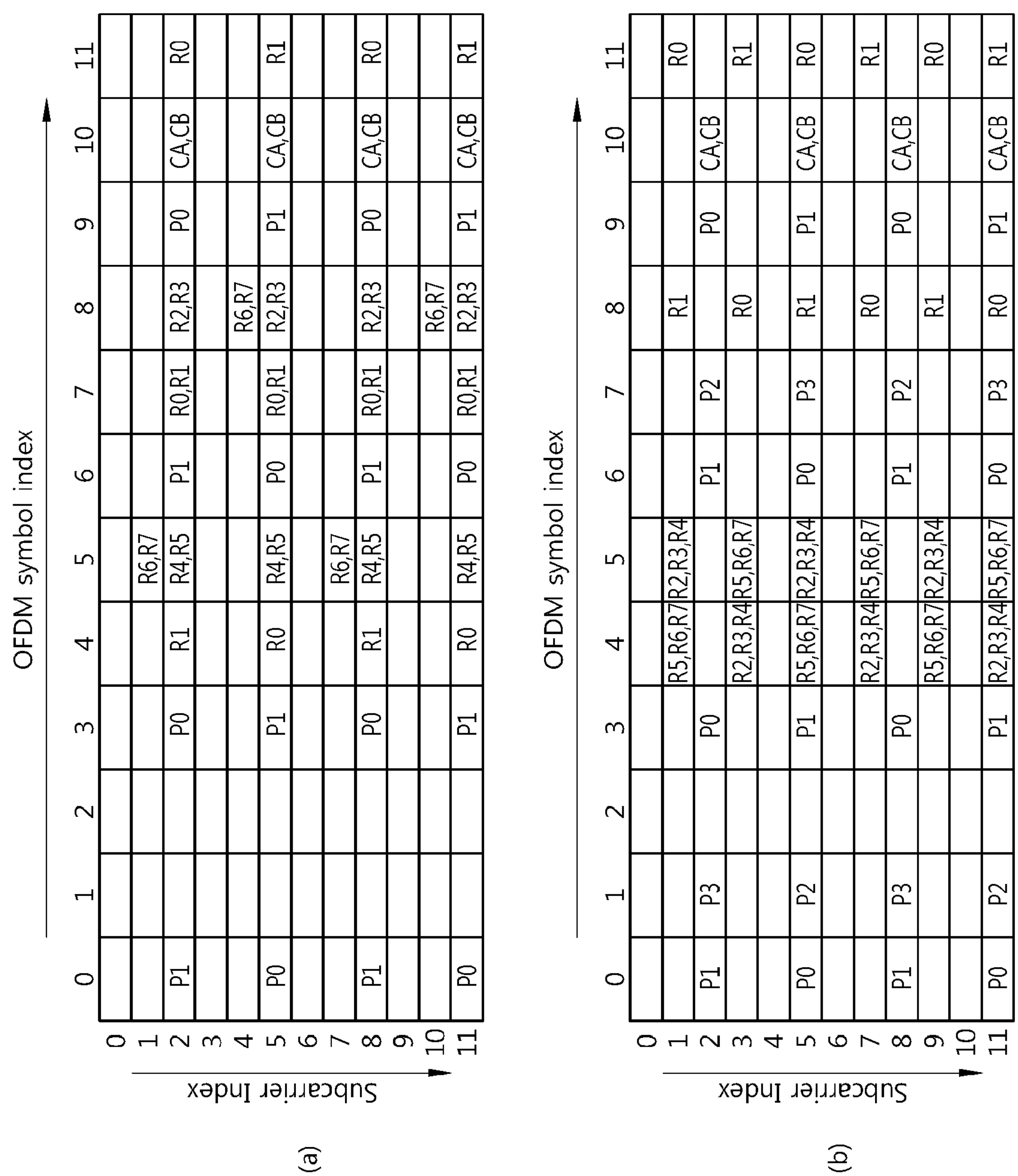
FIG. 31 shows examples of DMRS patterns in the extended CP.

FIGS. 29 to 31 show another example of DMRS patterns according to the proposed method of transmitting a reference signal. In FIGS. 29 to 31, CA, CB indicate a CSI-RS for measuring CSI in an LTE-A system and can be mapped to a second OFDM symbol (a thirteenth OFDM symbol in the normal CP and an eleventh OFDM symbol in the extended CP) in the last of a subframe. CA, CB can be a CSI-RS which supports eight transmission antennas of an LTE-A system. If a legacy CRS is used to measure CSI, CA, CB can be a CSI-RS of four additional antennas or a CSI-RS of eight transmission antennas. Each of CA and CB can be a CSI-RS for each group in the case in which eight transmission antennas are divided into two groups. CA and CB can be multiplexed through the CDM method.

FIG. 29 shows examples of DMRS patterns when the number of legacy CRSs is four (P0 to P3) in the normal CP. The legacy CRS pattern complies with the CRS pattern of FIG. 8. The DMRSs of eight transmission antennas (R0 to R7) are mapped to the same subcarriers (having indices 2, 5, 8, and 11) as subcarriers to which the legacy CRSs are mapped. The DMRSs R0 and R1 of a low rank are multiplexed through the FDM method in fourth and fourteenth OFDM symbols (having respective indices 3 and 13). Further, DMRSs for antenna pairs of (R0, R1), (R2, R3), (R4, R5), and (R6, R7) are multiplexed through the CDM method, and each mapped to one of sixth, seventh, tenth and eleventh OFDM symbols (having respective indices 5, 6, 9, and 10).

FIG. 30 shows examples of DMRS patterns when the number of legacy CRSs is two (P0 and P1) in the normal CP. The legacy CRS pattern complies with the CRS pattern of FIG. 7. The DMRSs R0 to R7 of eight transmission antennas are mapped to the same subcarriers (having indices 2, 5, 8, and 11) as subcarriers to which the legacy CRSs are mapped. The DMRSs R0 and R1 of a low rank are multiplexed through the FDM method in fourth and fourteenth OFDM symbols (having indices 3 and 13). Further, DMRSs for antenna pairs of (R0, R1), (R2, R3), (R4, R5), and (R6, R7) are multiplexed through the CDM method, and each mapped to one of seventh, ninth, tenth, and eleventh OFDM symbols (having respective indices 6, 8, 9, and 10).

FIG. 31 shows examples of DMRS patterns in the extended CP. FIG. 31-(*a*) shows a case in which the number of legacy CRSs is two (P0 and P1), and FIG. 31-(*b*) shows a case in which the number of legacy CRSs is four (P0 to P3). In FIG. 31-(*a*), the DMRS (R0, R1) of a low rank is multiplexed through the FDM method in fifth and twelfth OFDM symbols (having indices 4 and 11). Further, DMRSs for antenna pairs of (R0, R1), (R2, R3), (R4, R5), and (R6, R7) are multiplexed through the CDM method, and each mapped to one of sixth, eighth, and ninth OFDM symbols (having respective indices 5, 7, and 8). In FIG. 31-(*b*), the DMRS (R0, R1) of a low rank is multiplexed through the FDM method in ninth and twelfth OFDM symbols (having indices 8 and 11). Further, DMRSs for antenna pairs of (R2, R3, R4) and (R5, R6, R7) are multiplexed through the CDM method, and each mapped to one of fifth and sixth OFDM symbols (having indices 4, 5).

In newly designing a DMRS pattern, an optimized DMRS pattern can be proposed in precoding the eight transmission antennas of an LTE-A system.

First, a frequency offset in a DMRS pattern according to the proposed method of transmitting a reference signal is described below.

Figure 32:
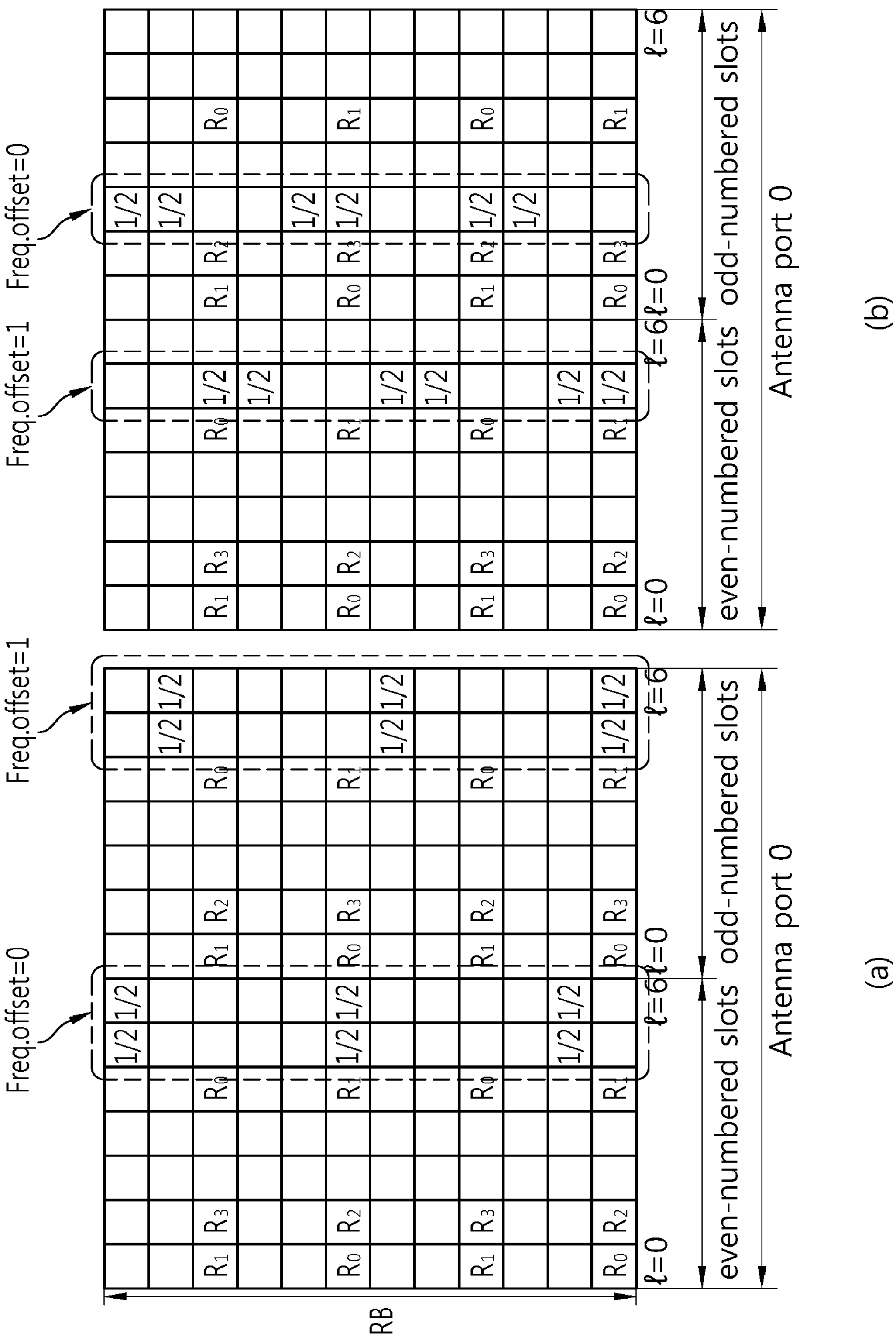
FIG. 32 shows examples of DMRS patterns according to the proposed method of transmitting a reference signal to which a frequency offset is applied.

FIG. 32 shows examples of DMRS patterns according to the proposed method of transmitting a reference signal to which a frequency offset is applied. In FIG. 32, R0 to R3 indicate legacy CRSs and comply with the CRS pattern of FIG. 8.

In FIG. 32-(*a*), a first DMRS and a second DMRS are multiplexed through the CDM method and then transmitted. The first DMRS and the second DMRS are mapped to first, sixth, and eleventh subcarriers (having respective indices 0, 5, 10) in the sixth and seventh OFDM symbols of a first slot. Further, the first DMRS and the second DMRS are mapped to second, seventh, and twelfth subcarriers (having respective indices 1, 6, and 11) in the sixth and seventh OFDM symbols of a second slot. Here, a frequency offset can be defined as the index of a subcarrier to which a DMRS is mapped for the first time. For example, since in the first slot, the first DMRS and the second DMRS are mapped to the first subcarrier (having an index 0) for the first time, the frequency offset value is 0. Further, since in the second slot, the first DMRS and the second DMRS are mapped to the second subcarrier (having an index 1) for the first time, the frequency offset value is 1. In the frequency domain, if the first DMRS and the second DMRS are mapped at regular intervals of subcarriers, the frequency offset value of a resource block shown in FIG. 32-(*a*) can be 0 or 1.

In FIG. 32-(*b*), a first DMRS and a second DMRS are multiplexed through the CDM method and then transmitted. The first DMRS and the second DMRS are mapped to third, fourth, seventh, eighth, tenth, and eleventh subcarriers (having respective indices 2, 3, 6, 7, 10, and 11) in the sixth OFDM symbol of a first slot. Further, the first DMRS and the second DMRS are mapped to first, second, fifth, sixth, ninth, and tenth subcarriers (having respective indices 0, 1, 4, 5, 8, and 9) in the third OFDM symbol of a second slot. Here, a frequency offset can be defined as an index in a resource unit to which consecutive DMRSs can be assigned when DMRSs are assigned to consecutive subcarriers as shown in FIG. 32-(*b*). For example, when two subcarrier forms one unit, the index of a subcarrier to which the first DMRS and the second DMRS are mapped for the first time in the sixth OFDM symbol of the first slot is 1. Accordingly, the frequency offset value can also be 1. Further, since the index of a subcarrier to which the first DMRS and the second DMRS are mapped for the first time in the third OFDM symbol of the second slot is 0, the frequency offset value can also be 0. If the first DMRS and the second DMRS are mapped at regular intervals of subcarriers in the frequency domain, the frequency offset value of the resource block shown in FIG. 32-(*b*) can be 0 or 1. The frequency offset value can vary according to an OFDM symbol to which DMRSs are mapped.

A pattern of a DMRS of a rank 1 (a first DMRS) and a pattern of a DMRS of a rank 2 (a second DMRS) are first described below.

Figure 33:
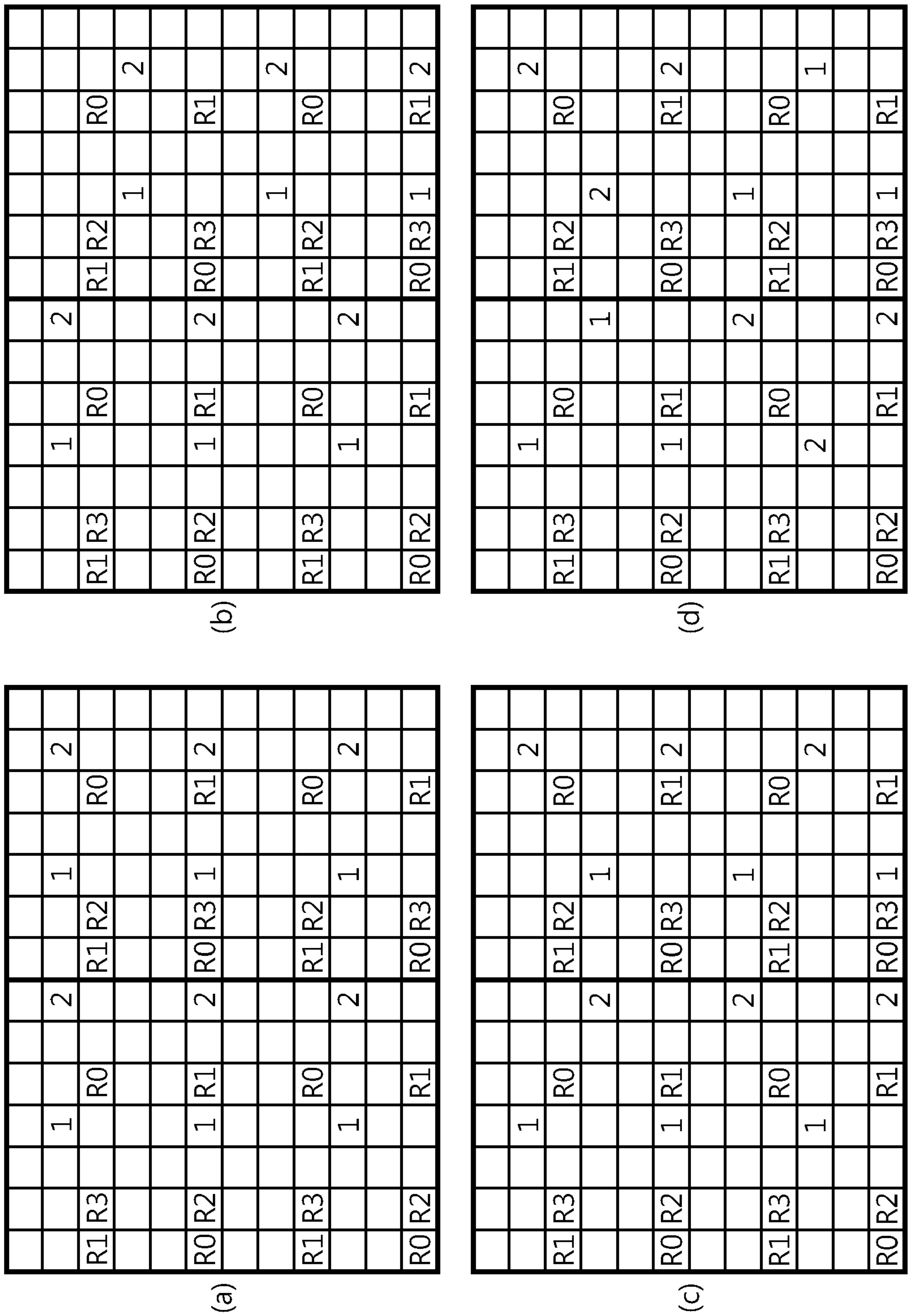
FIGS. 33 to 92 show examples of DMRS patterns according to the proposed method of transmitting a reference signal.
Figure 34:
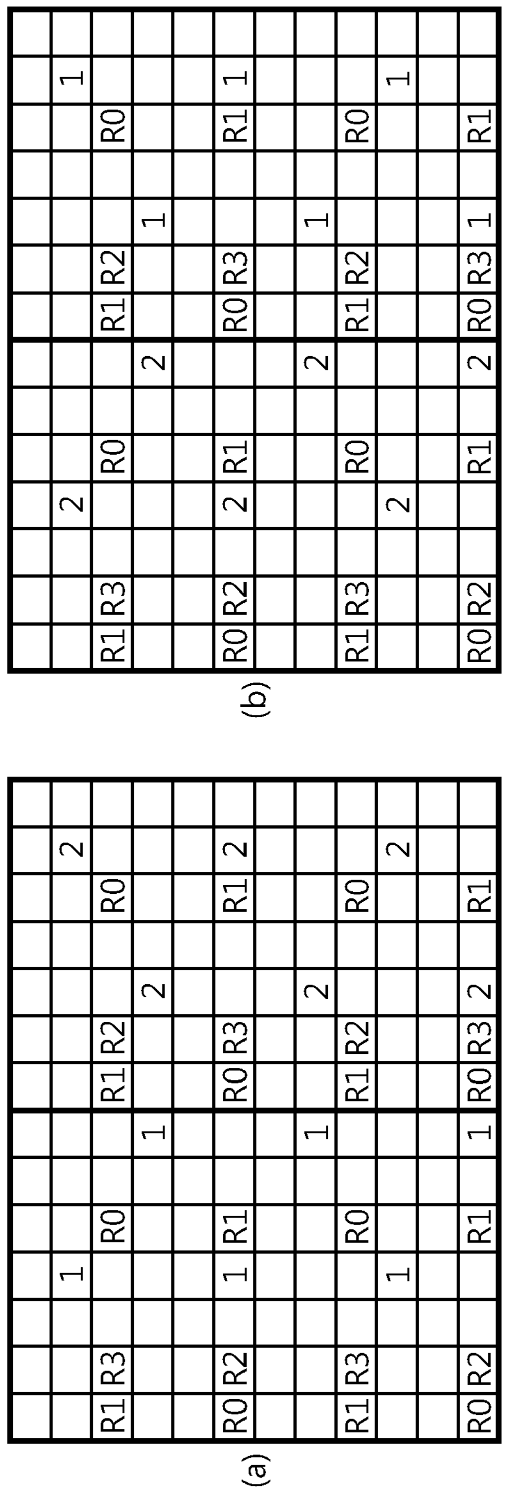

FIGS. 33 and 34 show another example of DMRS patterns according to the proposed method of transmitting a reference signal. FIGS. 33 and 34 illustrate the cases in which in the normal CP, a first DMRS and a second DMRS are multiplexed through the FDM method and mapped over four OFDM symbols. The first DMRS and the second DMRS can be mapped to the fourth, seventh, tenth, and thirteenth OFDM symbols (having respective indices 3, 6, 9, and 12) of a subframe. The DMRSs are mapped at intervals of four subcarriers in each OFDM symbol, and so the frequency offset can be one of 0 to 3 in each OFDM symbol.

Figure 35:
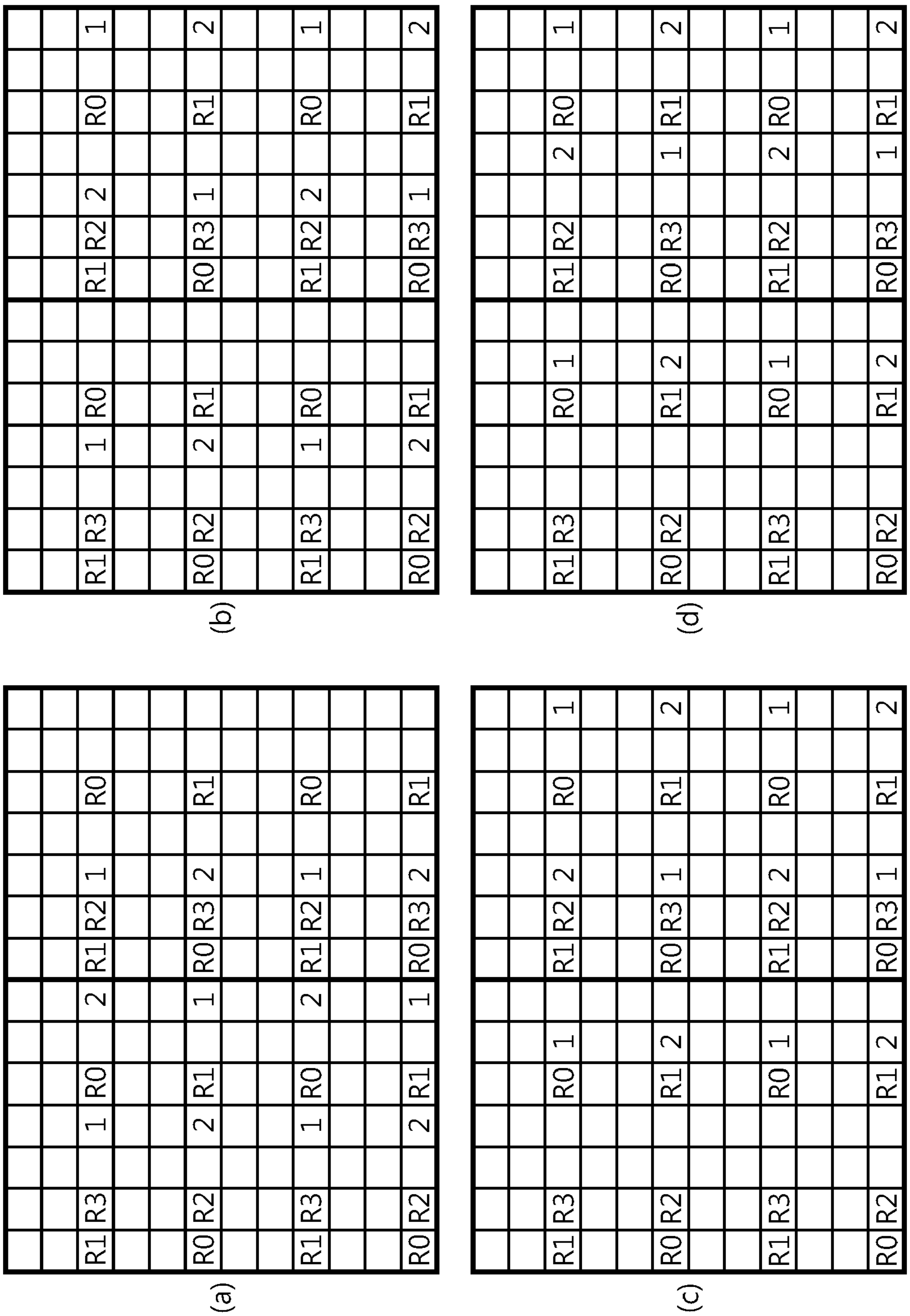
Figure 36:
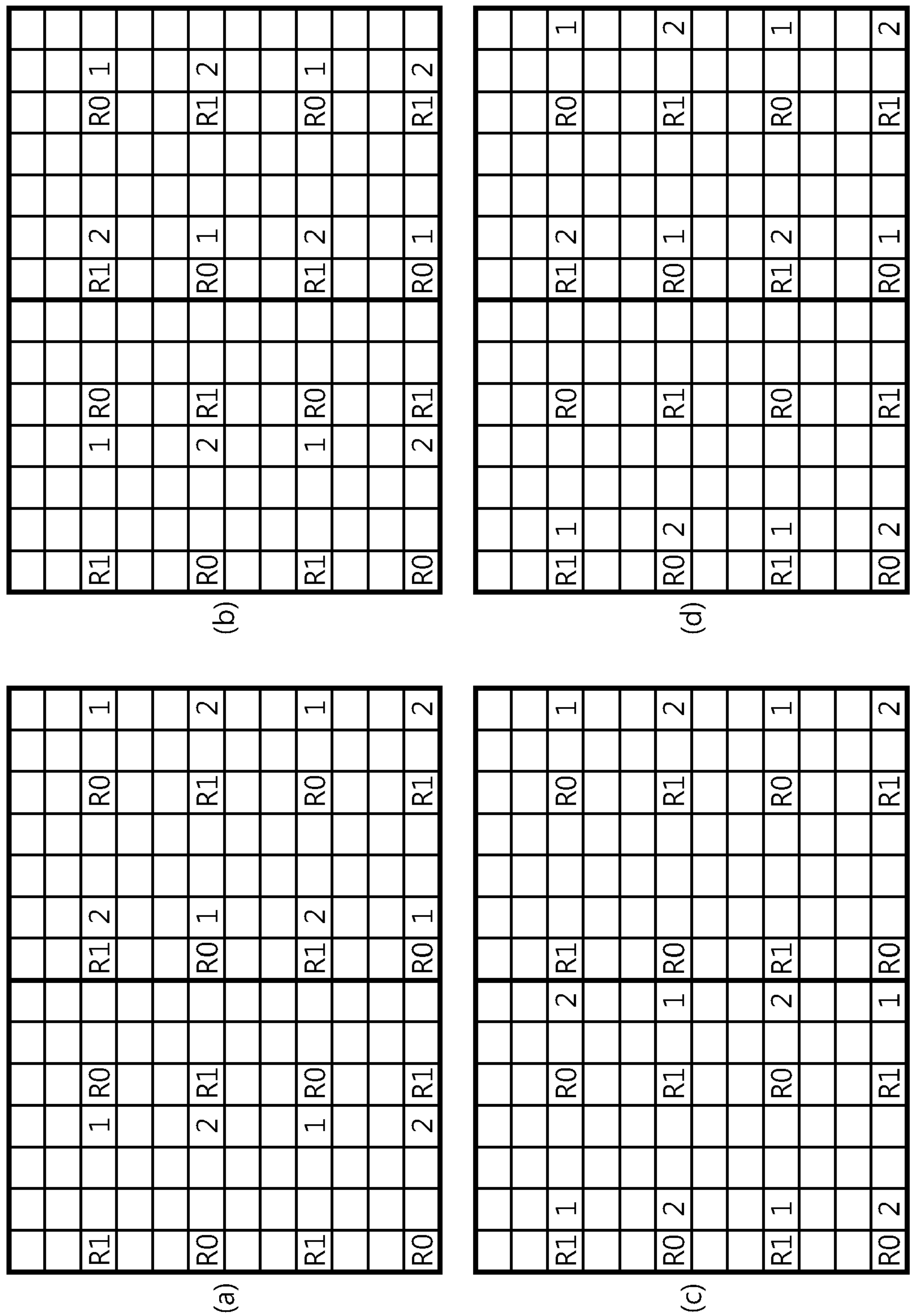
Figure 37:
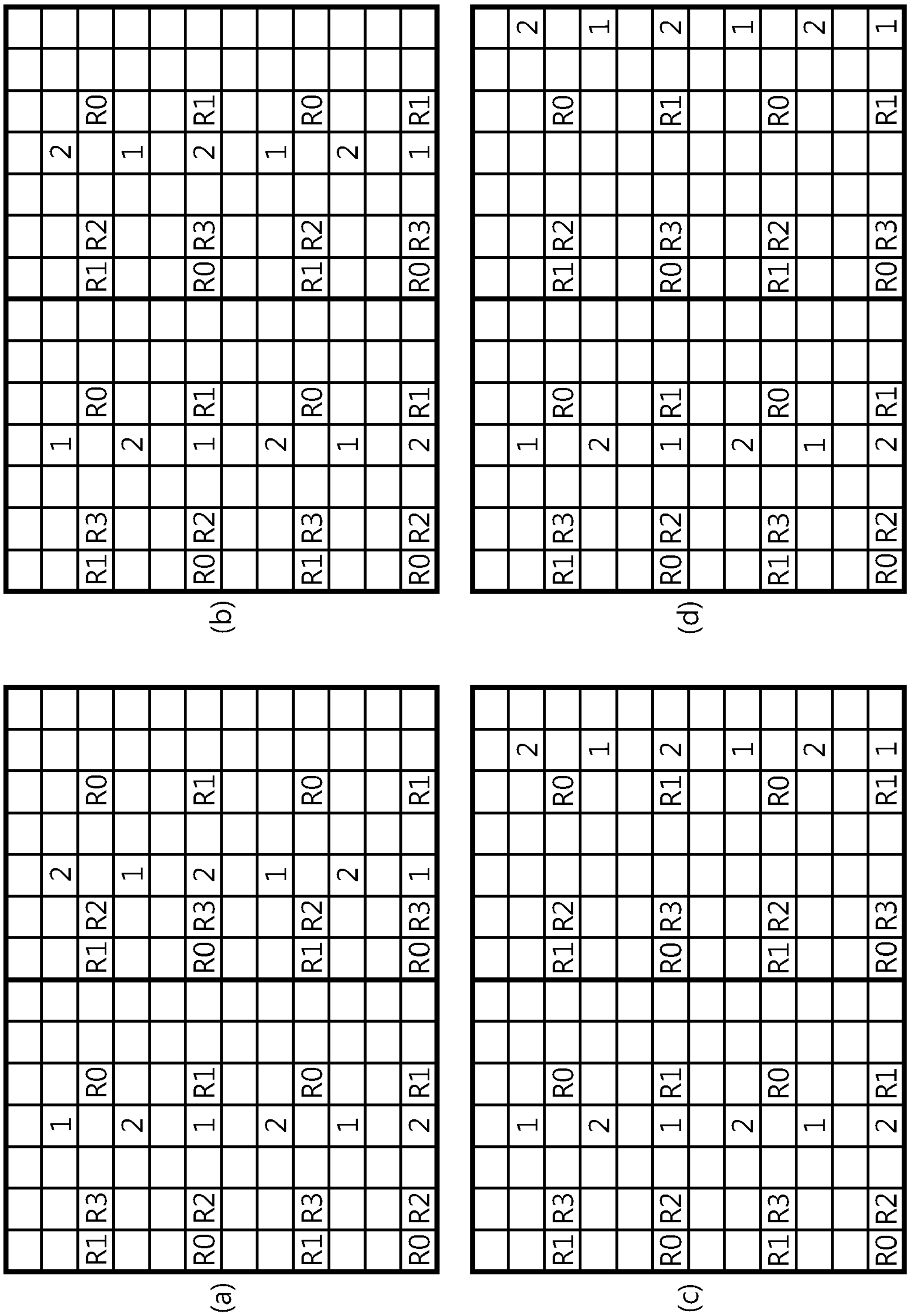
Figure 38:
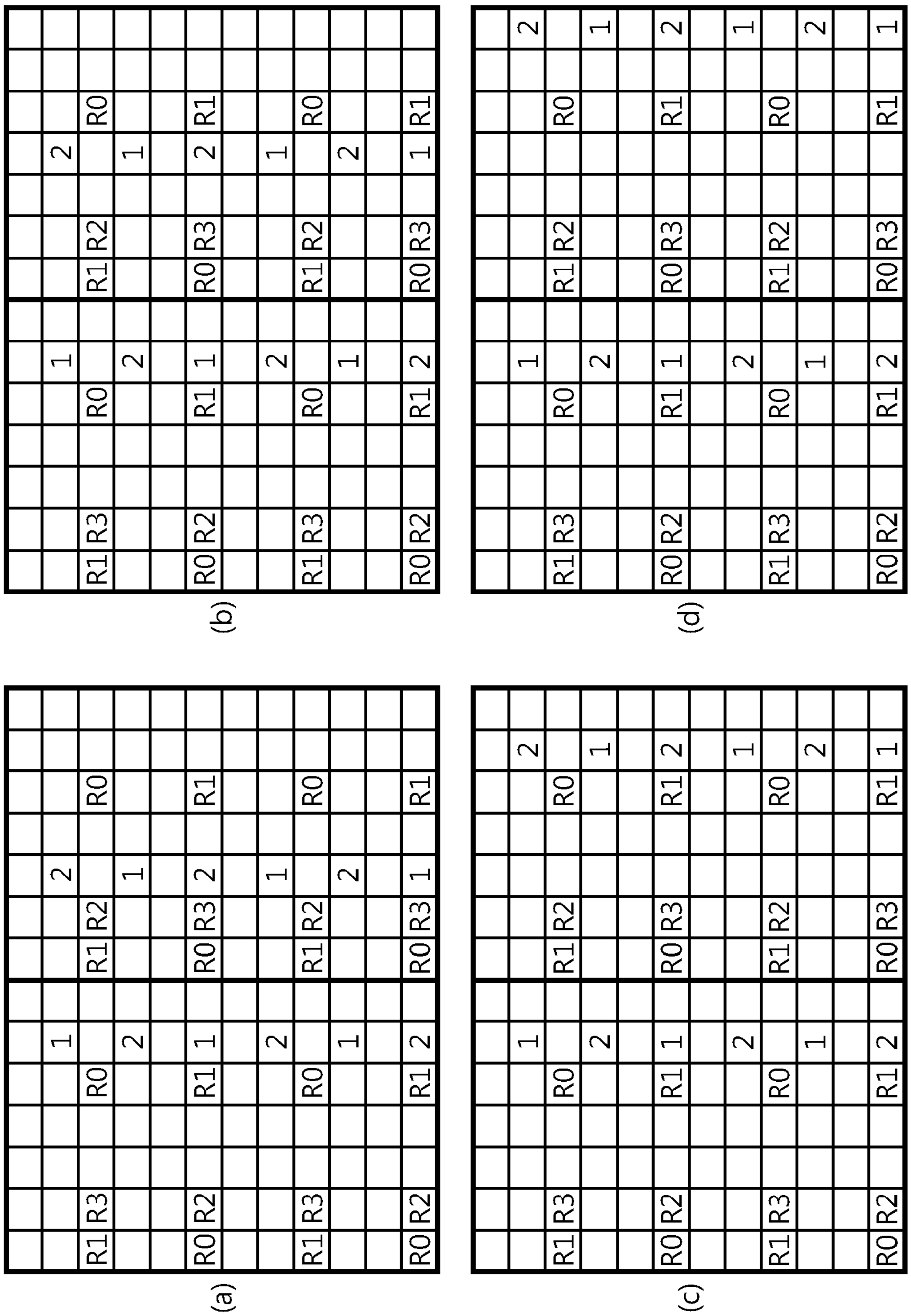
Figure 39:
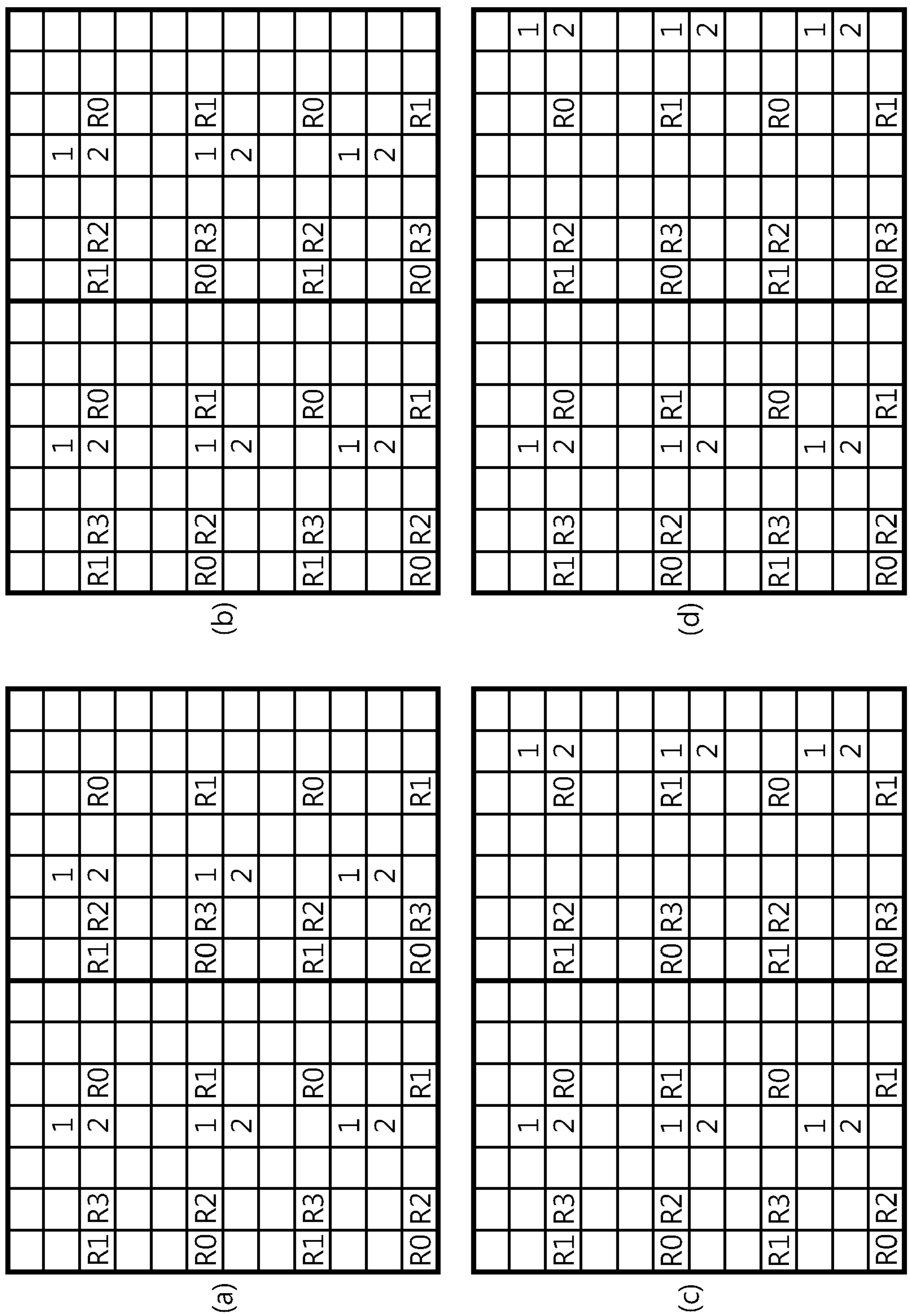
Figure 40:
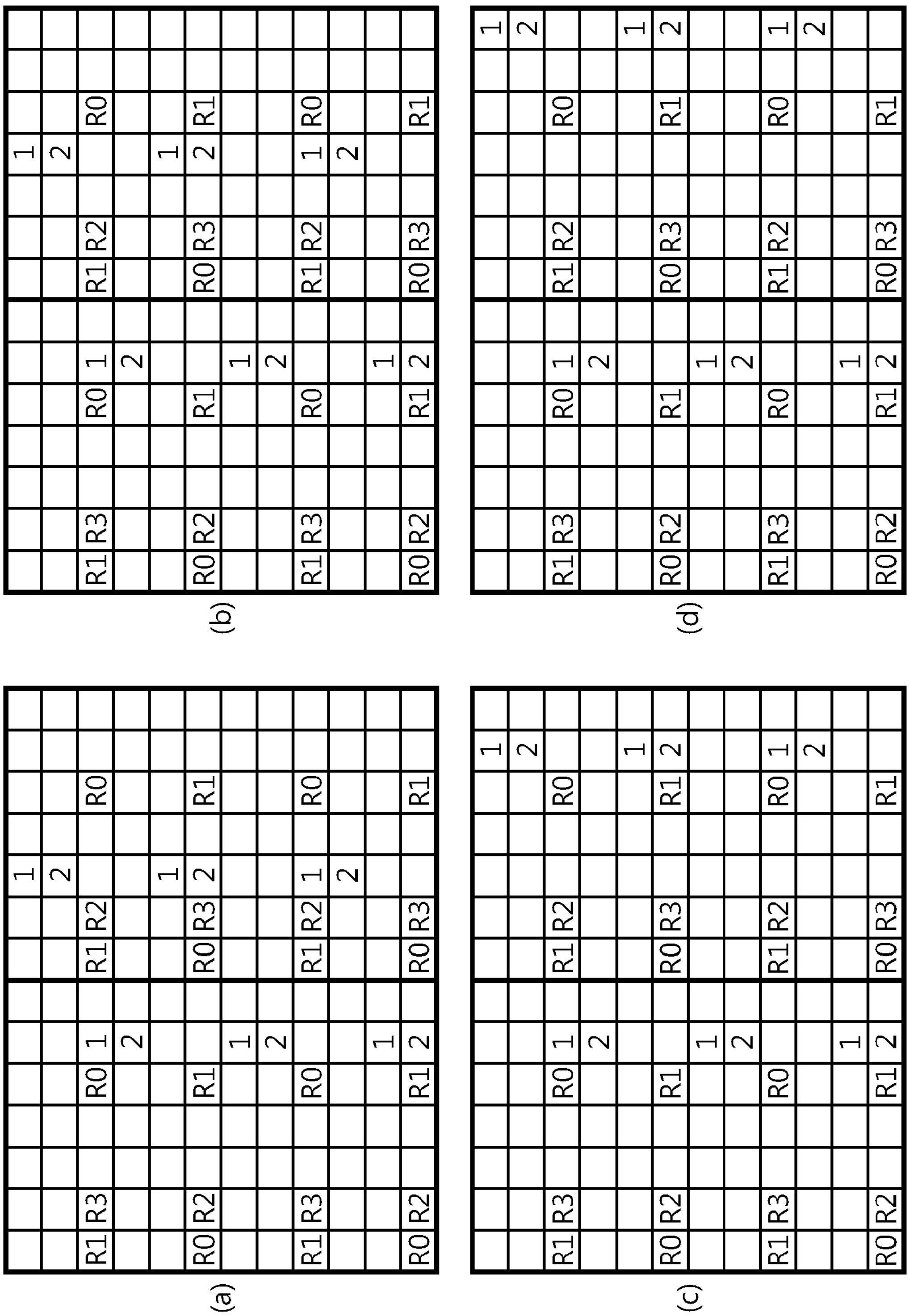

FIGS. 35 and 36 show example of DMRS patterns according to the proposed method of transmitting a reference signal. FIGS. 35 and 36 illustrate the cases in which in the normal CP, a first DMRS and a second DMRS are multiplexed through the FDM method and mapped over three OFDM symbols. FIG. 35 shows the case in which the number of legacy CRSs is 4. The first DMRS and the second DMRS can be mapped to three OFDM symbols of the fourth, sixth, seventh, tenth, eleventh, and fourteenth OFDM symbols (having respective indices 3, 5, 6, 9, 10, and 13) of a subframe. FIG. 36 shows the case in which the number of legacy CRSs is 2. The first DMRS and the second DMRS can be mapped to three OFDM symbols of the second, fourth, seventh, ninth, thirteenth, and fourteenth OFDM symbols (having respective indices 1, 3, 6, 8, 12, and 13) of a subframe. The DMRSs are mapped at intervals of three subcarriers in each OFDM symbol, and so the frequency offset can be one of 0 to 2 in each OFDM symbol.

FIGS. 37 to 40 show another example of DMRS patterns according to the proposed method of transmitting a reference signal. FIGS. 33 37 to 40 illustrate the cases in which in the normal CP, a first DMRS and a second DMRS are multiplexed through the FDM method and mapped over two OFDM symbols. The first DMRS and the second DMRS can be mapped to two OFDM symbols of the fourth, sixth, tenth, eleventh, thirteenth, and fourteenth OFDM symbols (having respective indices 3, 5, 9, 10, 12, and 13) of a subframe. The DMRSs are mapped at intervals of two subcarriers (FIGS. 37 and 38) or assigned to two consecutive subcarriers (FIGS. 39 and 40) in each OFDM symbol, and so the frequency offset can be one of 0 and 1 in each OFDM symbol.

Figure 41:
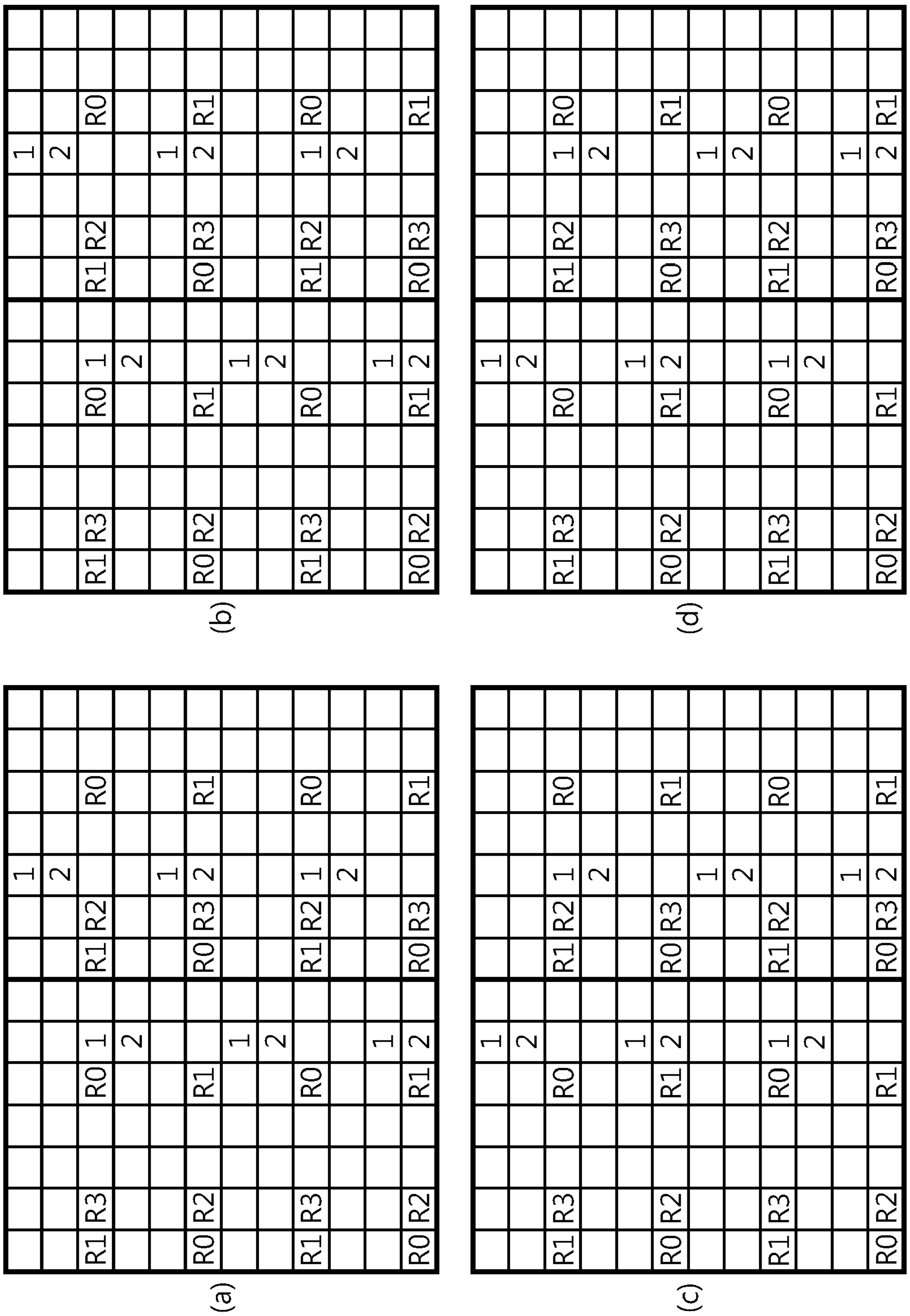

FIG. 41 shows another example of DMRS patterns according to the proposed method of transmitting a reference signal. In FIGS. 37 to 40, the frequency offset is illustrated to be 1 identically in the OFDM symbols to which the DMRSs are mapped, but a different frequency offset can be used in each OFDM symbol. In FIG. 41-(*a*), the frequency offset of a sixth OFDM symbol is 2, and the frequency offset of a tenth OFDM symbol is 0. In FIG. 41-(*b*), the frequency offset of a sixth OFDM symbol is 2, and the frequency offset of an eleventh OFDM symbol is 0. In FIG. 41-(*c*), the frequency offset of a sixth OFDM symbol is 0, and the frequency offset of a tenth OFDM symbol is 2. In FIG. 41-(*d*), the frequency offset of a sixth OFDM symbol is 0, and the frequency offset of an eleventh OFDM symbol is 2.

Figure 42:
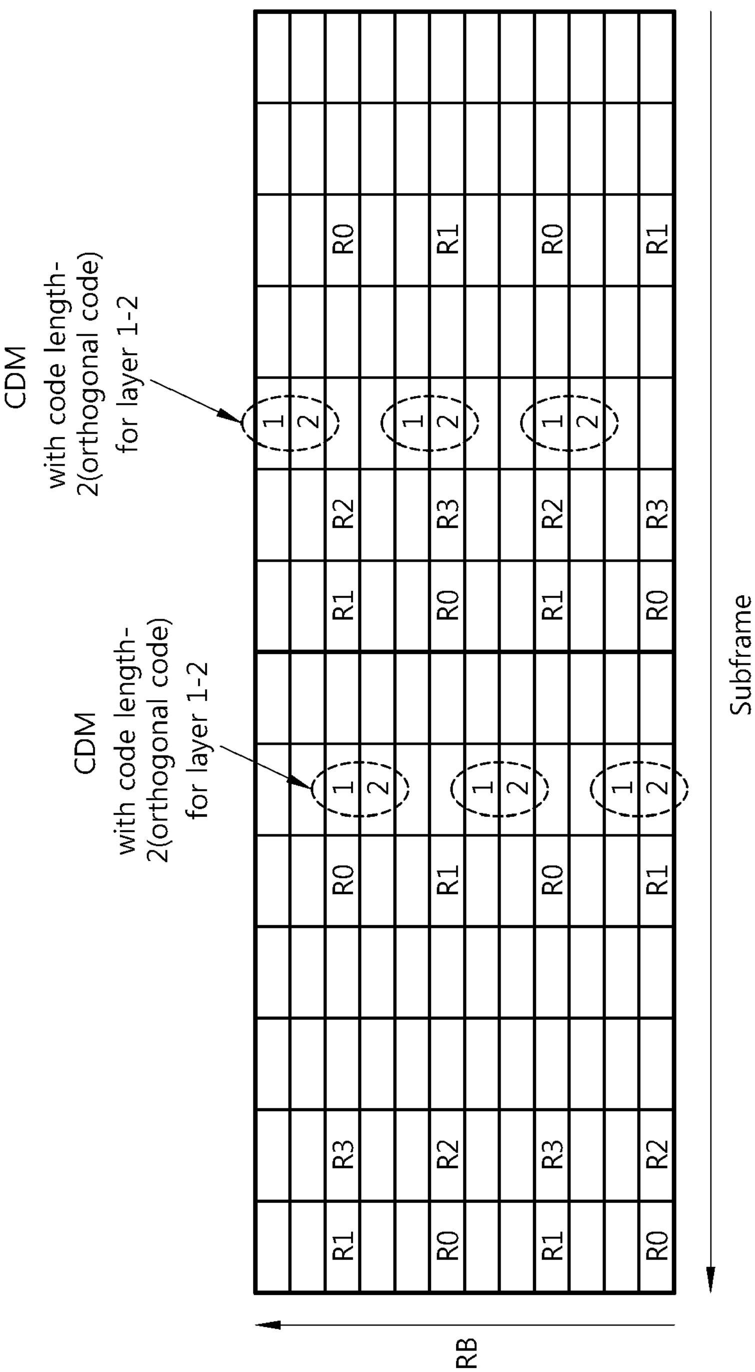

FIG. 42 shows another example of a DMRS pattern according to the proposed method of transmitting a reference signal. In the case in which a first DMRS and a second DMRS are mapped to two neighbor subcarriers as in FIGS. 39 and 40, the first DMRS and the second DMRS can be multiplexed through the CDM method and transmitted. Here, an orthogonal sequence having a length 2 can be used.

The DMRS patterns of FIGS. 41 and 42 can be DMRS patterns when OFDM symbols placed in the rear of a subframe (a maximum of four OFDM symbols) are used for other purposes.

Figure 43:
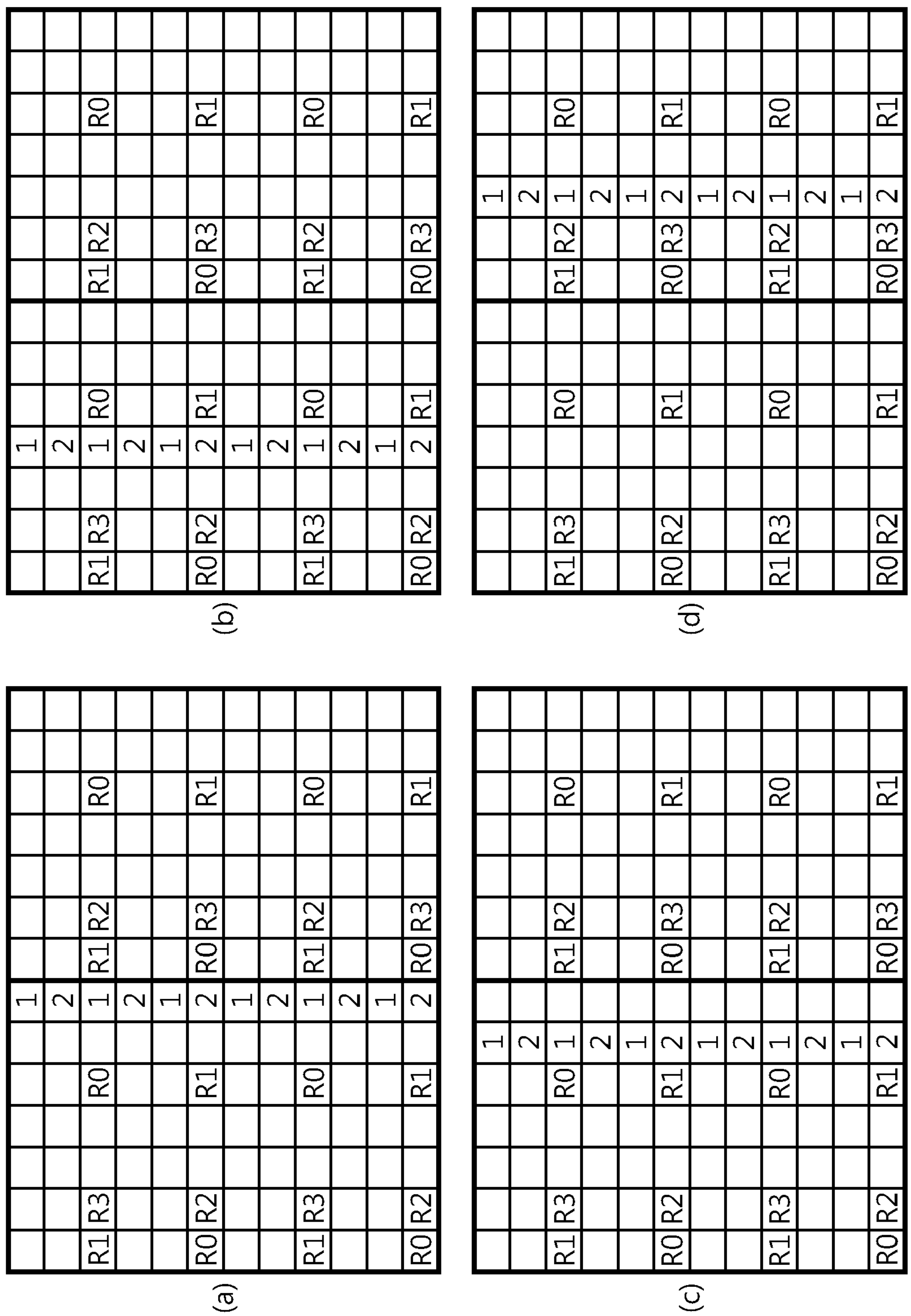
Figure 44:
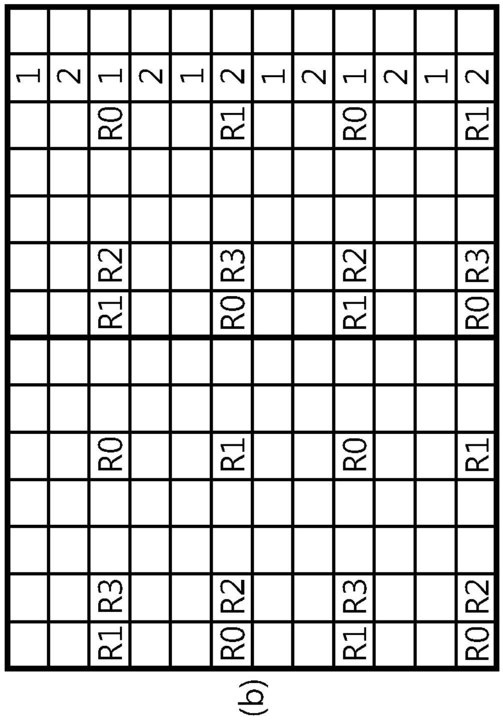
Figure 44:
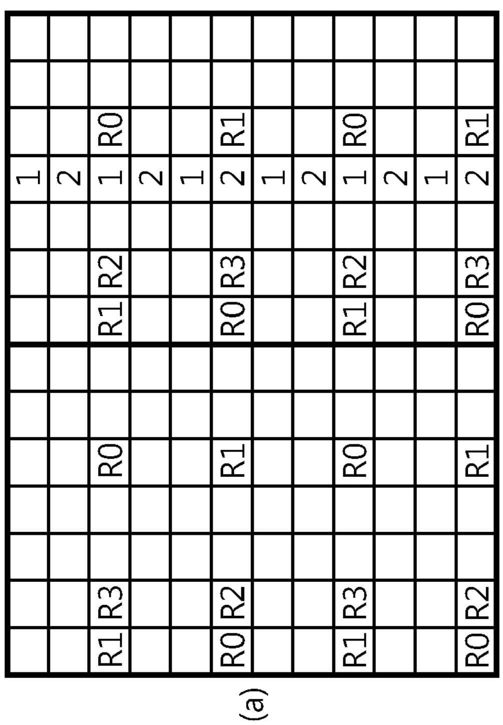

FIGS. 43 and 44 show another example of DMRS patterns according to the proposed method of transmitting a reference signal. FIGS. 43 and 44 illustrate the cases in which in the normal CP, a first DMRS and a second DMRS are multiplexed through the FDM method and mapped over one OFDM symbol. The first DMRS and the second DMRS can be mapped to one of the fourth, sixth, seventh, tenth, eleventh, and thirteenth OFDM symbols (having respective indices 3, 5, 6, 9, 10, and 12) of a subframe. The first DMRS and the second DMRS are alternately mapped for every subcarrier in each OFDM symbol.

Figure 45:
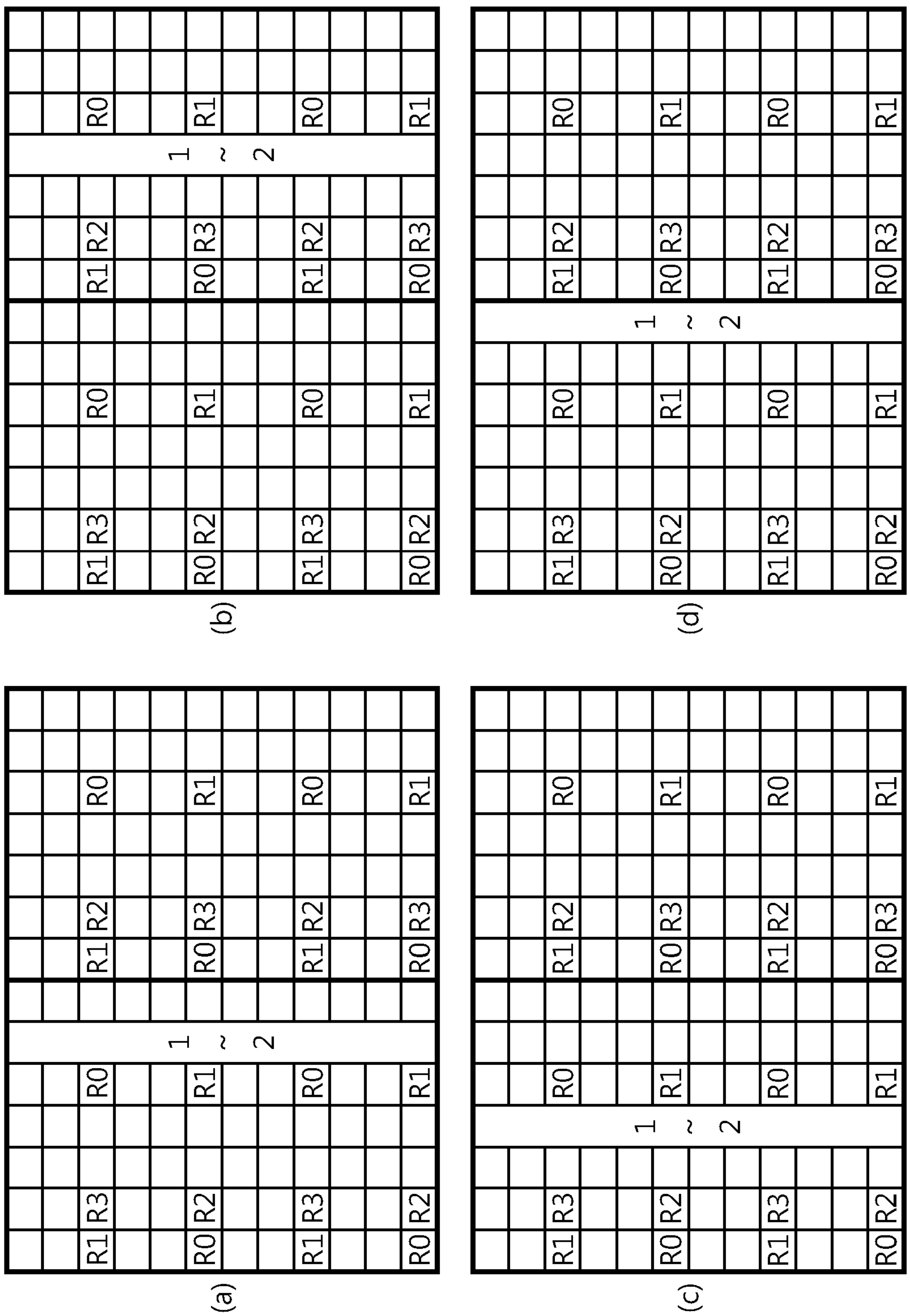
Figure 46:
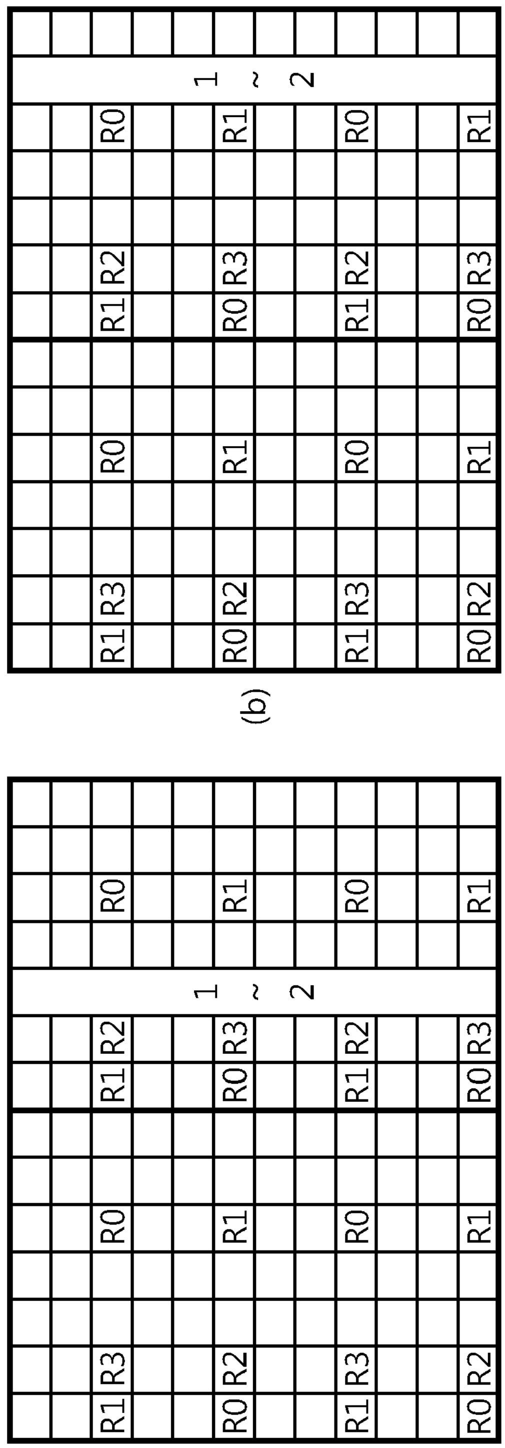

FIGS. 45 and 46 show another example of DMRS patterns according to the proposed method of transmitting a reference signal. FIGS. 45 and 46 illustrate the cases in which in the normal CP, a first DMRS and a second DMRS are multiplexed through the CDM method and mapped over one OFDM symbol. The first DMRS and the second DMRS can be mapped to one of the fourth, sixth, seventh, tenth, eleventh, and thirteenth OFDM symbols (having respective indices 3, 5, 6, 9, 10, and 12) of a subframe. In a corresponding OFDM symbol, the first DMRS and the second DMRS are mapped over all the subcarriers. To guarantee the performance of channel estimation within one subframe, a DMRS preferably is positioned in an OFDM symbol which is placed at the center of the subframe (e.g., an seventh OFDM symbol). If the seventh OFDM symbol is used for other purposes, the DMRS may be mapped to a sixth or ninth OFDM symbol.

Figure 47:
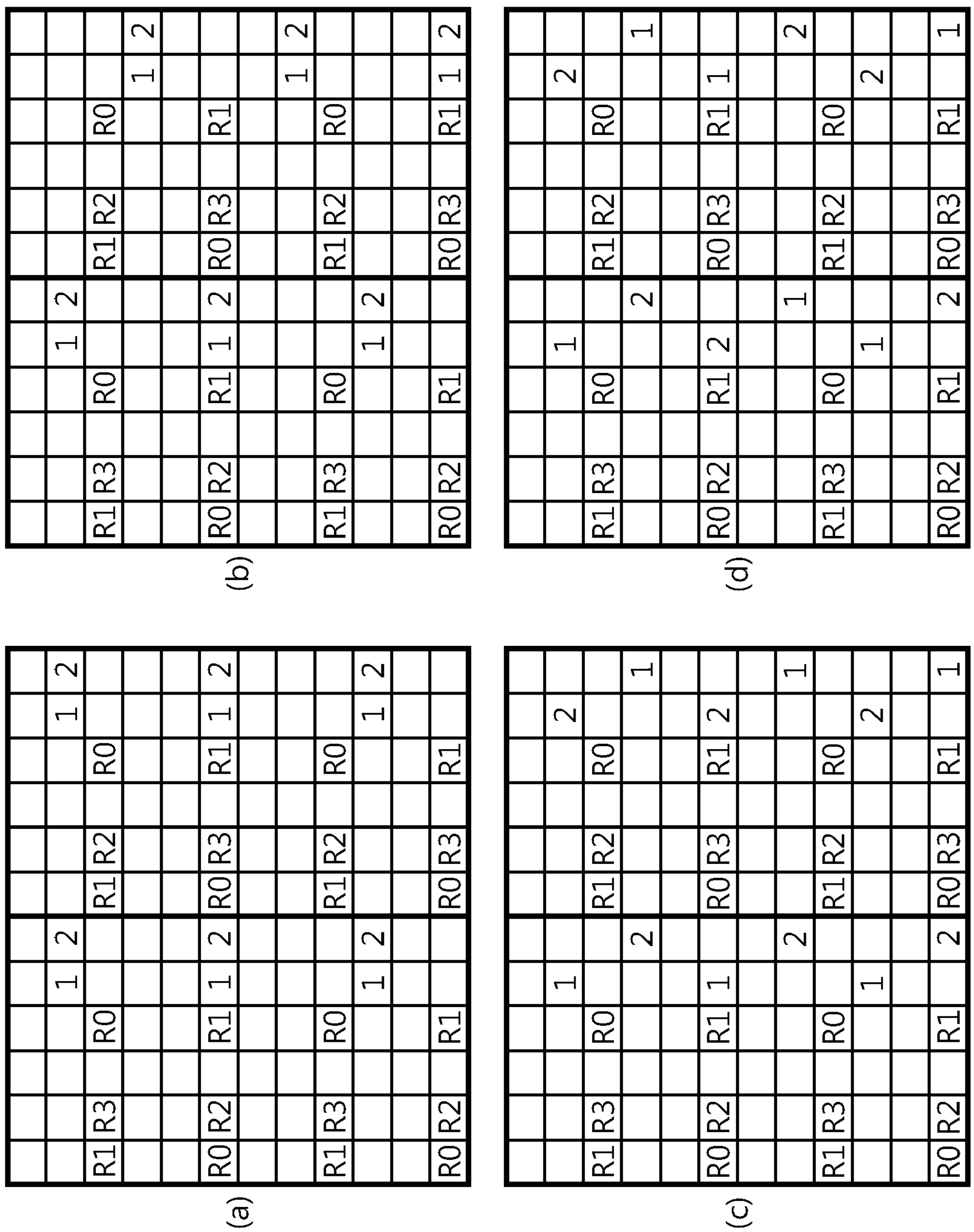
Figure 48:
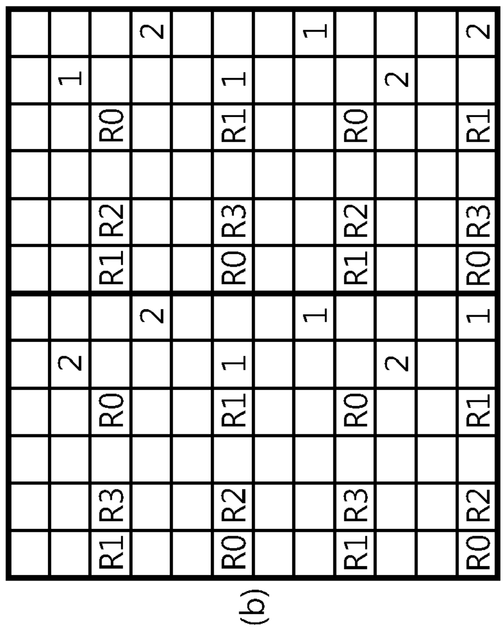
Figure 48:
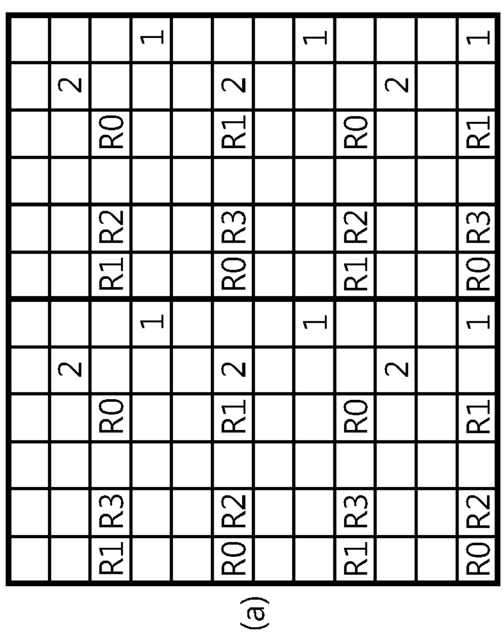

FIGS. 47 and 48 show example of DMRS patterns according to the proposed method of transmitting a reference signal. FIGS. 47 and 48 illustrate the cases in which in the extended CP, a first DMRS and a second DMRS are multiplexed through the FDM method and mapped over four OFDM symbols. The first DMRS and the second DMRS can be mapped to the fifth, sixth, eleventh, and twelfth OFDM symbols (having respective indices 4, 5, 10, and 11) of a subframe. The DMRSs are mapped at intervals of four subcarriers in each OFDM symbol. Accordingly, in each OFDM symbol, the frequency offset can be one of 0 to 3.

Figure 49:
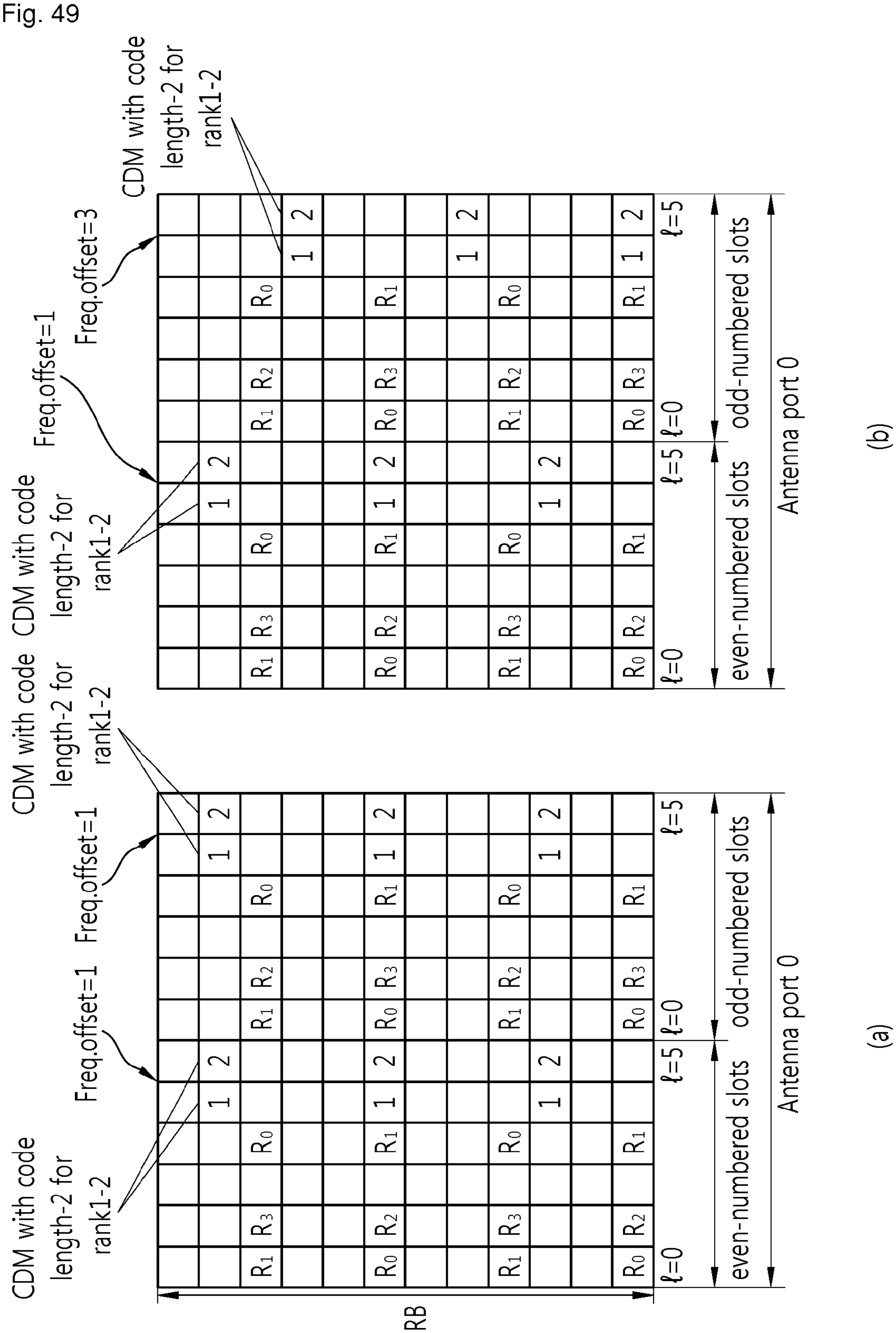

FIG. 49 shows another example of DMRS patterns according to the proposed method of transmitting a reference signal. In FIG. 49-(*a*), a first DMRS and a second DMRS are mapped to an OFDM symbol and a subcarrier, such as that shown in FIG. 47-(*a*). In FIG. 49-(*b*), a first DMRS and a second DMRS are mapped to an OFDM symbol and a subcarrier, such as that shown in FIG. 47-(*b*). However, the first DMRS and the second DMRS are multiplexed through the CDM method and mapped to two consecutive OFDM symbols. Here, the first DMRS and the second DMRS can be multiplexed through the CDM method using an orthogonal sequence having a length of 2.

Figure 50:
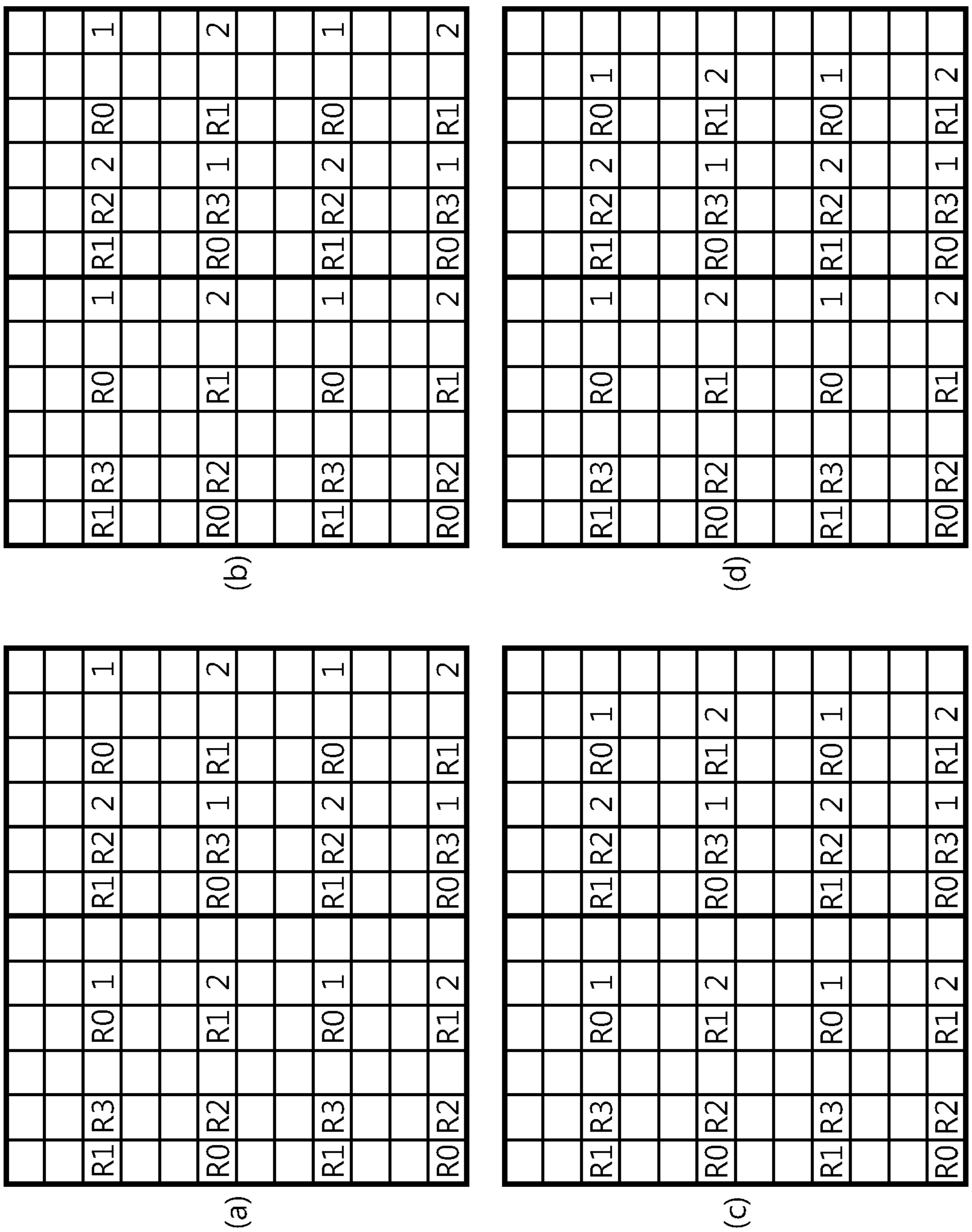
Figure 51:
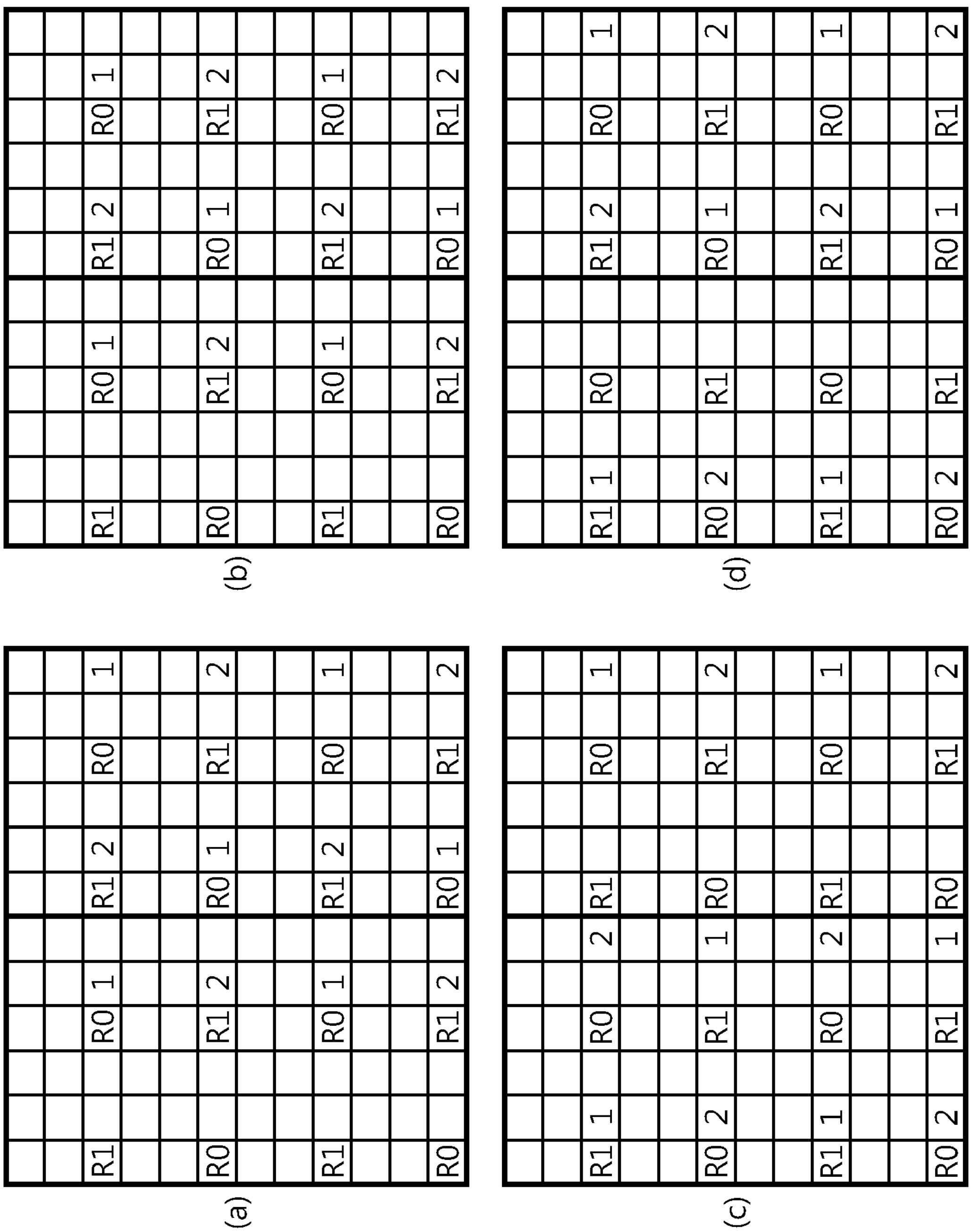

FIGS. 50 and 51 show another example of DMRS patterns according to the proposed method of transmitting a reference signal. FIGS. 50 and 51 illustrate the cases in which in the extended CP, a first DMRS and a second DMRS are multiplexed through the FDM method and mapped over three OFDM symbols. FIG. 50 shows the case in which the number of legacy CRSs is 4. The first DMRS and the second DMRS can be mapped to two OFDM symbols of the fifth, sixth, eleventh, and twelfth OFDM symbols (having respective indices 4, 5, 10, and 11) of a subframe. FIG. 51 shows the case in which the number of legacy CRSs is 2. The first DMRS and the second DMRS can be mapped to two OFDM symbols of the second, fifth, sixth, eighth, eleventh, and twelfth OFDM symbols (having respective indices 1, 4, 5, 7, 10, and 11) of a subframe. The DMRS are mapped at intervals of four subcarriers in each OFDM symbol, and so in each OFDM symbol, the frequency offset can be one of 0 to 2.

Figure 52:
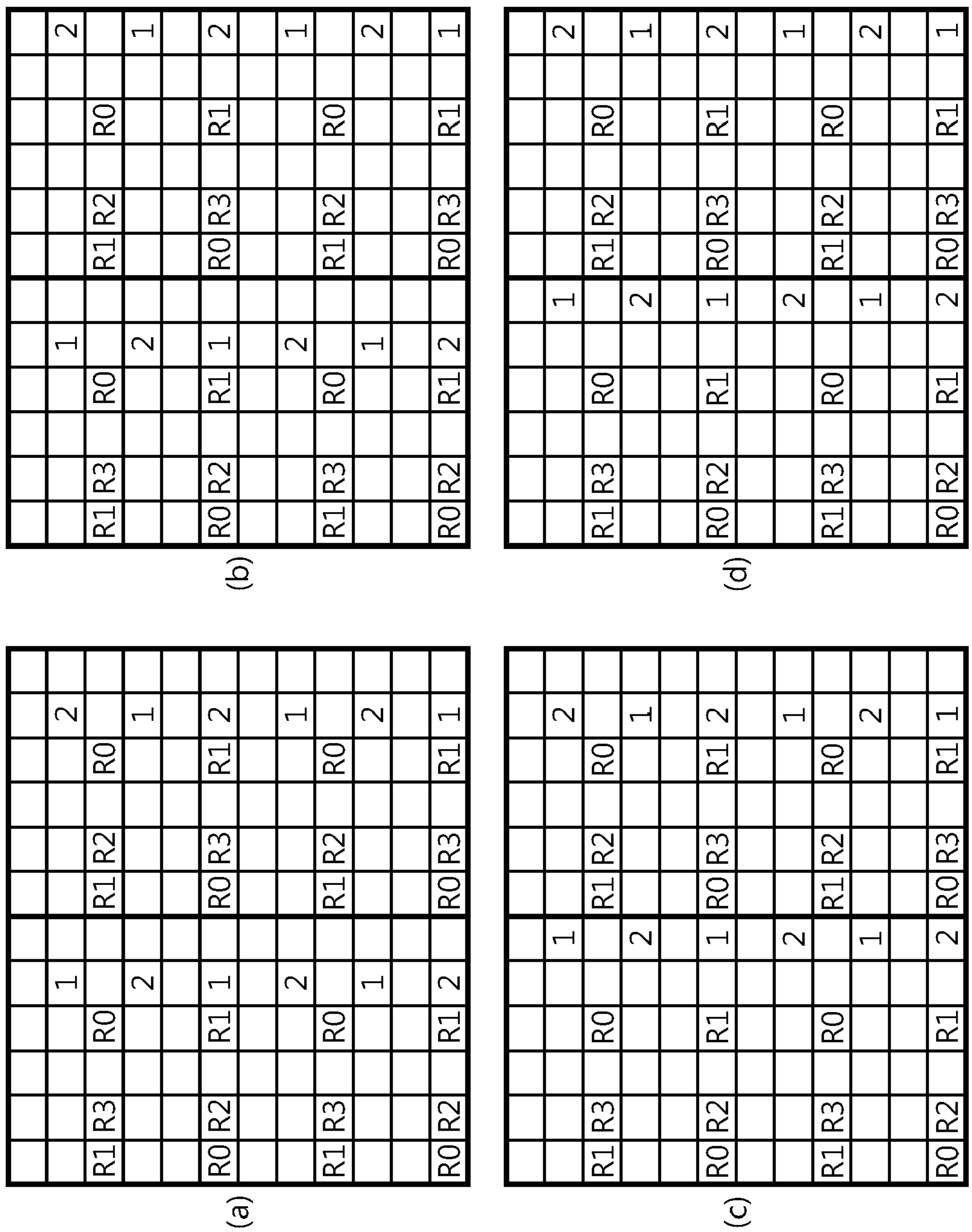
Figure 53:
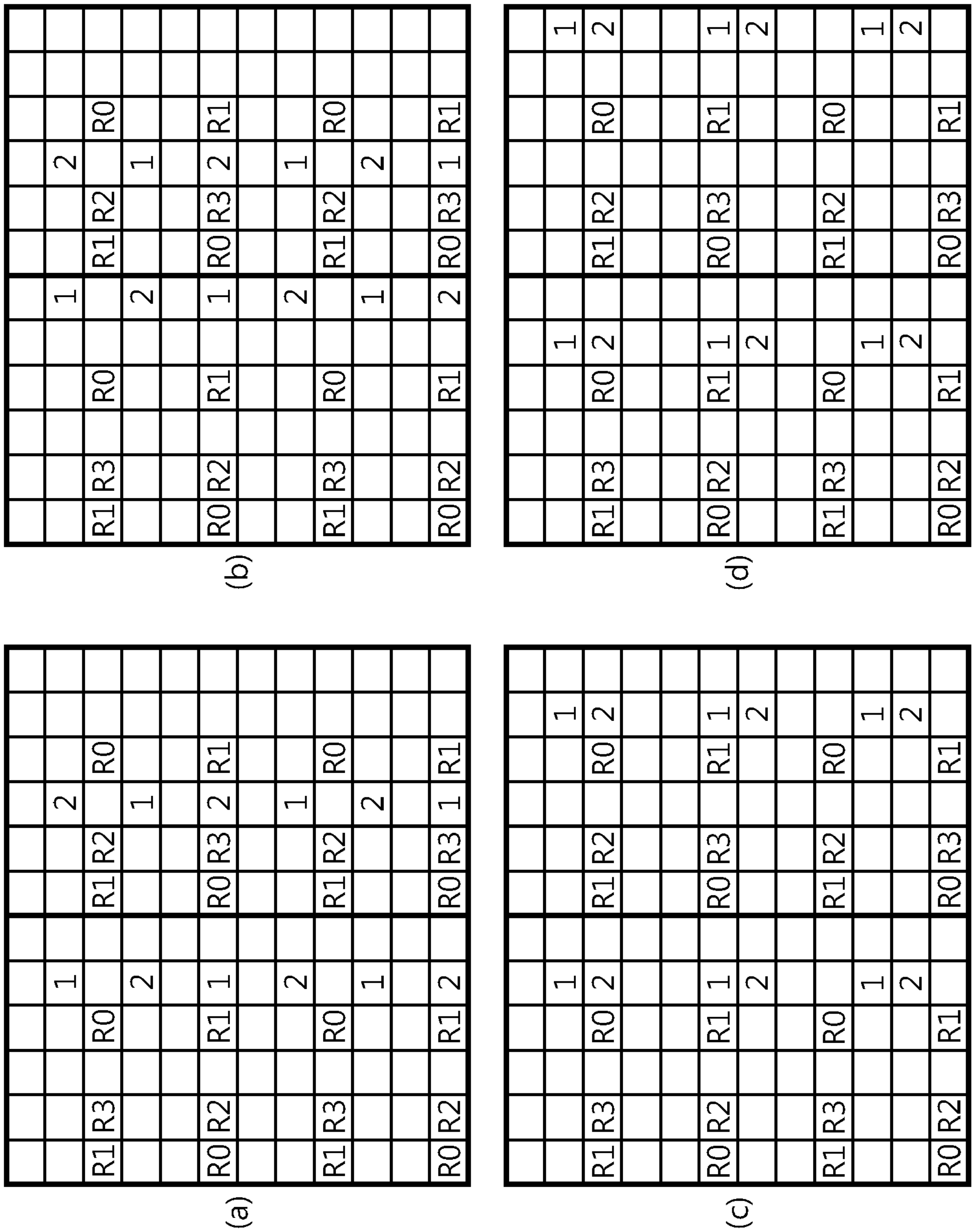
Figure 54:
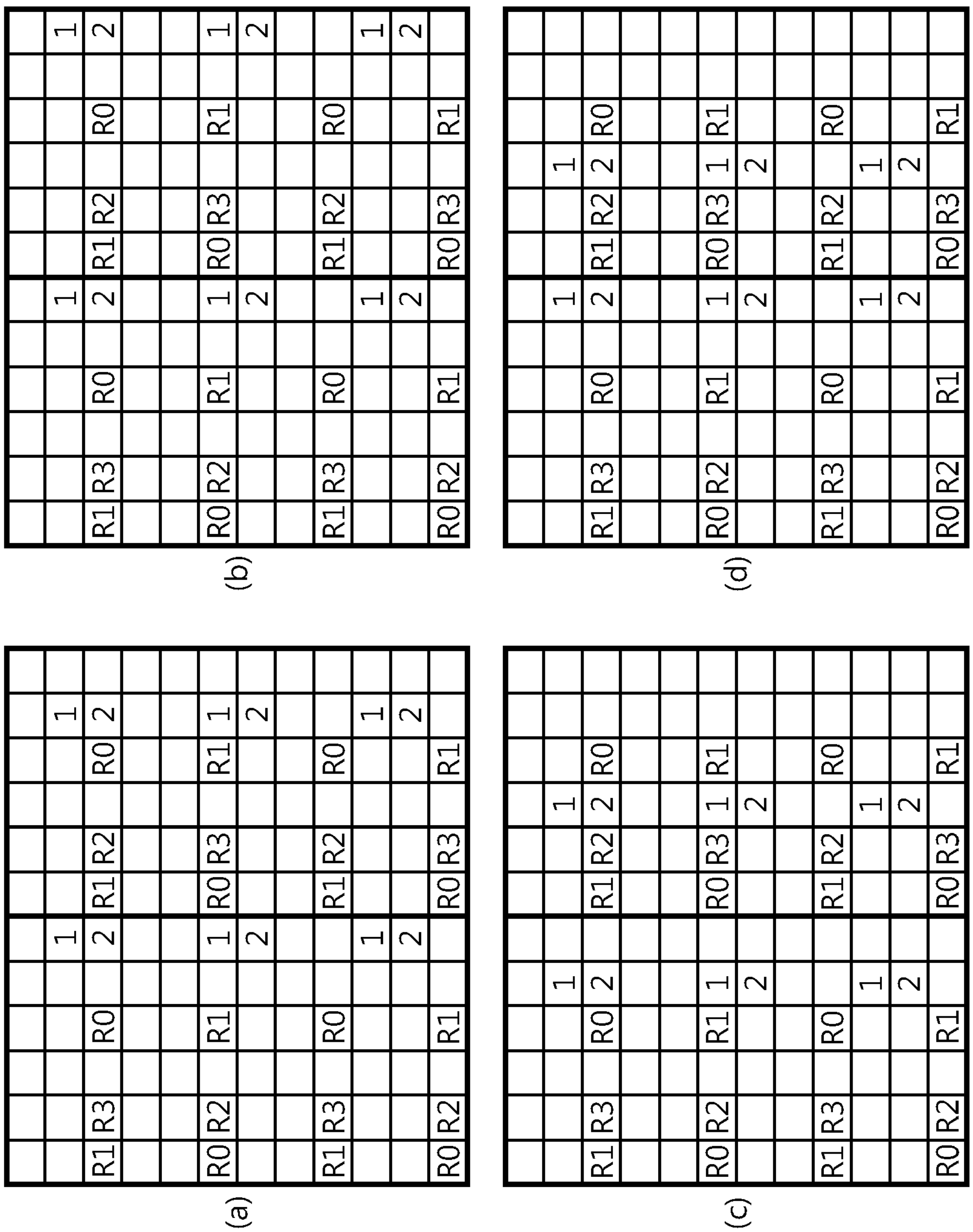

FIGS. 52 to 54 show another example of DMRS patterns according to the proposed method of transmitting a reference signal. FIGS. 52 to 54 illustrate the cases in which in the extended CP, a first DMRS and a second DMRS are multiplexed through the FDM method and mapped over two OFDM symbols. The first DMRS and the second DMRS can be mapped to two OFDM symbols of the fifth, sixth, ninth, eleventh, and twelfth OFDM symbols (having respective indices 4, 5, 8, 10, and 11) of a subframe. The DMRSs are mapped at intervals of three subcarriers in each OFDM symbol, and so in each OFDM symbol, the frequency offset can be one of 0 to 2.

Figure 55:
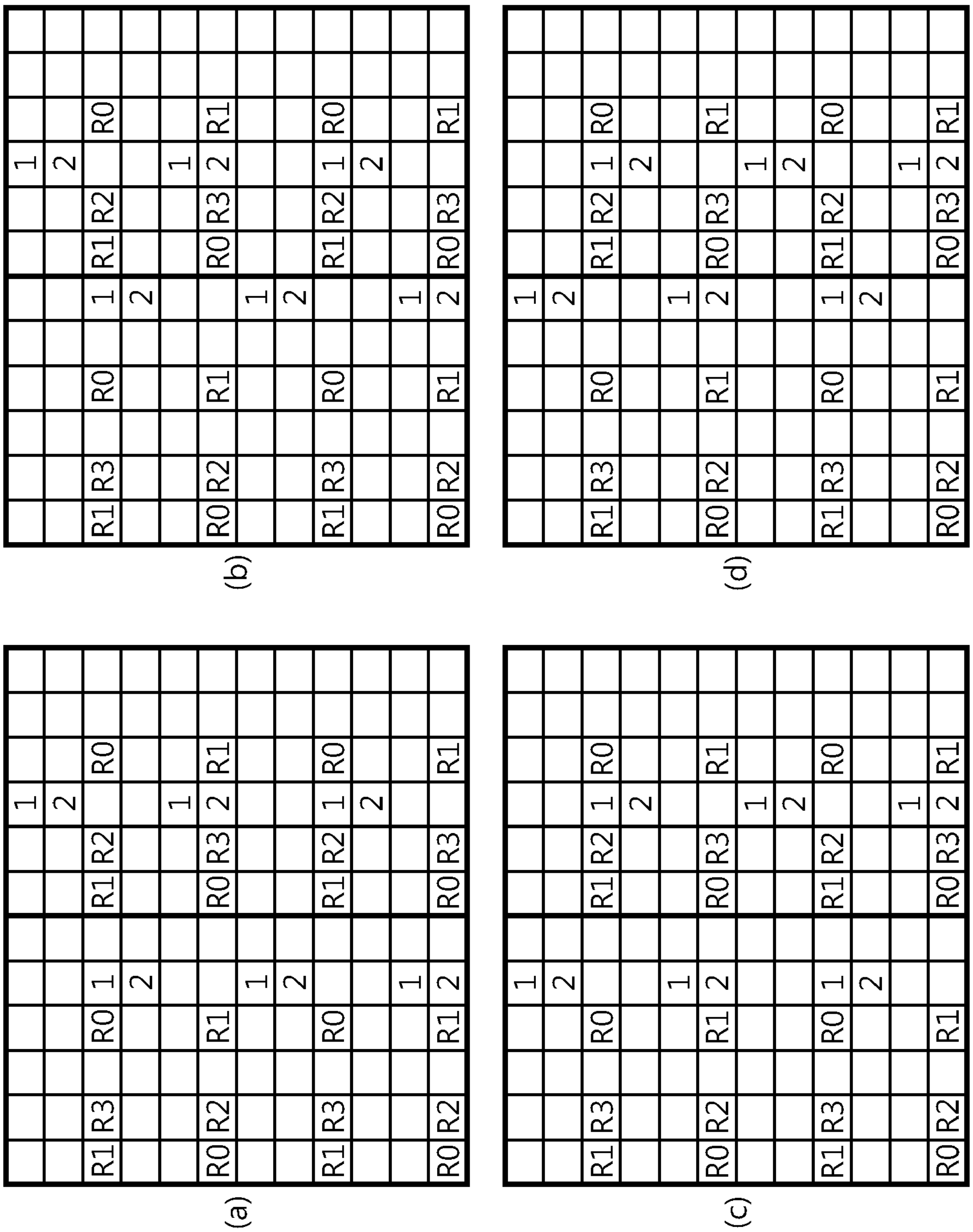

FIG. 55 shows another example of DMRS patterns according to the proposed method of transmitting a reference signal. In FIGS. 53-(*c*), 53-(*d*), and 54, the frequency offset is illustrated to be 1 identically in the OFDM symbols to which DMRSs are mapped, but a different frequency offset can be used in each OFDM symbol. In FIG. 55-(*a*), the frequency offset of a fifth OFDM symbol is 2, and the frequency offset of a ninth OFDM symbol is 0. In FIG. 55-(*b*), the frequency offset of a sixth OFDM symbol is 2, and the frequency offset of a ninth OFDM symbol is 0. In FIG. 55-(*c*), the frequency offset of a fifth OFDM symbol is 0, and the frequency offset of a ninth OFDM symbol is 2. In FIG. 55-(*d*), the frequency offset of a sixth OFDM symbol is 0, and the frequency offset of a ninth OFDM symbol is 2. Further, when the first DMRS and the second DMRS are mapped to neighbor subcarriers, they can be multiplexed through the CDM method using an orthogonal sequence having a length of 2. The DMRS pattern of FIG. 55 can be a DMRS pattern when OFDM symbols placed in the rear of a subframe (a maximum of four OFDM symbols) are used for other purposes.

The DMRSs (a third DMRS to an eighth DMRS) of a third rank to an eighth rank can be additionally mapped to a resource region in which the first DMRS and the second DMRS are mapped. The third DMRS to the eighth DMRS additionally mapped to the first DMRS and the second DMRS can be multiplexed through the TDM method. Further, each of the third DMRS to the eighth DMRS can be multiplexed through the CDM or FDM/CDM hybrid method. In examples described hereinafter, in the case in which a plurality of rank indices is represented in one resource element, it means that the DMRSs of corresponding ranks are multiplexed through the CDM method. In the case in which the DMRSs of corresponding ranks are multiplexed through the CDM method, an orthogonal sequence needs to be used as a DMRS sequence. Various kinds of sequences, such as Walsh codes, DFT coefficients, and CAZAC sequences, can be used as the orthogonal sequences. For example, a Walsh code (having a length of 2 or 4), a DFT matrix (having a length of 2 to 4), or a CAZAC sequence (having a length of N) can be used as the orthogonal sequence depending on the number of OFDM symbols to which DMRSs are mapped (but when the number of OFDM symbols is 2 or more). If the number of OFDM symbols to which DMRSs are mapped is 1, a CAZAC sequence having a length of 12 can be used as the orthogonal sequence in the frequency domain. Further, in the case in which the third DMRS to the eighth DMRS are multiplexed through the CDM method, a CAZAC sequence, a CG sequence, and a PN sequence can be used as the orthogonal sequence. Multiplexing between the ranks can be performed by assigning a different cyclic shift to each rank.

Further, in the following examples, the DMRS pattern of a third DMRS to an eighth DMRS can be formed on the basis of any one of the DMRS patterns shown in FIGS. 33 to 55, but may be formed on the basis of other DMRS patterns described with reference to FIGS. 33 to 55. In the following examples, numbers 1 to 8 indicate the number of ranks or layers, and the corresponding number does not indicate the index of a rank or a layer. For example, a number 3~4 means that the DMRSs of two different ranks or layers are multiplexed through the CDM method and transmitted in one resource element, but is not limited to that the DMRSs of a rank 3 to a rank 4 are transmitted. The DMRSs of a rank 5 and a rank 6 can be transmitted or the DMRSs of two different antennas can be transmitted. In general, in order to guarantee the performance of channel estimation within one subframe, a DMRS preferably is positioned in an OFDM symbol which is placed at the center of a subframe (e.g., a seventh OFDM symbol). If the seventh OFDM symbol is used for other purposes, the DMRS may be mapped to a sixth or ninth OFDM symbol.

Figure 56:
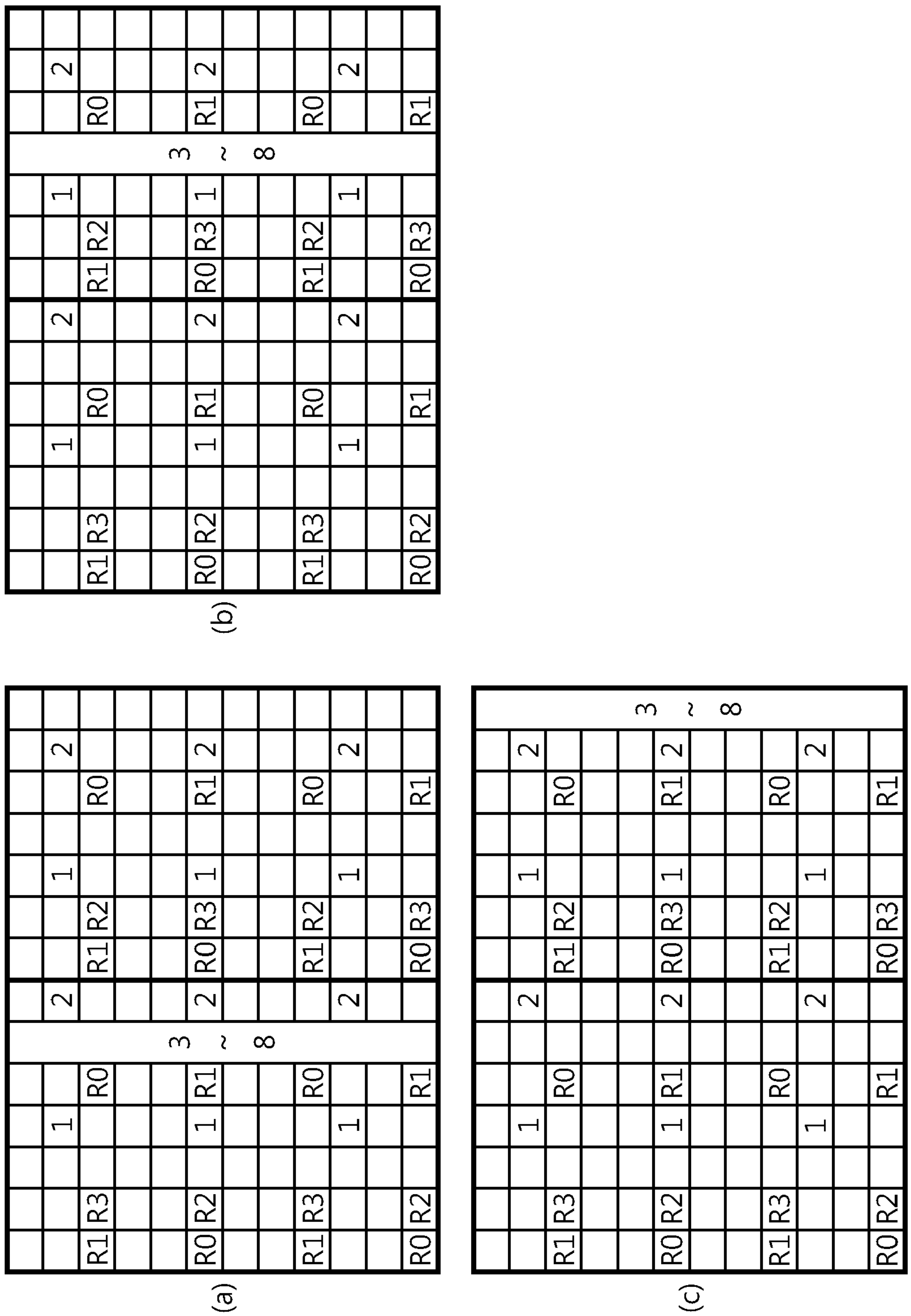

FIG. 56 shows another example of DMRS patterns according to the proposed method of transmitting a reference signal. FIG. 56 illustrates the case in which in the normal CP, a first DMRS and a second DMRS are mapped over four OFDM symbols and a third DMRS to an eighth DMRS are multiplexed through the CDM method in one OFDM symbol. The first DMRS and the second DMRS can be multiplexed through the FDM method and mapped to the fourth, seventh, tenth, and thirteenth OFDM symbols (having respective indices 3, 6, 9, and 12) of a subframe. In a corresponding OFDM symbol, the DMRSs can be mapped at intervals of four subcarriers. The third DMRS to the eighth DMRS can be mapped to one of sixth, eleventh, and fourteenth OFDM symbols (having respective indices 5, 10, and 13).

Figure 57:
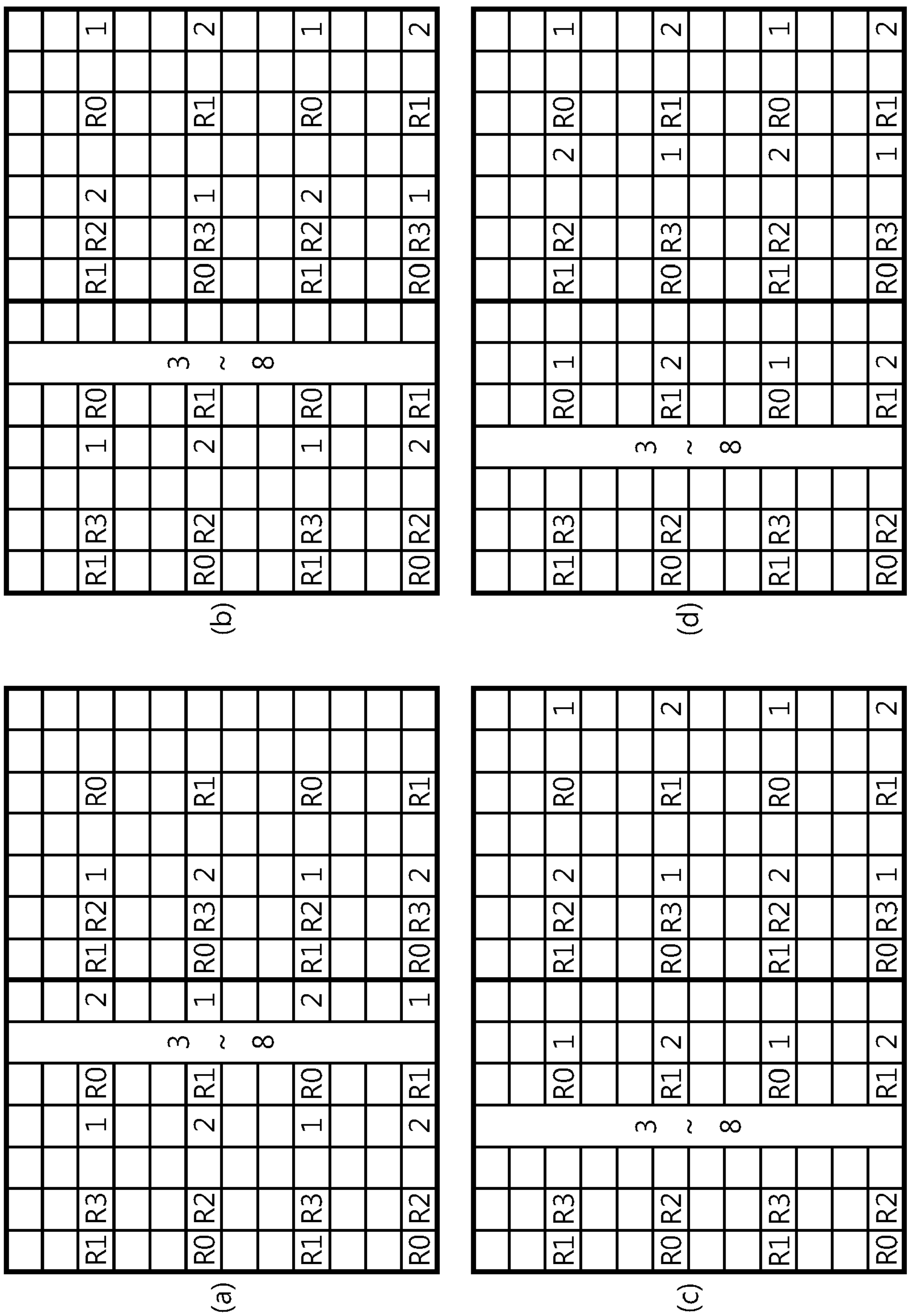
Figure 58:
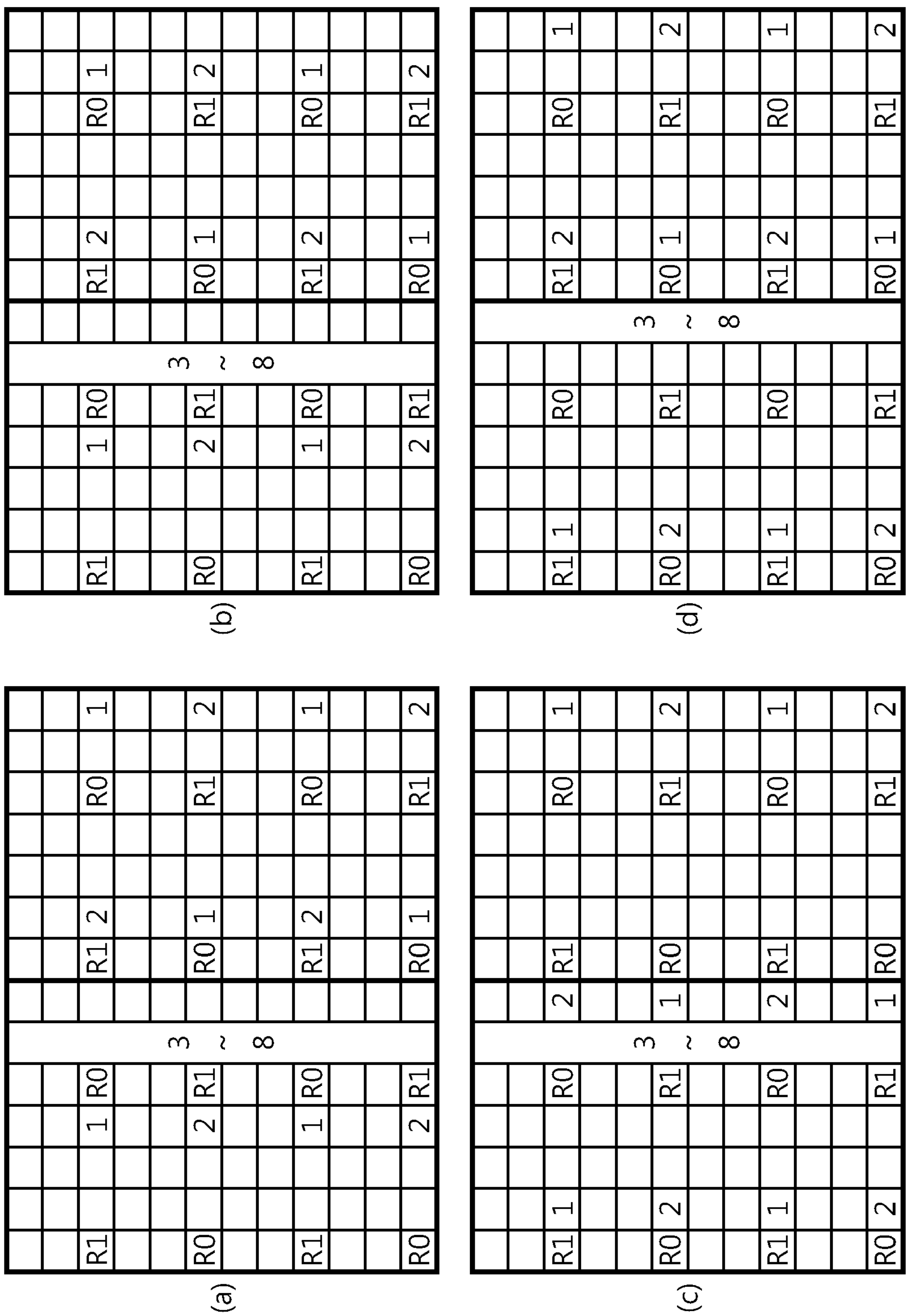

FIGS. 57 and 58 show another example of DMRS patterns according to the proposed method of transmitting a reference signal. FIGS. 57 and 58 illustrate the cases in which in the normal CP, a first DMRS and a second DMRS are mapped over three OFDM symbols and a third DMRS to an eighth DMRS are multiplexed through the CDM method in one OFDM symbol. FIG. 57 shows the case in which the number of legacy CRSs is 4. The first DMRS and the second DMRS can be multiplexed through the FDM method and mapped to three OFDM symbols of the fourth, sixth, seventh, tenth, eleventh, and fourteenth OFDM symbols (having respective indices 3, 5, 6, 9, 10, and 13) of a subframe. In a corresponding OFDM symbol, the DMRSs can be mapped at intervals of three subcarriers. The third DMRS to the eighth DMRS can be mapped to one of OFDM symbols to which the first DMRS and the second DMRS are not mapped and in which a PDCCH is not transmitted. FIG. 58 shows the case in which the number of legacy CRSs is 2. The first DMRS and the second DMRS can be multiplexed through the FDM method and mapped to three OFDM symbols of the second, fourth, seventh, ninth, thirteenth, and fourteenth OFDM symbols (having respective indices 1, 3, 6, 8, 12, and 13) of a subframe. In a corresponding OFDM symbol, the DMRSs can be mapped at intervals of three subcarriers. The third DMRS to the eighth DMRS can be mapped to one of OFDM symbols to which a legacy CRS, the first DMRS, and the second DMRS are not mapped and in which a PDCCH is not transmitted.

Figure 59:
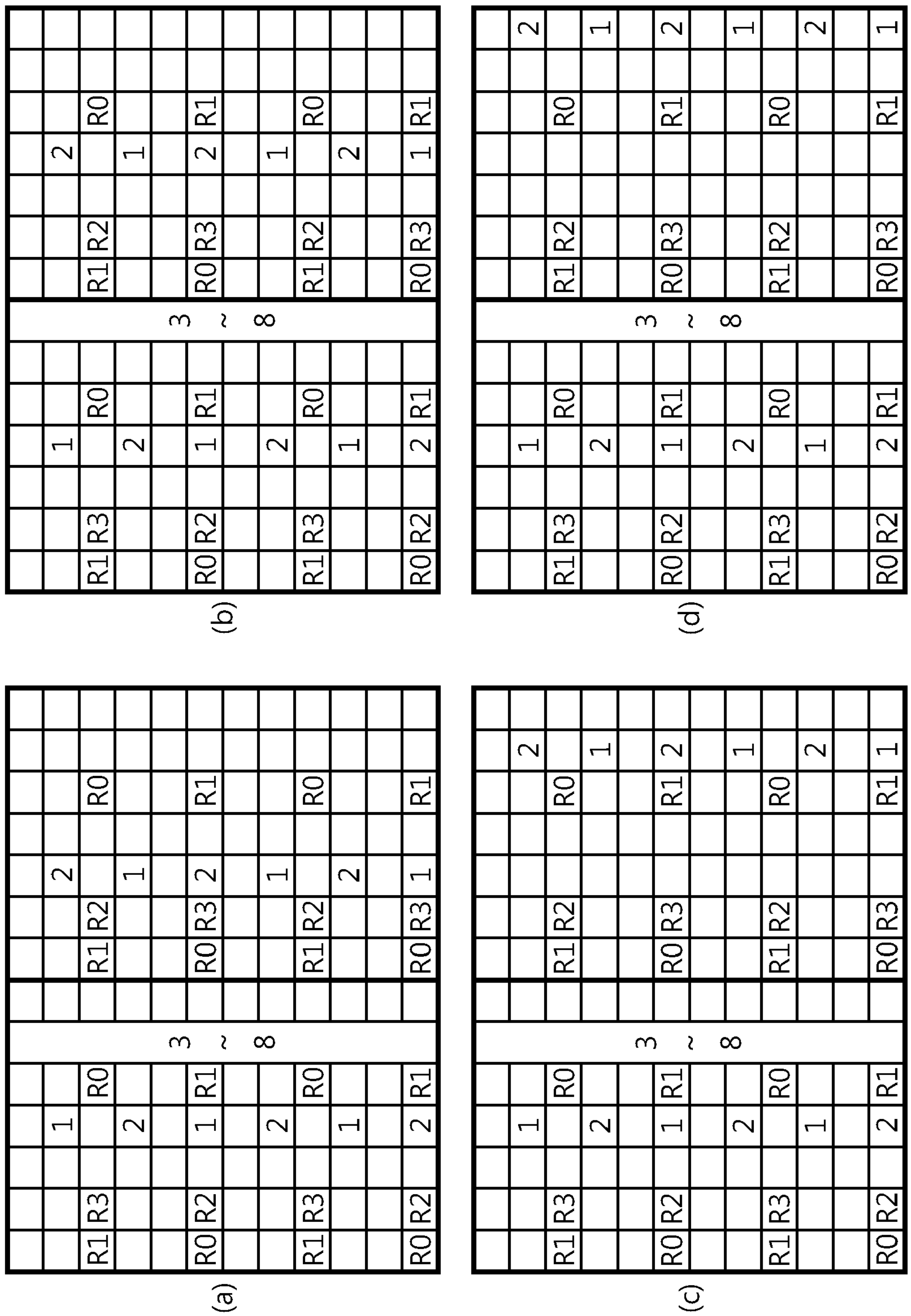
Figure 60:
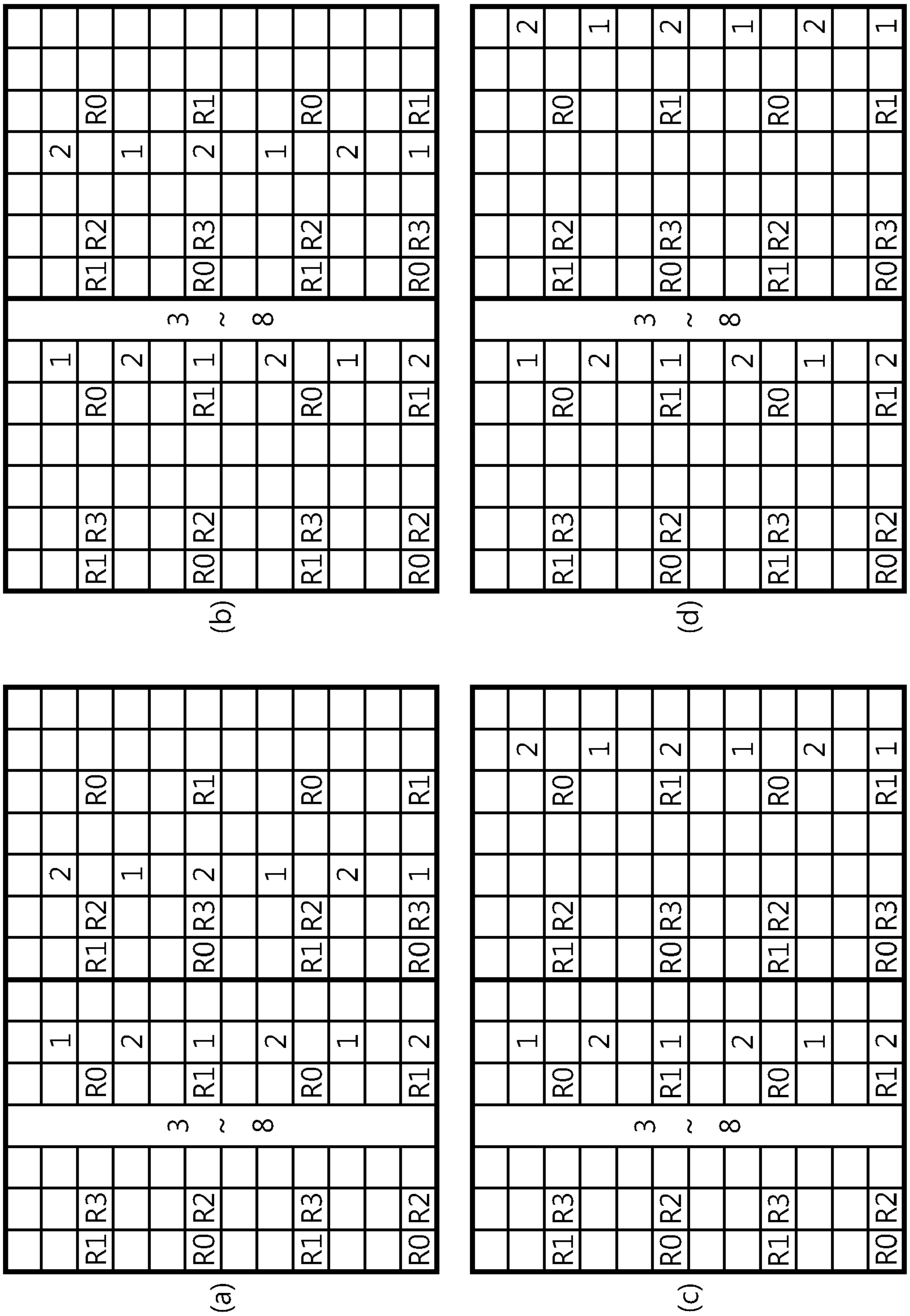
Figure 61:
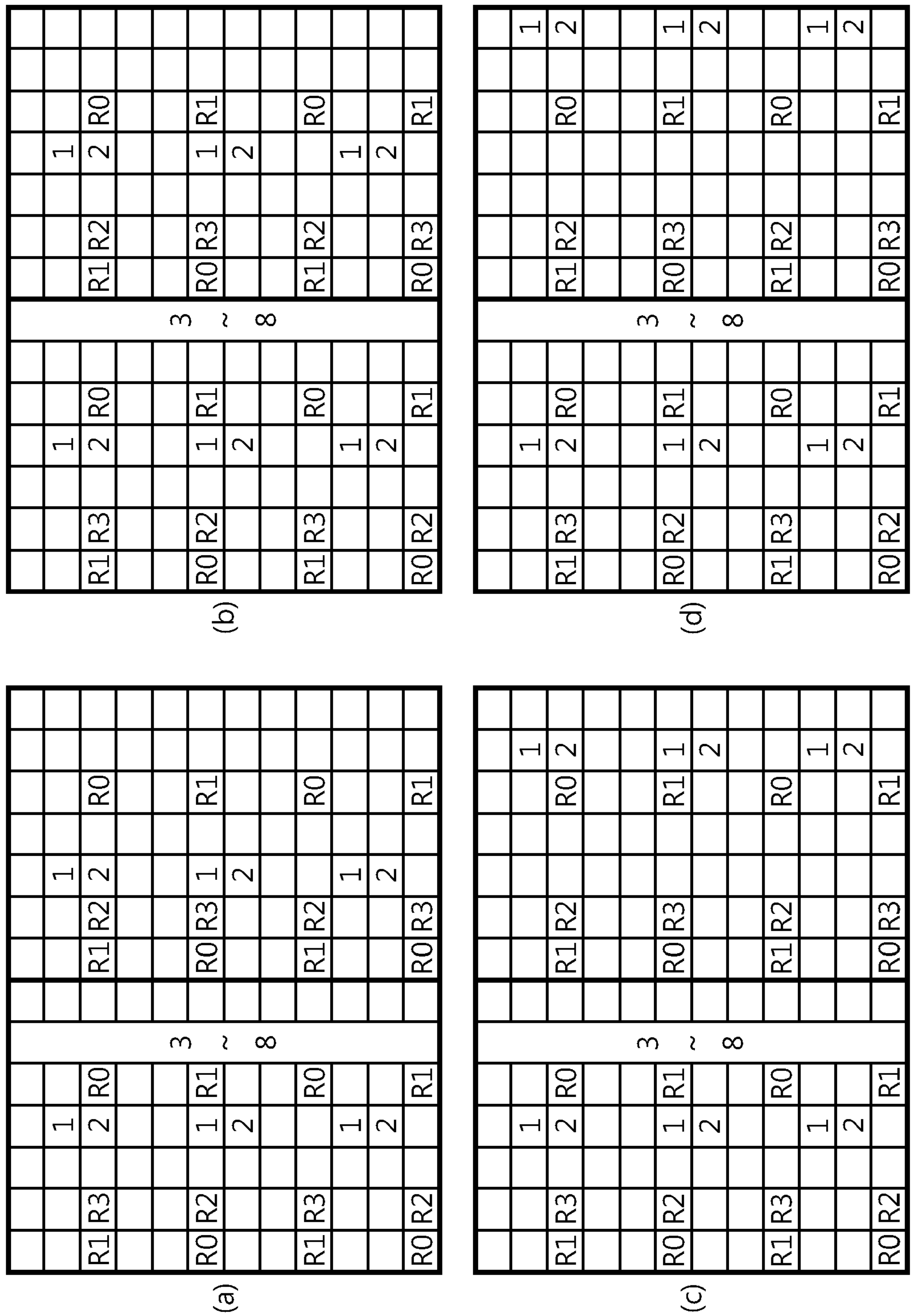
Figure 62:
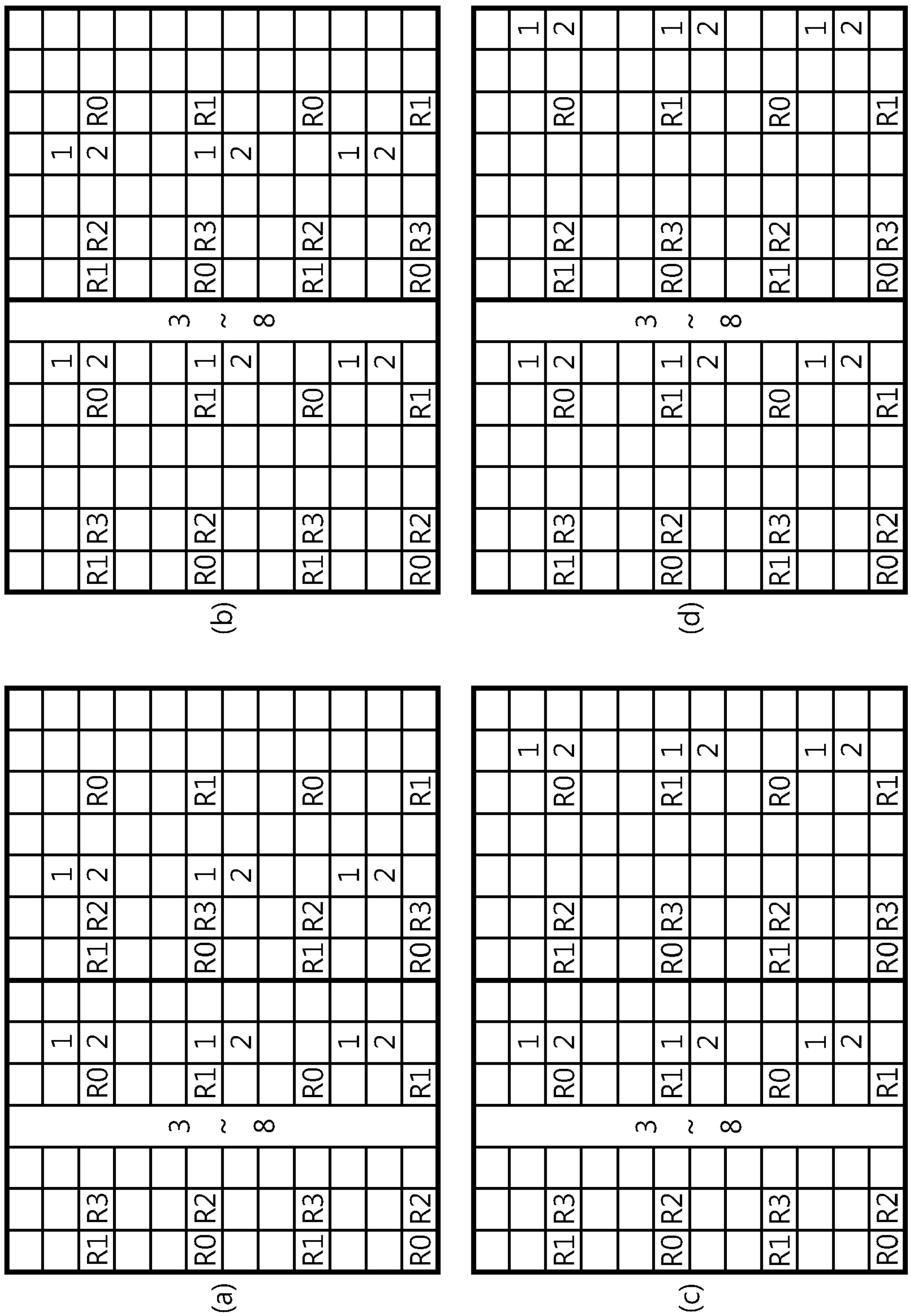

FIGS. 59 to 62 show another example of DMRS patterns according to the proposed method of transmitting a reference signal. FIGS. 59 and 62 illustrate the cases in which in the normal CP, a first DMRS and a second DMRS are mapped over two OFDM symbols and a third DMRS to an eighth DMRS are multiplexed through the CDM method in one OFDM symbol. The first DMRS and the second DMRS can be multiplexed through the FDM method and mapped to two OFDM symbols of the fourth, sixth, tenth, eleventh, thirteenth, and fourteenth OFDM symbols (having respective indices 3, 5, 9, 10, 12, and 13) of a subframe. In a corresponding OFDM symbol, the DMRS can be mapped at intervals of two subcarriers or can be mapped to two consecutive subcarriers. The third DMRS to the eighth DMRS can be mapped to one of OFDM symbols to which a legacy CRS, the first DMRS, and the second DMRS are not mapped and in which a PDCCH is not transmitted.

Figure 63:
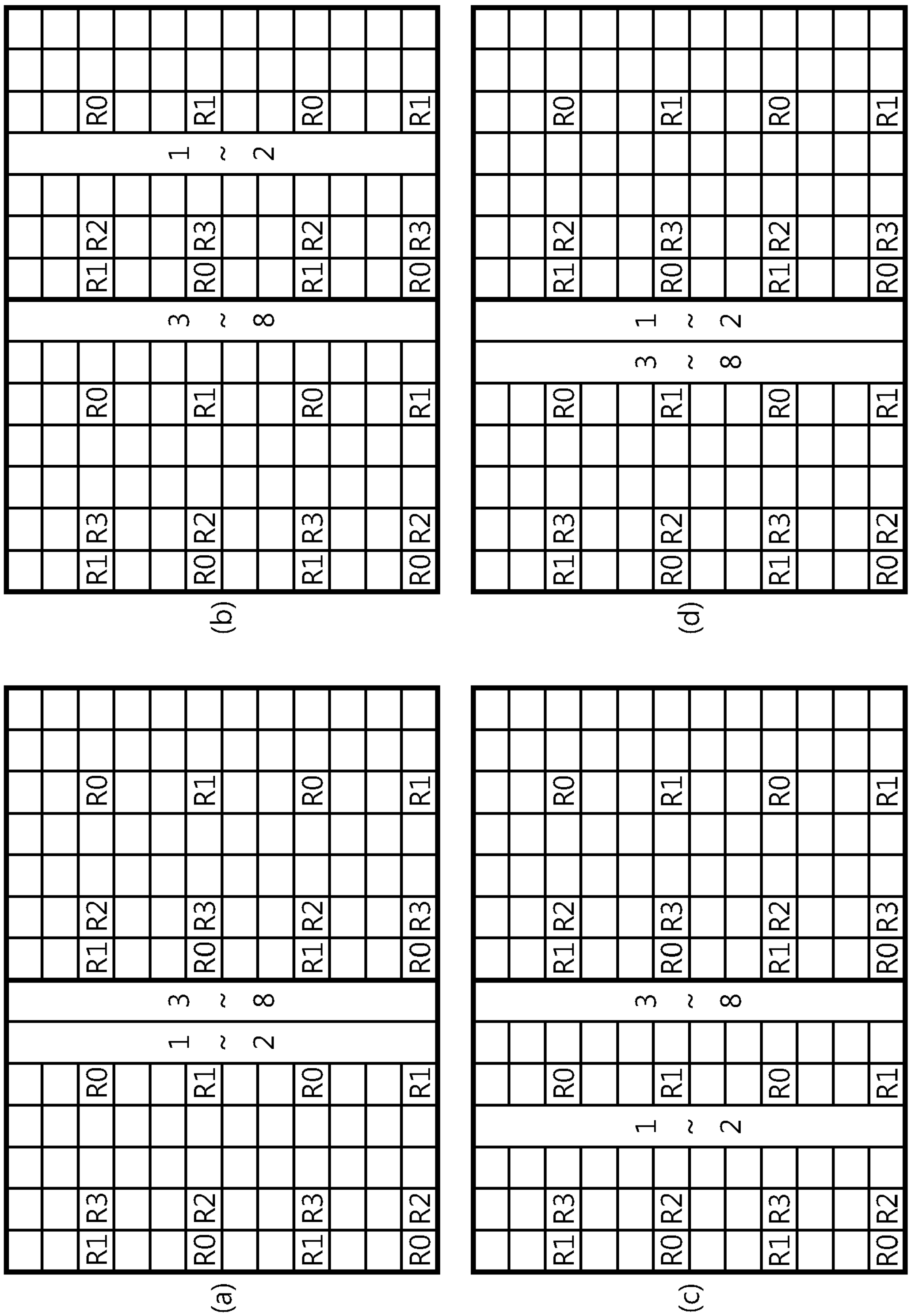
Figure 64:
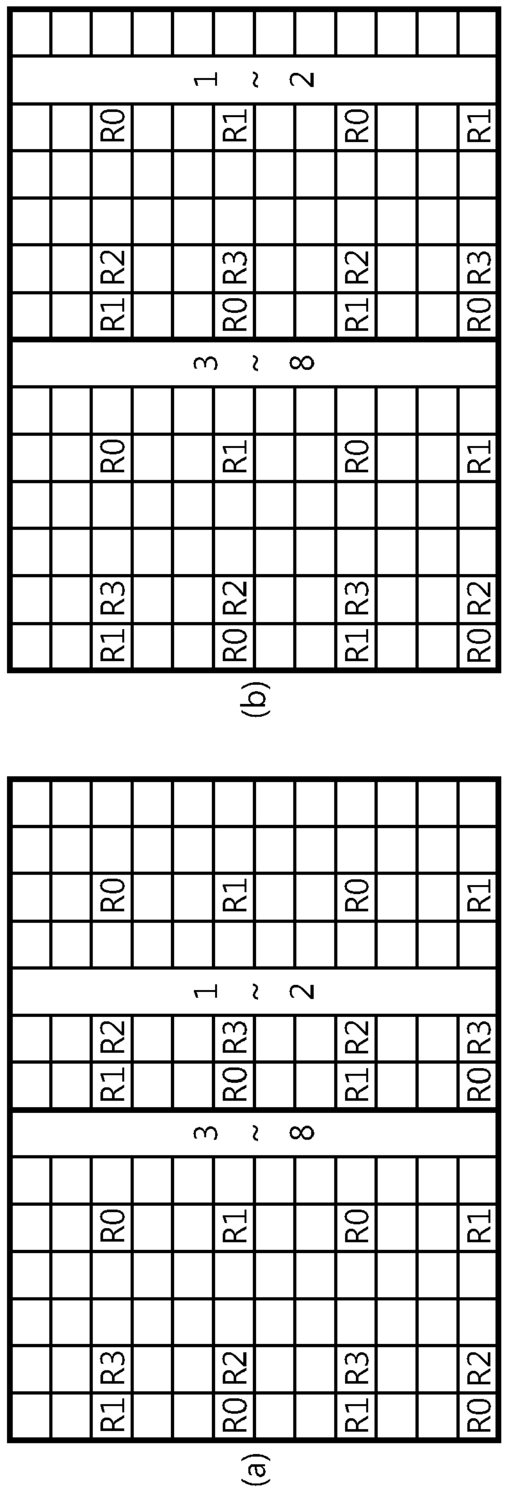

FIGS. 63 and 64 show another example of DMRS patterns according to the proposed method of transmitting a reference signal. FIGS. 63 and 64 illustrate the cases in which in the normal CP, a first DMRS and a second DMRS are mapped over one OFDM symbol and a third DMRS to an eighth DMRS are multiplexed through the CDM method in one OFDM symbol. The first DMRS and the second DMRS can be multiplexed through the CDM method and mapped to one of the fourth, sixth, seventh, tenth, eleventh, and thirteenth OFDM symbols (having respective indices 3, 5, 6, 9, 10, and 12) of a subframe. The third DMRS to the eighth DMRS can be mapped to one of OFDM symbols to which a legacy CRS, the first DMRS, and the second DMRS are not mapped and in which a PDCCH is not transmitted.

Figure 65:
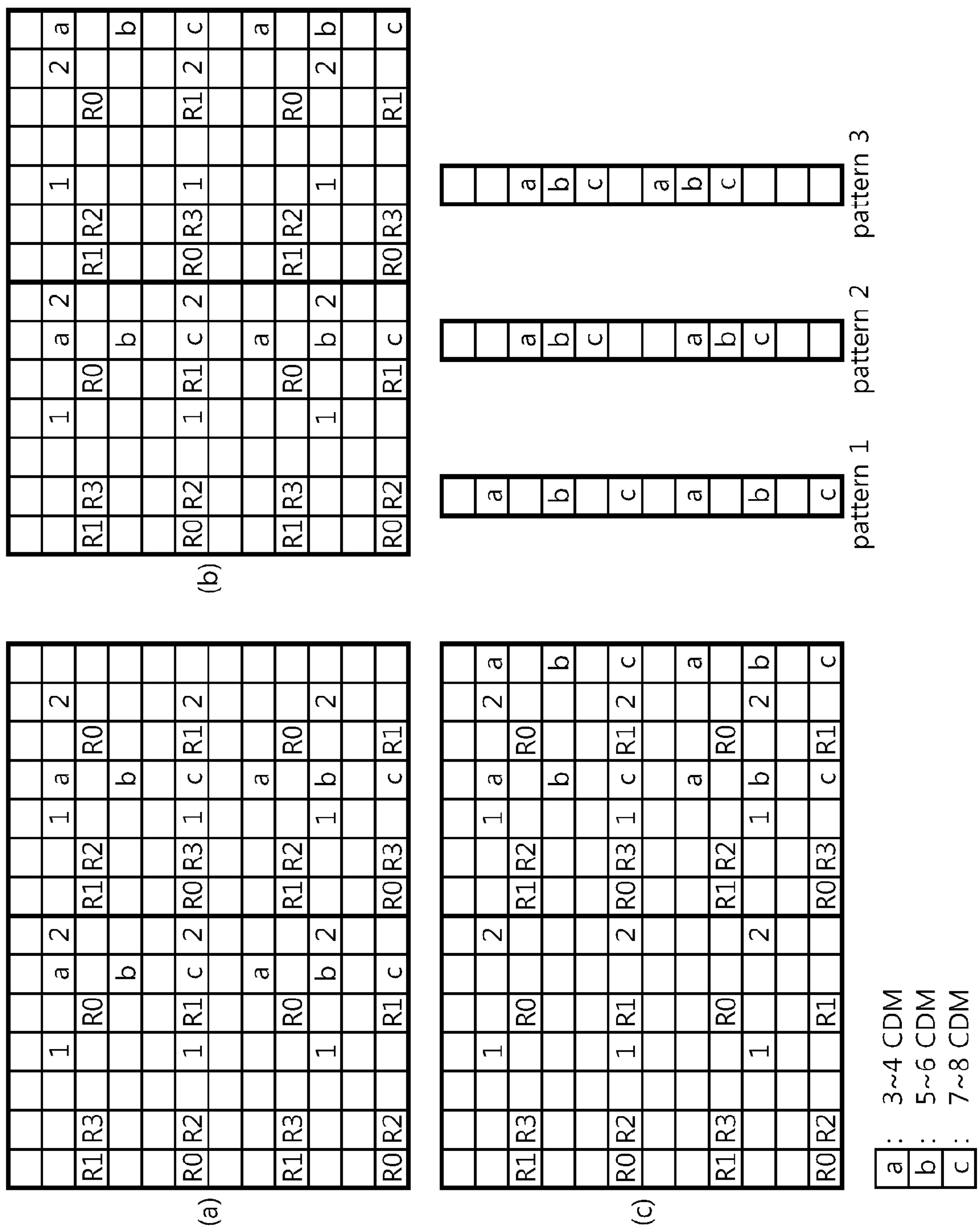

FIG. 65 shows another example of DMRS patterns according to the proposed method of transmitting a reference signal. FIG. 65 illustrates the case in which in the normal CP, a first DMRS and a second DMRS are mapped over four OFDM symbol and a third DMRS to an eighth DMRS are multiplexed through the FDM/CDM hybrid method in two OFDM symbols. The first DMRS and the second DMRS can be multiplexed through the FDM method and mapped to the fourth, seventh, tenth, and thirteenth OFDM symbols (having respective indices 3, 6, 9, and 12) of a subframe. In a corresponding OFDM symbol, the DMRSs are mapped at intervals of four subcarriers. The third DMRS to the eighth DMRS can be mapped to two OFDM symbols of the OFDM symbols to which a legacy CRS, the first DMRS, and the second DMRS are not mapped and in which a PDCCH is not transmitted. In each OFDM symbol, the DMRS of an antenna group, including two of a third antenna to an eighth antenna, can be multiplexed through the CDM method using a Walsh code which has a length of 2, and then mapped. The position of a subcarrier mapped in each OFDM symbol can comply with one of the three patterns shown in FIG. 65-(*d*).

Figure 66:
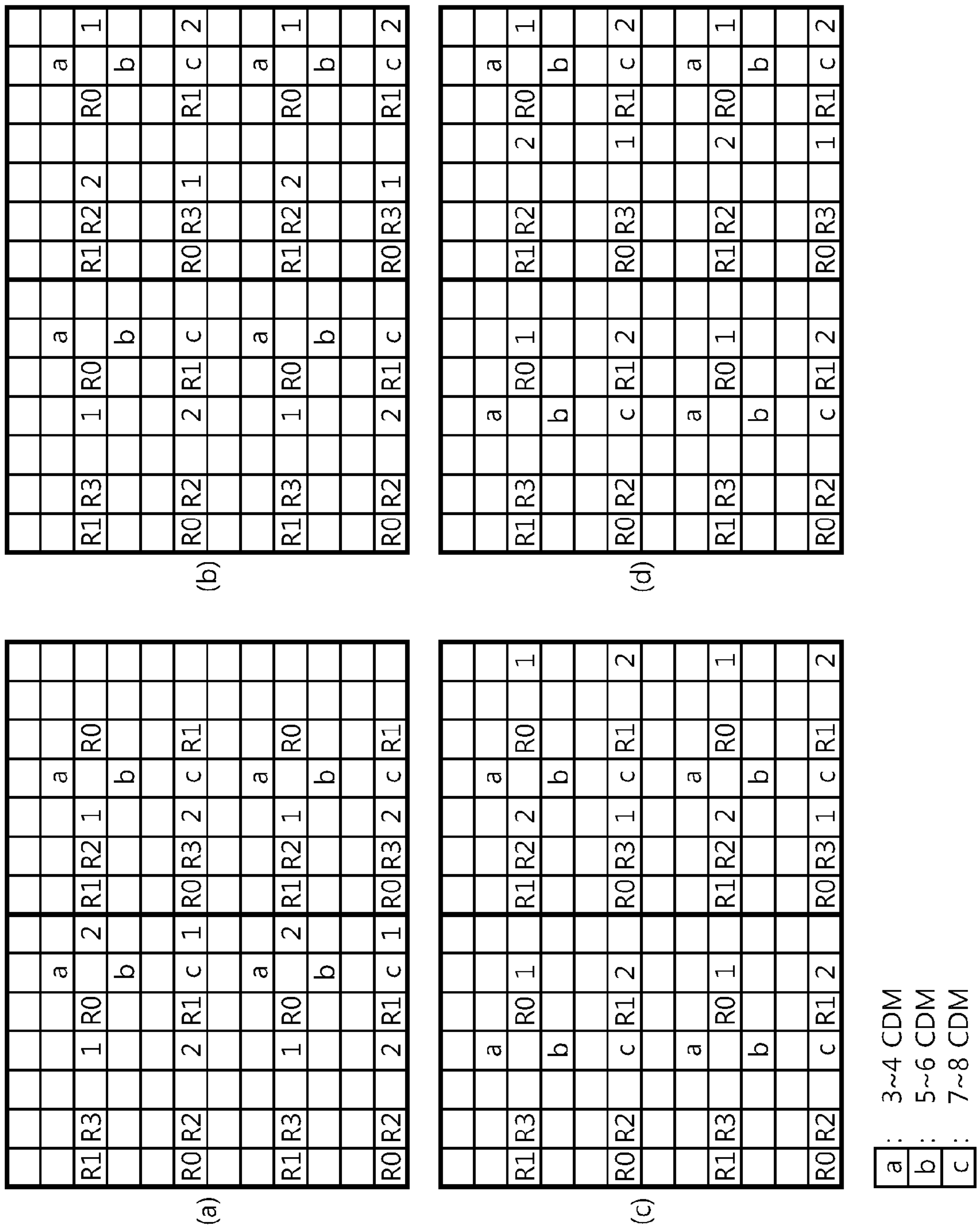
Figure 67:
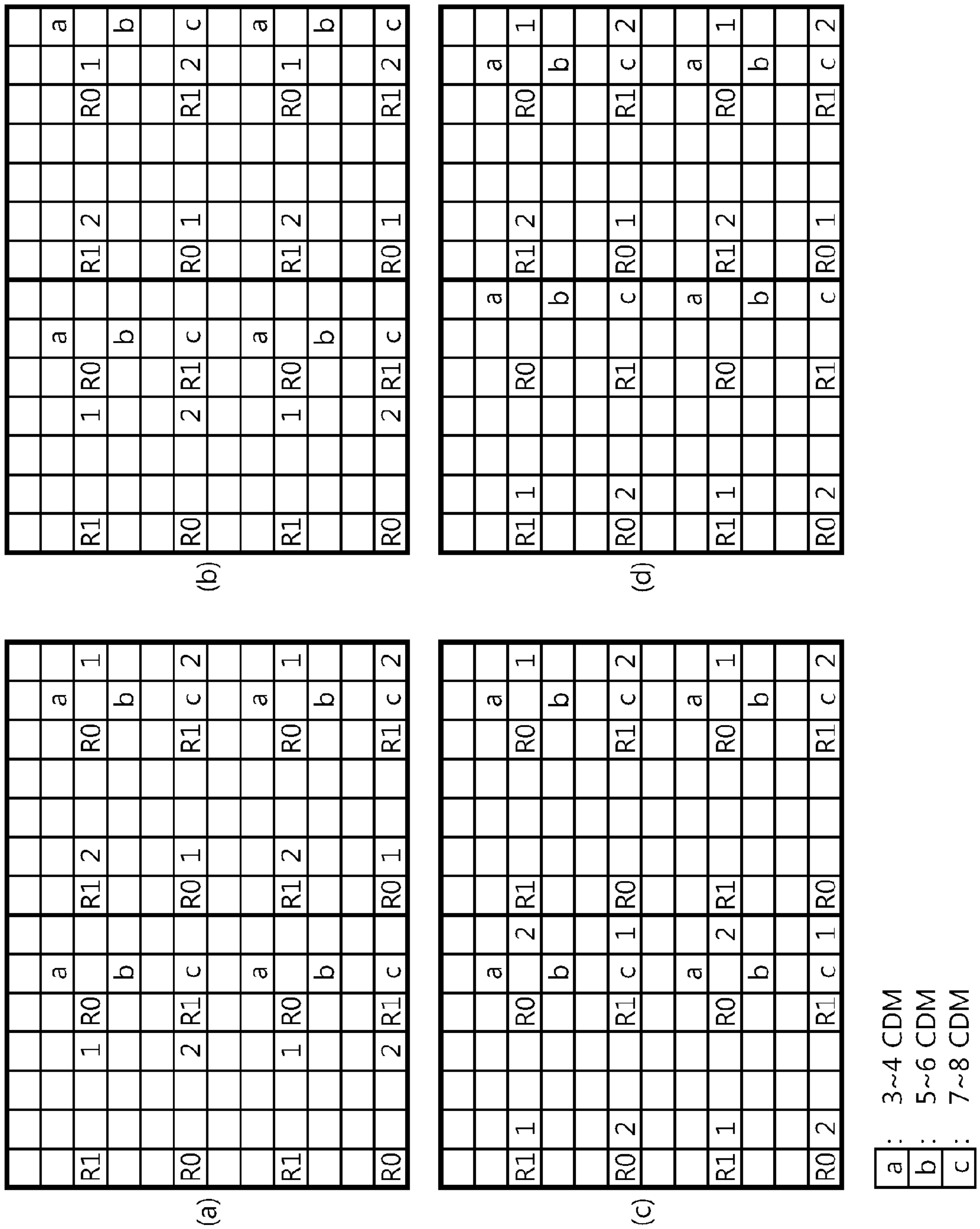
Figure 68:
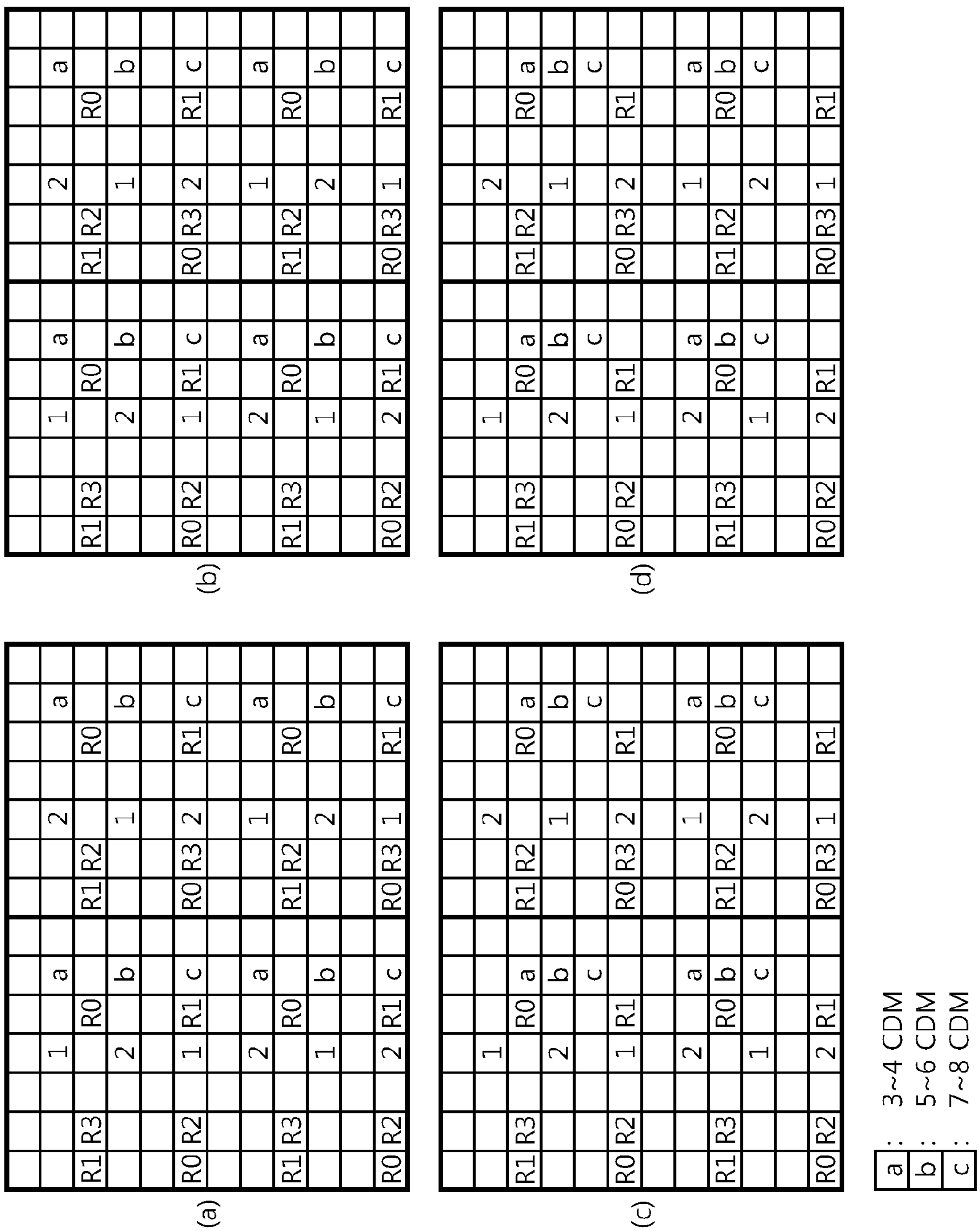
Figure 69:
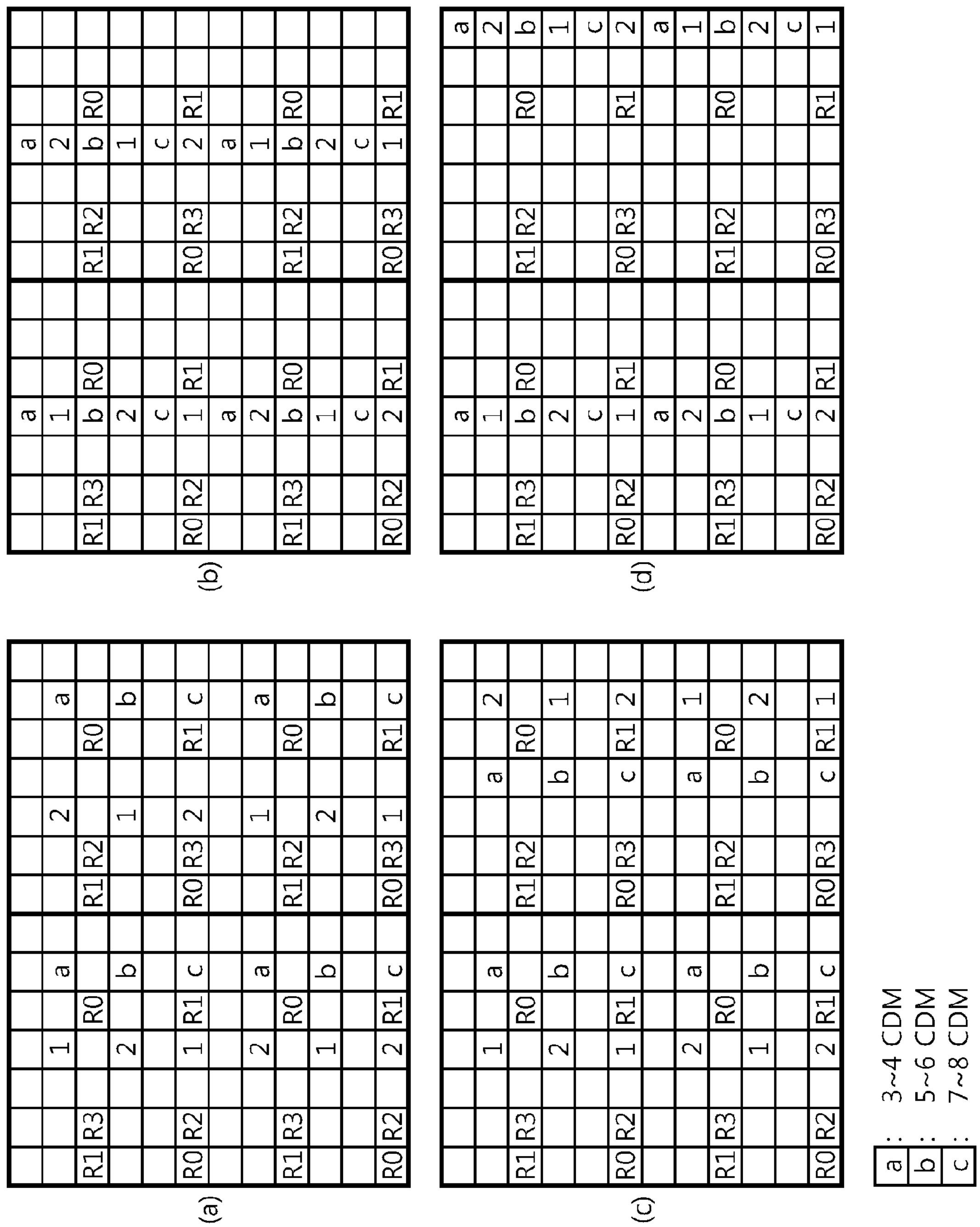
Figure 70:
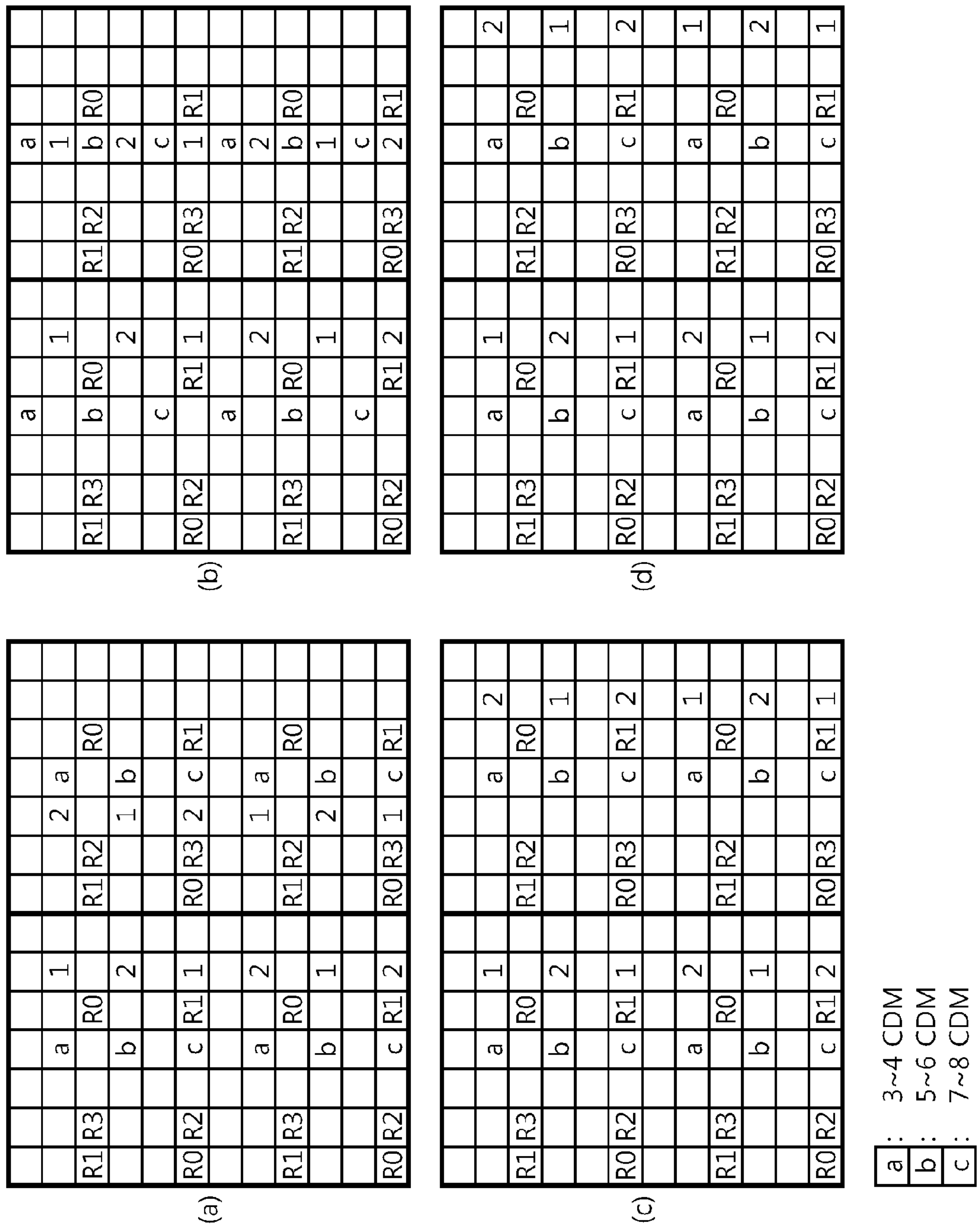
Figure 71:
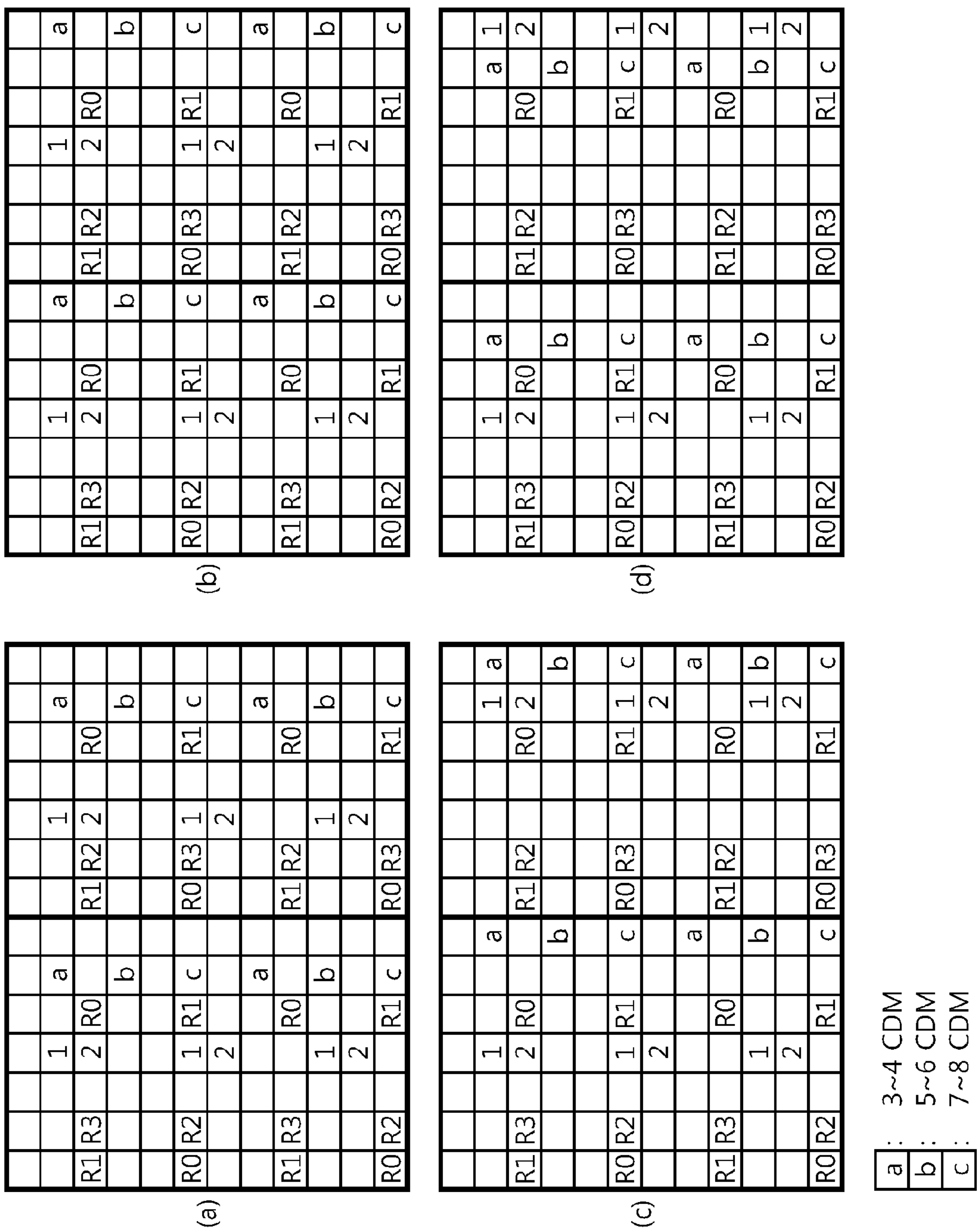
Figure 72:
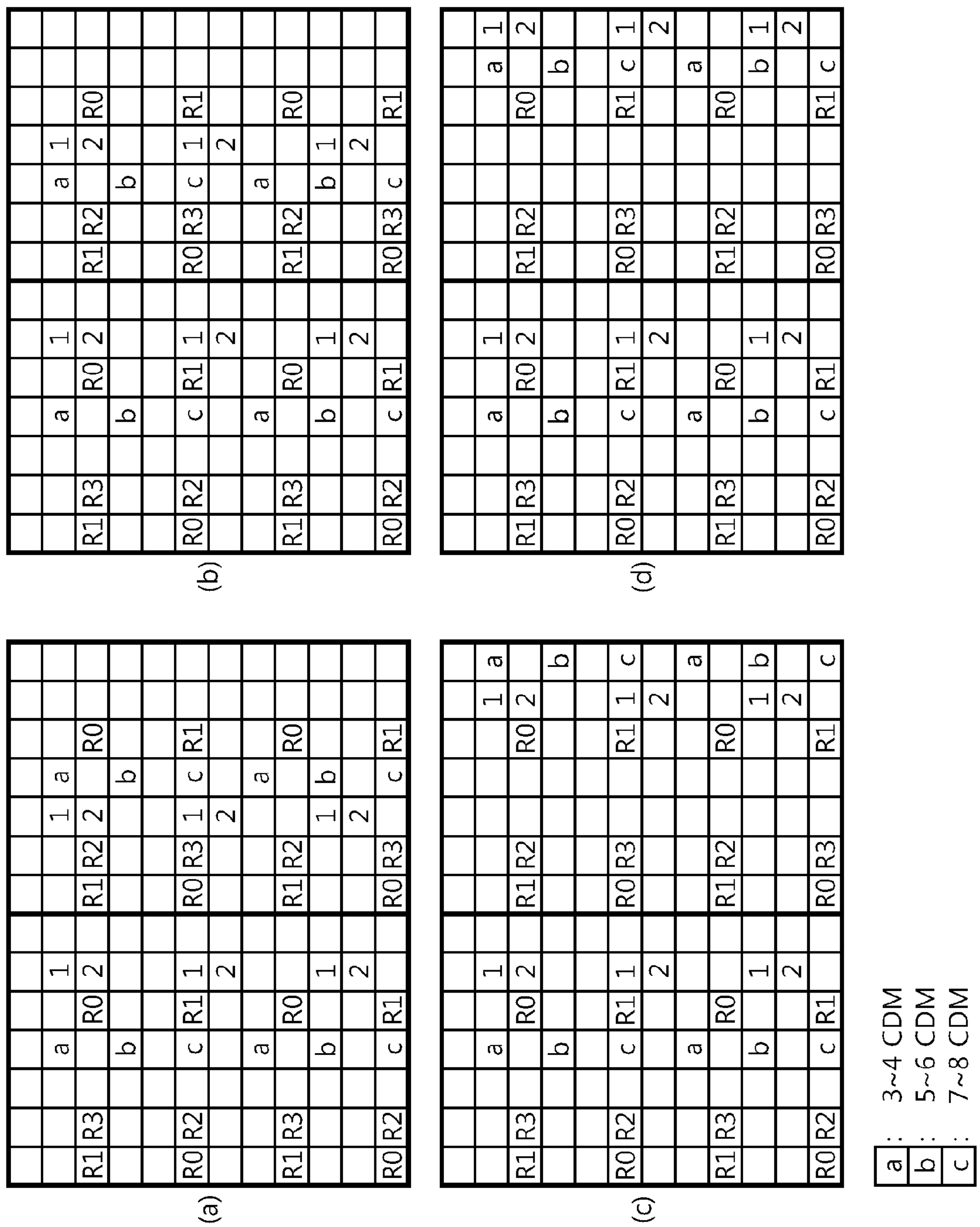

FIGS. 66 and 67 show another example of DMRS patterns according to the proposed method of transmitting a reference signal. FIGS. 66 and 67 illustrate the cases in which in the normal CP, a first DMRS and a second DMRS are mapped over three OFDM symbols and a third DMRS to an eighth DMRS are multiplexed through the FDM/CDM hybrid method in two OFDM symbols. FIG. 66 shows the case in which the number of legacy CRSs is 4. The first DMRS and the second DMRS can be multiplexed through the FDM method and mapped to three OFDM symbols of the fourth, sixth, seventh, tenth, eleventh, and fourteenth OFDM symbols (having respective indices 3, 5, 6, 9, 10, and 13) of a subframe. FIG. 67 shows the case in which the number of legacy CRSs is 2. The first DMRS and the second DMRS can be multiplexed through the FDM method and mapped to three OFDM symbols of the second, fourth, seventh, ninth, thirteenth, and fourteenth OFDM symbols (having respective indices 1, 3, 6, 8, 12, and 13) of a subframe. In a corresponding OFDM symbol, the DMRS are mapped at intervals of three subcarriers. The third DMRS to the eighth DMRS can be mapped to two OFDM symbols of the OFDM symbols to which a legacy CRS, the first DMRS, and the second DMRS are not mapped and in which a PDCCH is not transmitted. The position of a subcarrier mapped in each OFDM symbol can comply with one of the three patterns shown in FIG. 65-(*d*). Assuming that the number of OFDM symbols which can transmit the third DMRS to the eighth DMRS is n, a combination ${}_nC_2$ is possible according to a pattern of the first DMRS and the second DMRS. To allocate the third DMRS to the eighth DMRS, one OFDM symbol preferably is assigned to one slot. To guarantee the performance of channel estimation in one subframe, the third DMRS to the eighth DMRS more preferably have a symmetrical pattern in each slot.

FIGS. 68 to 72 show another example of DMRS patterns according to the proposed method of transmitting a reference signal. FIGS. 68 to 72 illustrate the cases in which in the normal CP, a first DMRS and a second DMRS are mapped over two OFDM symbols and a third DMRS to an eighth DMRS are multiplexed through the FDM/CDM hybrid method in two OFDM symbols. The first DMRS and the second DMRS can be multiplexed through the FDM method and mapped to two OFDM symbols of the fourth, sixth, tenth, eleventh, thirteenth, and fourteenth OFDM symbols (having respective indices 3, 5, 9, 10, 12, and 13) of a subframe. In a corresponding OFDM symbol, the DMRS can be mapped at intervals of two subcarriers or two consecutive subcarriers. The third DMRS to the eighth DMRS can be mapped to two OFDM symbols of the OFDM symbols to which a legacy CRS, the first DMRS, and the second DMRS are not mapped and in which a PDCCH is not transmitted. The position of a subcarrier mapped in each OFDM symbol can comply with one of the three patterns shown in FIG. 65-(*d*). Alternatively, the third DMRS to the eighth DRMS may be multiplexed with the first DMRS and the second DMRS through the FDM method and mapped to the OFDM symbol to which the first DMRS and the second DMRS are mapped. Assuming that the number of OFDM symbols capable of sending the third DMRS to the eighth DMRS is n, a combination ${}_nC_2$ is possible according to a pattern of the first DMRS and the second DMRS. To allocate the third DMRS to the eighth DMRS, one OFDM symbol preferably is assigned to one slot. To guarantee the performance of channel estimation in one subframe, the third DMRS to the eighth DMRS more preferably have a symmetrical pattern in each slot.

Figure 73:
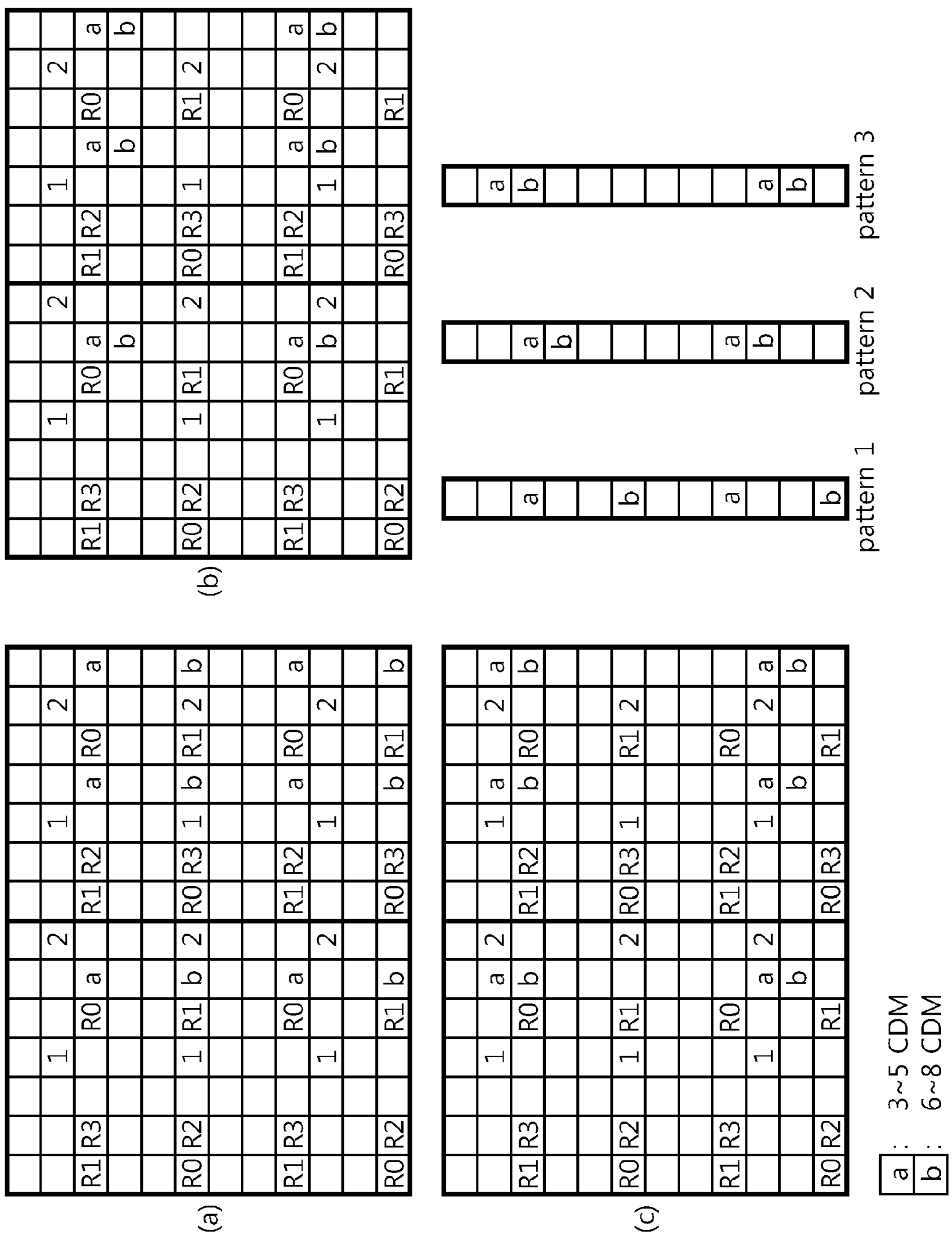

FIG. 73 shows another example of DMRS patterns according to the proposed method of transmitting a reference signal. FIG. 73 illustrates the case in which in the normal CP, a first DMRS and a second DMRS are mapped over four OFSM symbol and a third DMRS to an eighth DMRS are multiplexed through the FDM/CDM hybrid method in three OFDM symbols. The first DMRS and the second DMRS can be multiplexed through the FDM method and mapped to the fourth, seventh, tenth, and thirteenth OFDM symbols (having respective indices 3, 6, 9, and 12) of a subframe. In a corresponding OFDM symbol, the DMRS can be mapped at intervals of four subcarriers. The third DMRS to the eighth DMRS can be mapped to three OFDM symbols of the OFDM symbols to which a legacy CRS, the first DMRS, and the second DMRS are not mapped and in which a PDCCH is not transmitted. In each OFDM symbol, the third DMRS to the eighth DMRS can be multiplexed through the CDM method using a DFT matrix in which the DMRS of an antenna group, including three of a third antenna to an eighth antenna, has a length of 3, and then mapped. The position of a subcarrier mapped in each OFDM symbol can comply with one of the three patterns shown in FIG. 73-(*d*).

Figure 74:
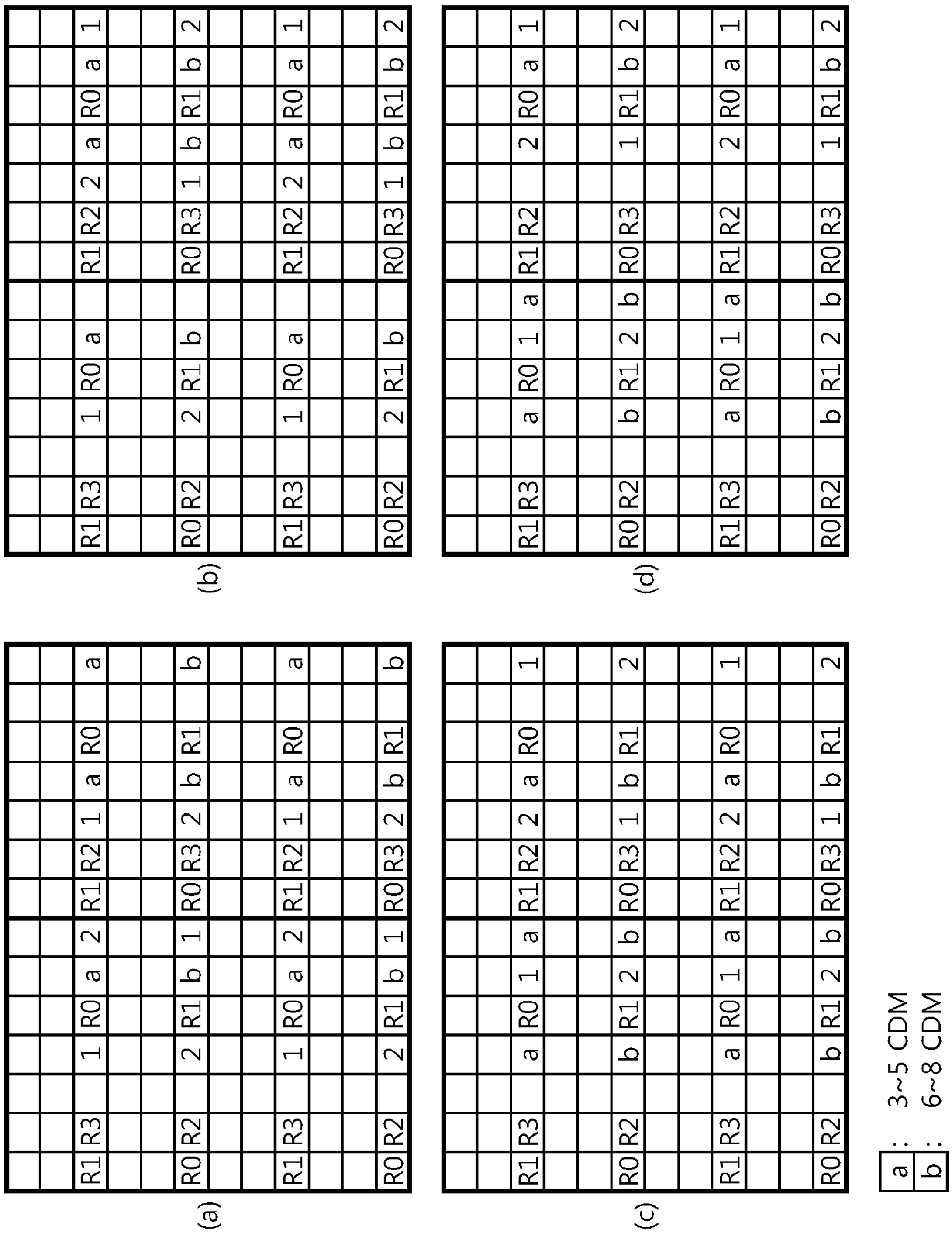
Figure 75:
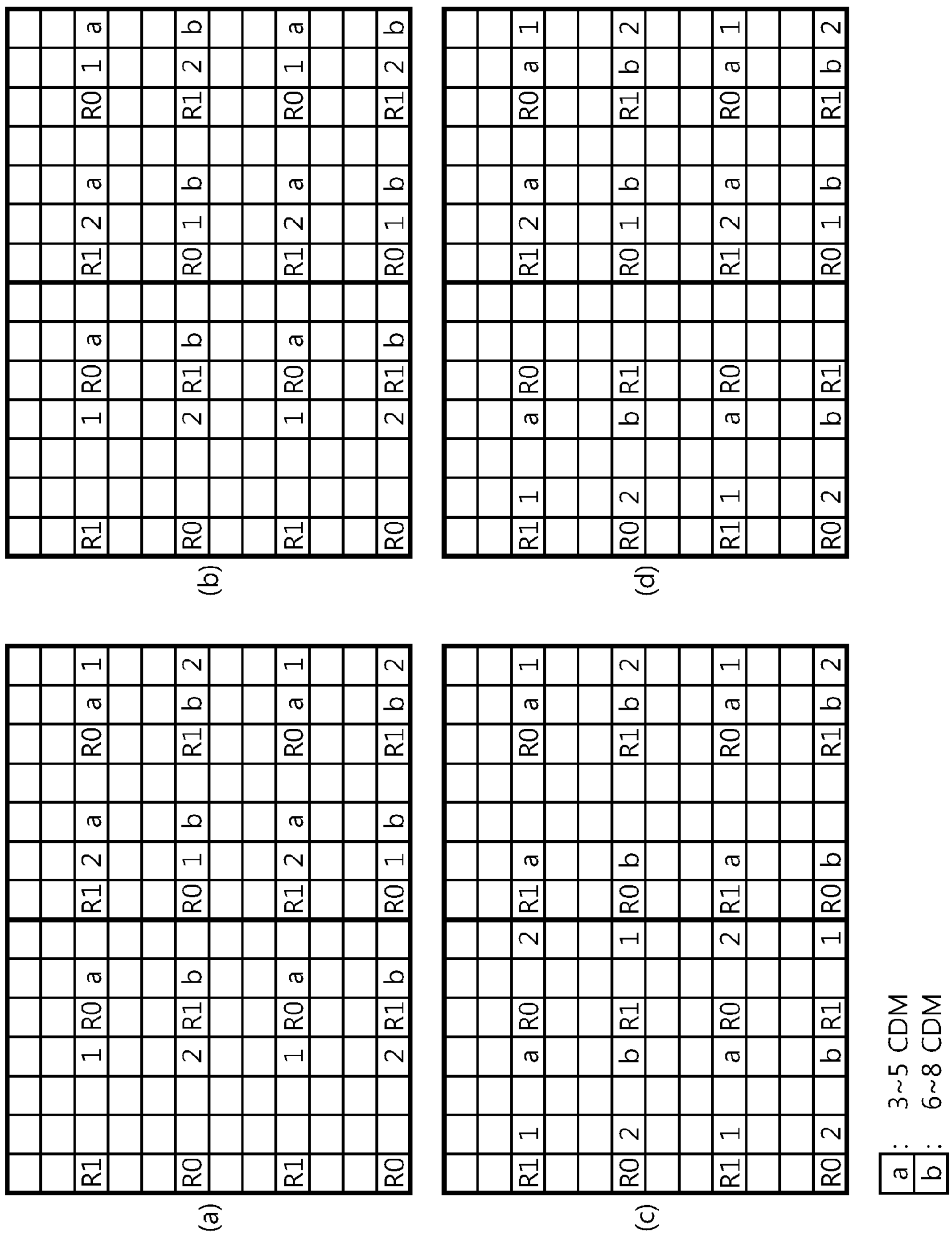
Figure 76:
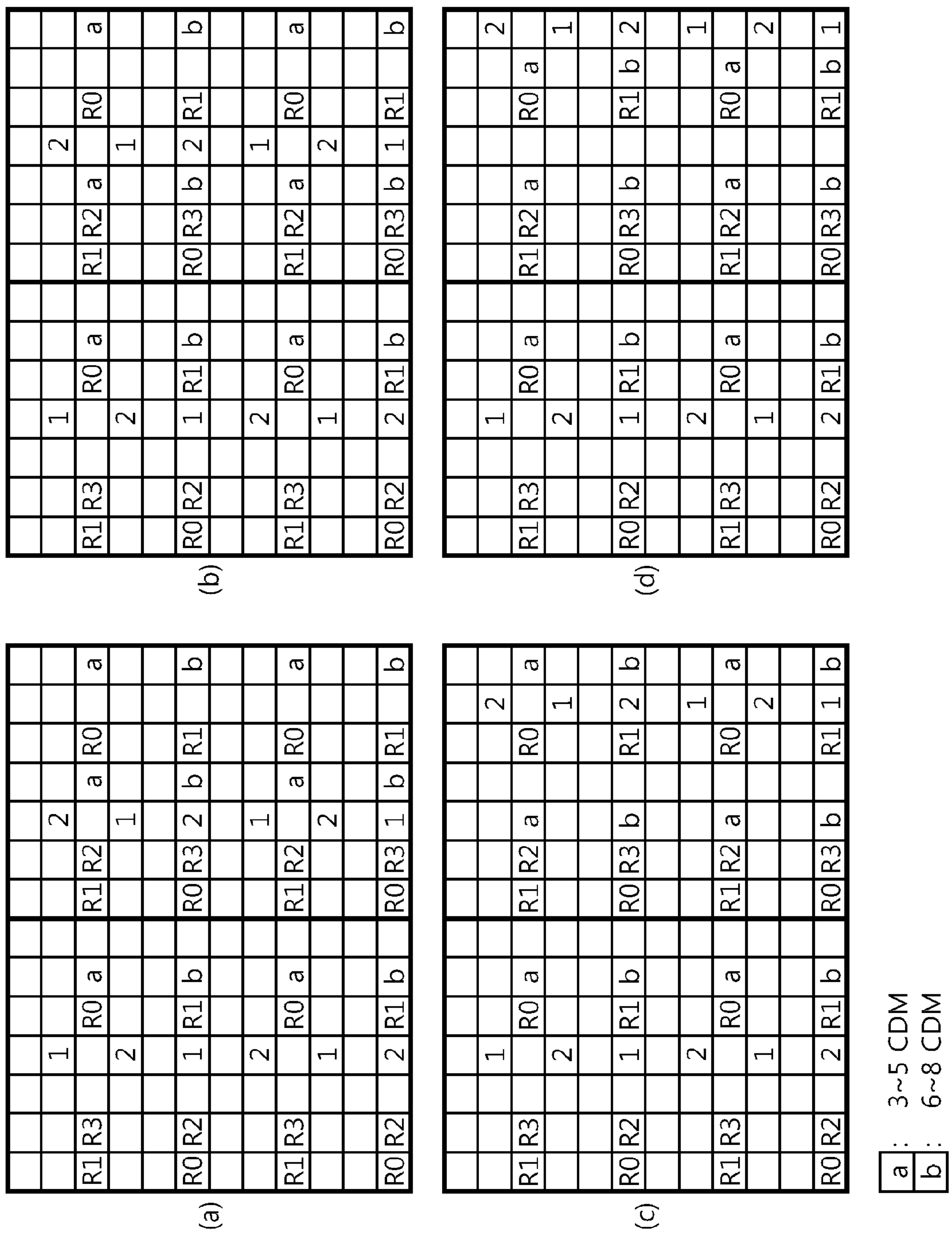
Figure 77:
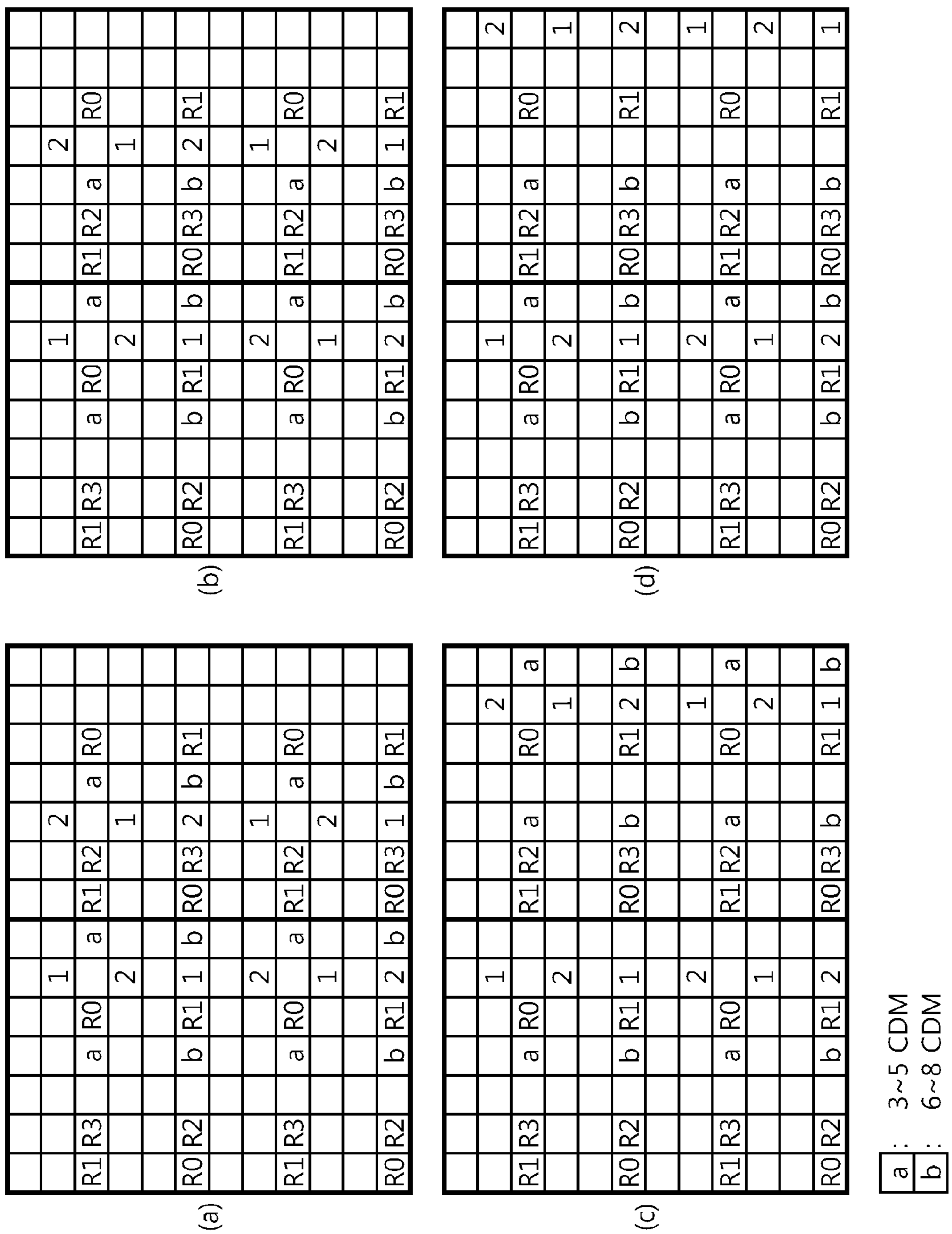
Figure 78:
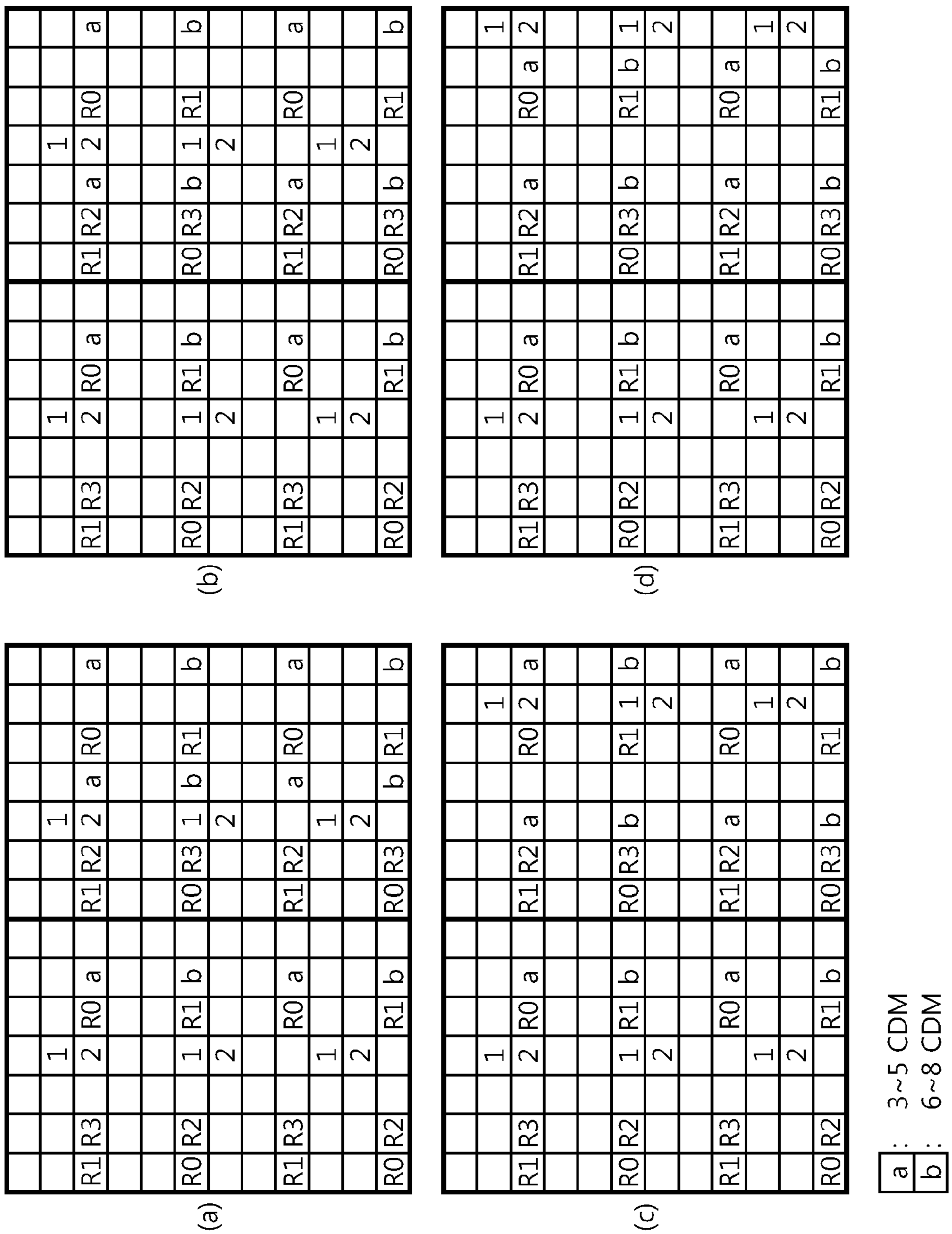
Figure 79:
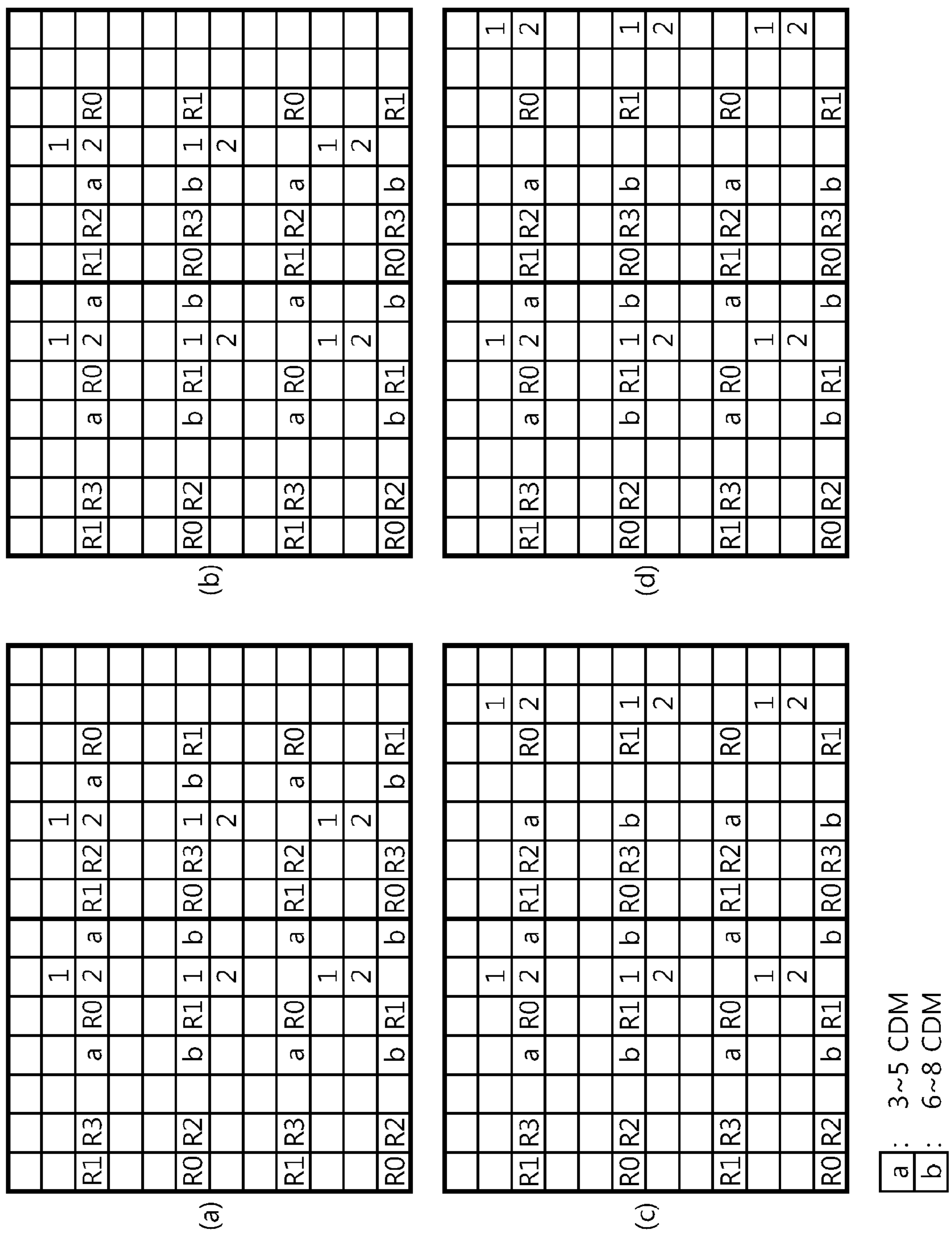

FIGS. 74 and 75 show another example of DMRS patterns according to the proposed method of transmitting a reference signal. FIGS. 74 and 75 illustrate the cases in which in the normal CP, a first DMRS and a second DMRS are mapped over three OFDM symbols and a third DMRS to an eighth DMRS are multiplexed through the FDM/CDM hybrid method in three OFDM symbols. FIG. 74 shows the case in which the number of legacy CRSs is 4. The first DMRS and the second DMRS can be multiplexed through the FDM method and mapped to three OFDM symbols of the fourth, sixth, seventh, tenth, eleventh, and fourteenth OFDM symbols (having respective indices 3, 5, 6, 9, 10, and 13) of a subframe. FIG. 75 shows the case in which the number of legacy CRSs is 2. The first DMRS and the second DMRS can be multiplexed through the FDM method and mapped to three OFDM symbols of the second, fourth, seventh, ninth, thirteenth, and fourteenth OFDM symbols (having respective indices 1, 3, 6, 8, 12, and 13) of a subframe. In a corresponding OFDM symbol, the DMRS can be mapped at intervals of three subcarriers. The third DMRS to the eighth DMRS can be mapped to three OFDM symbols of the OFDM symbols to which a legacy CRS, the first DMRS, and the second DMRS are not mapped and in which a PDCCH is not transmitted. The position of a subcarrier mapped in each OFDM symbol can comply with one of three patterns shown in FIG. 73-(*d*). Assuming that the number of OFDM symbols capable of sending the third DMRS to the eighth DMRS is n, a combination $_nC_3$ is possible according to a pattern of the first DMRS and the second DMRS. To allocate the third DMRS to the eighth DMRS, one OFDM symbol preferably is assigned to one slot. To guarantee the performance of channel estimation in one subframe, the third DMRS to the eighth DMRS preferably are assigned to an OFDM symbol placed at the center of each slot.

FIGS. 76 to 79 show another example of DMRS patterns according to the proposed method of transmitting a reference signal. FIGS. 76 to 79 illustrate the cases in which in the normal CP, a first DMRS and a second DMRS are mapped over two OFDM symbols and a third DMRS to an eighth DMRS are multiplexed through the FDM/CDM hybrid method in three OFDM symbols. The first DMRS and the second DMRS can be multiplexed through the FDM method and mapped to two OFDM symbols of the fourth, sixth, tenth, eleventh, thirteenth, and fourteenth OFDM symbols (having respective indices 3, 5, 9, 10, 12, and 13) of a subframe. In a corresponding OFDM symbol, the DMRSs can be mapped at intervals of two subcarriers or two consecutive subcarriers. The third DMRS to the eighth DMRS can be mapped to three OFDM symbols of the OFDM symbols to which a legacy CRS, the first DMRS, and the second DMRS are not mapped and a PDCCH is not transmitted. The position of a subcarrier mapped in each OFDM symbol can comply with one of the three patterns shown in FIG. 73-(*d*). Assuming that the number of OFDM symbols capable of sending the third DMRS to the eighth DMRS is n, a combination $_nC_3$ is possible according to a pattern of the first DMRS and the second DMRS. The third DMRS to the eighth DMRS preferably are mapped to OFDM symbols having regular intervals in the time axis in order to guarantee the performance of channel estimation in one subframe.

Figure 80:
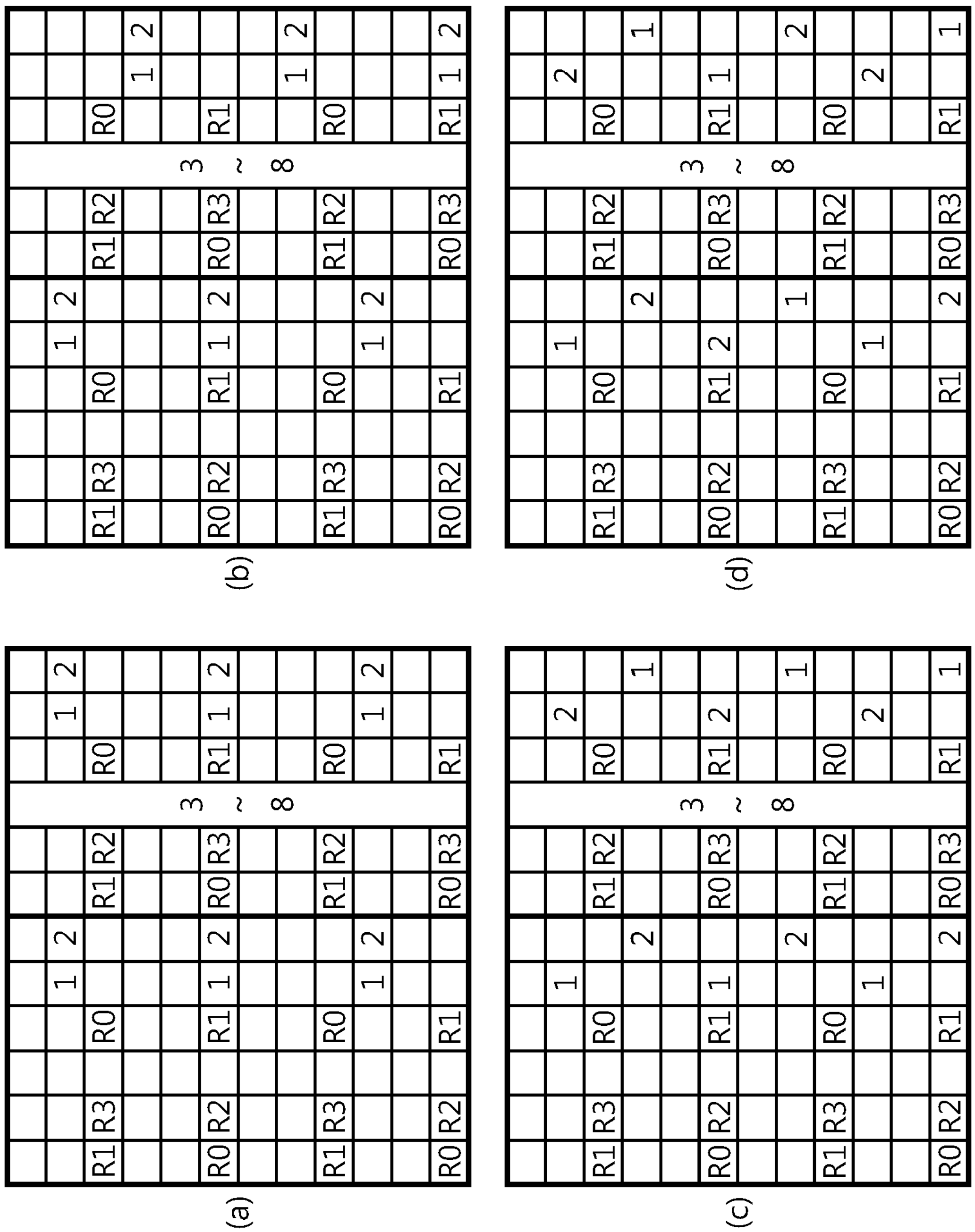
Figure 81:
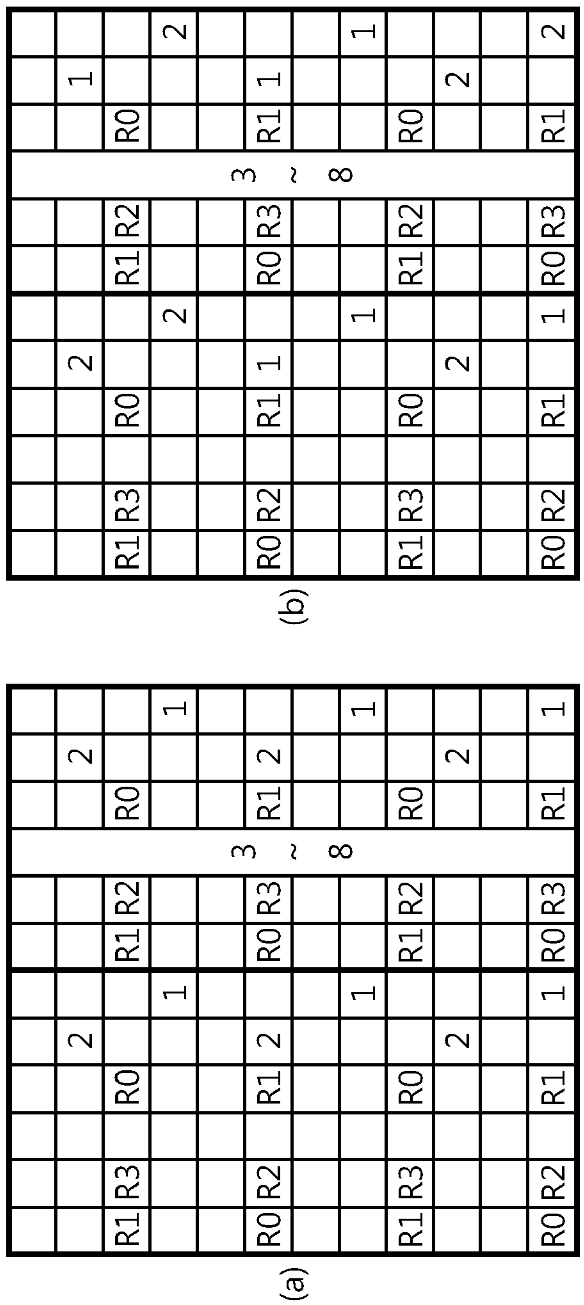

FIGS. 80 to 81 shows another example of DMRS patterns according to the proposed method of transmitting a reference signal. FIG. 80 illustrates the case in which in the extended CP, a first DMRS and a second DMRS are mapped over four OFDM symbols and a third DMRS to an eighth DMRS are multiplexed through the CDM method in one OFDM symbol. The first DMRS and the second DMRS can be multiplexed through the FDM method and mapped to the fifth, sixth, eleventh, and twelfth OFDM symbols (having respective indices 4, 5, 10 and 11) of a subframe. In a corresponding OFDM symbol, the DMRSs can be mapped at intervals of four subcarriers. The third DMRS to the eighth DMRS can be mapped to ninth OFDM symbol (having index 8). To guarantee the performance of channel estimation within one subframe, a DMRS preferably is positioned in an OFDM symbol which is placed at the center of the subframe (e.g., an seventh OFDM symbol). If the seventh OFDM symbol is used for other purposes, the DMRS may be mapped to a sixth or ninth OFDM symbol.

Figure 82:
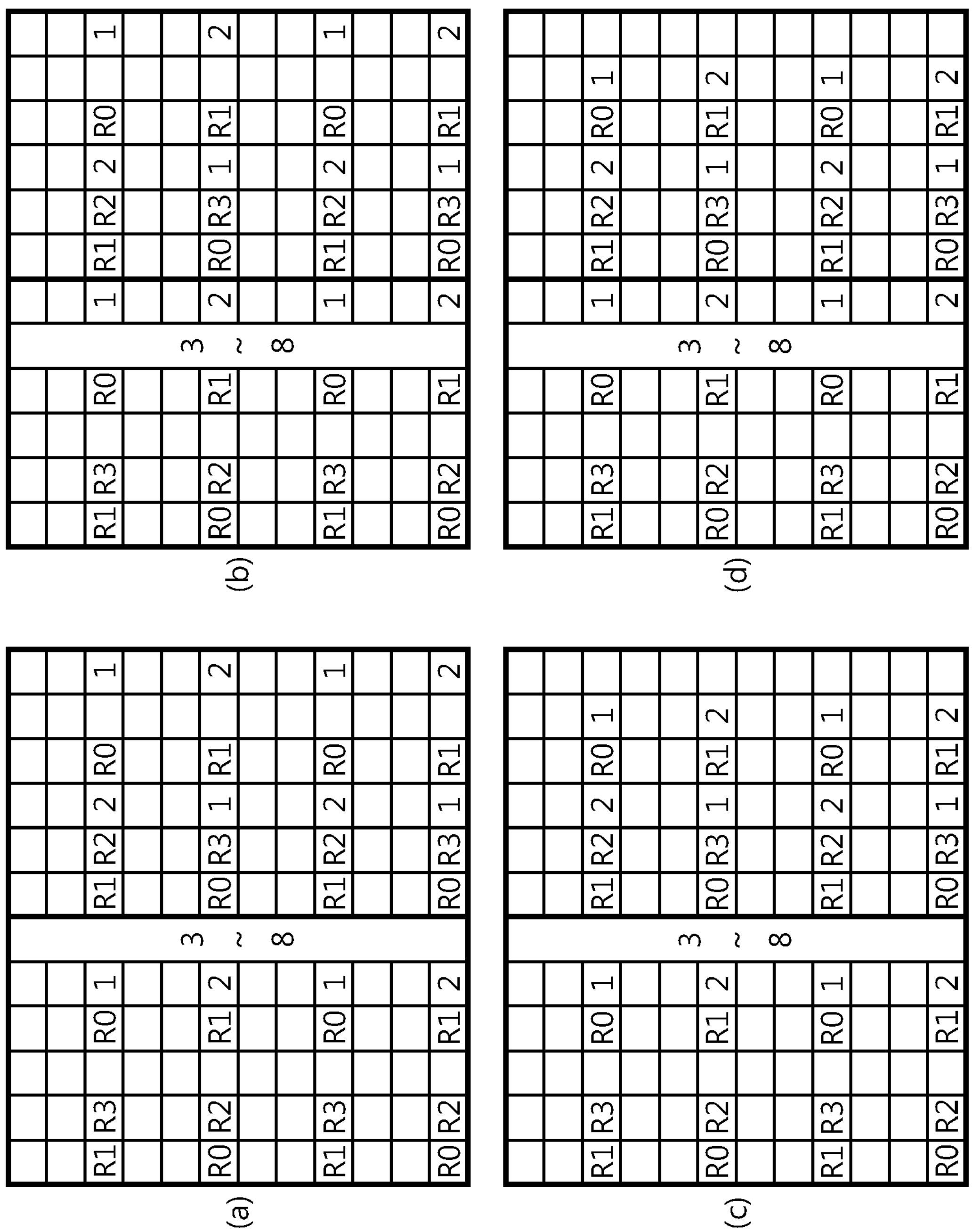
Figure 83:
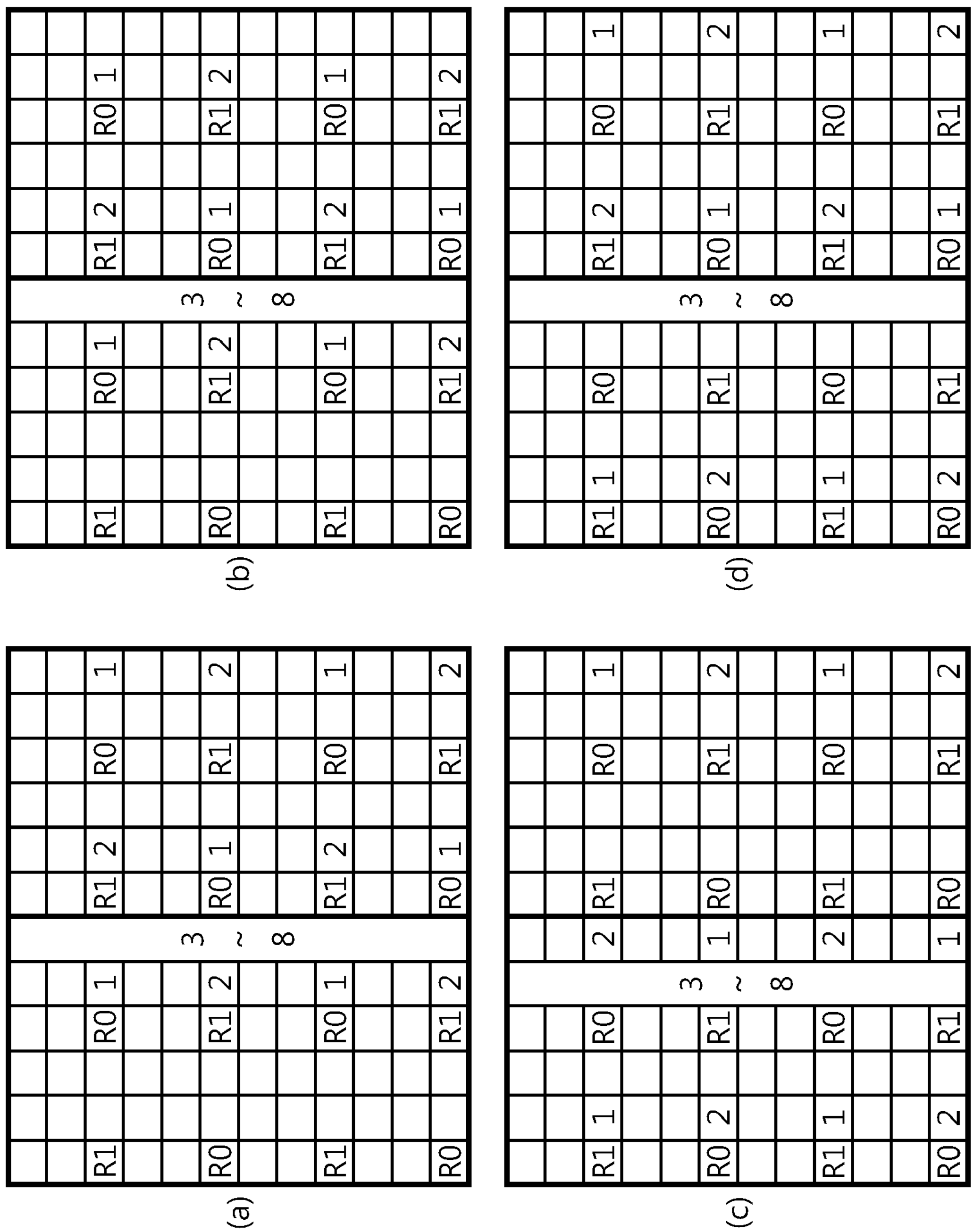

FIGS. 82 and 83 show another example of DMRS patterns according to the proposed method of transmitting a reference signal. FIGS. 57 and 58 illustrate the cases in which in the extended CP, a first DMRS and a second DMRS are mapped over three OFDM symbols and a third DMRS to an eighth DMRS are multiplexed through the CDM method in one OFDM symbol. FIG. 82 shows the case in which the number of legacy CRSs is 4. The first DMRS and the second DMRS can be multiplexed through the FDM method and mapped to three OFDM symbols of the fifth, sixth, ninth, eleventh, and twelfth OFDM symbols (having respective indices 4, 5, 8 10 and 11) of a subframe. In a corresponding OFDM symbol, the DMRSs can be mapped at intervals of three subcarriers. The third DMRS to the eighth DMRS can be mapped to one of OFDM symbols to which the first DMRS and the second DMRS are not mapped and in which a PDCCH is not transmitted. FIG. 83 shows the case in which the number of legacy CRSs is 2. The first DMRS and the second DMRS can be multiplexed through the FDM method and mapped to three OFDM symbols of the second, fifth, sixth, eighth, eleventh, and twelfth OFDM symbols (having respective indices 1, 4, 5, 7, 10 and 11) of a subframe. In a corresponding OFDM symbol, the DMRSs can be mapped at intervals of three subcarriers. The third DMRS to the eighth DMRS can be mapped to one of OFDM symbols to which a legacy CRS, the first DMRS, and the second DMRS are not mapped and in which a PDCCH is not transmitted. To guarantee the performance of channel estimation within one subframe, a DMRS preferably is positioned in an OFDM symbol which is placed at the center of the subframe (e.g., an sixth OFDM symbol). If the sixth OFDM symbol is used for other purposes, the DMRS may be mapped to a fifth or eighth OFDM symbol.

Figure 84:
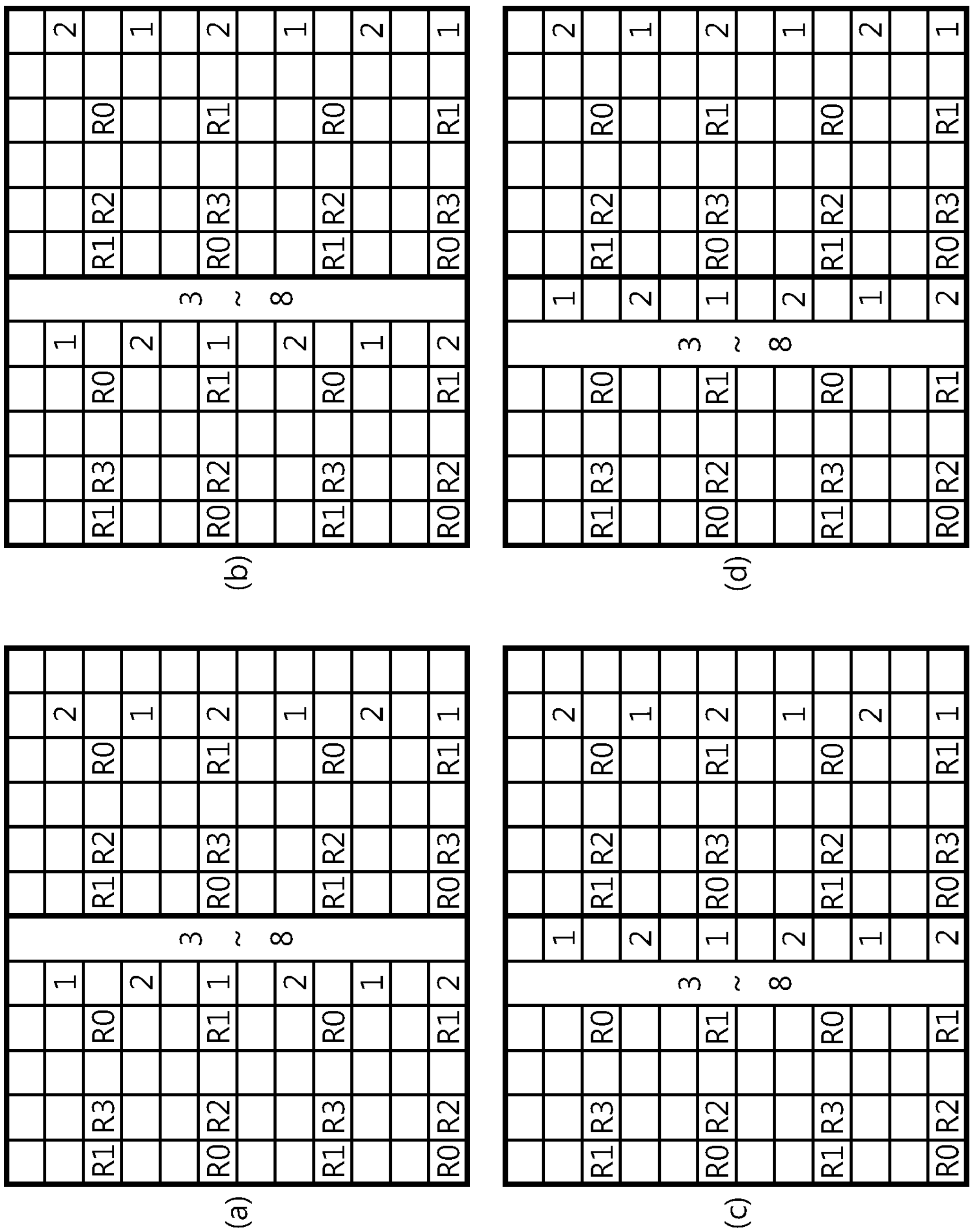
Figure 85:
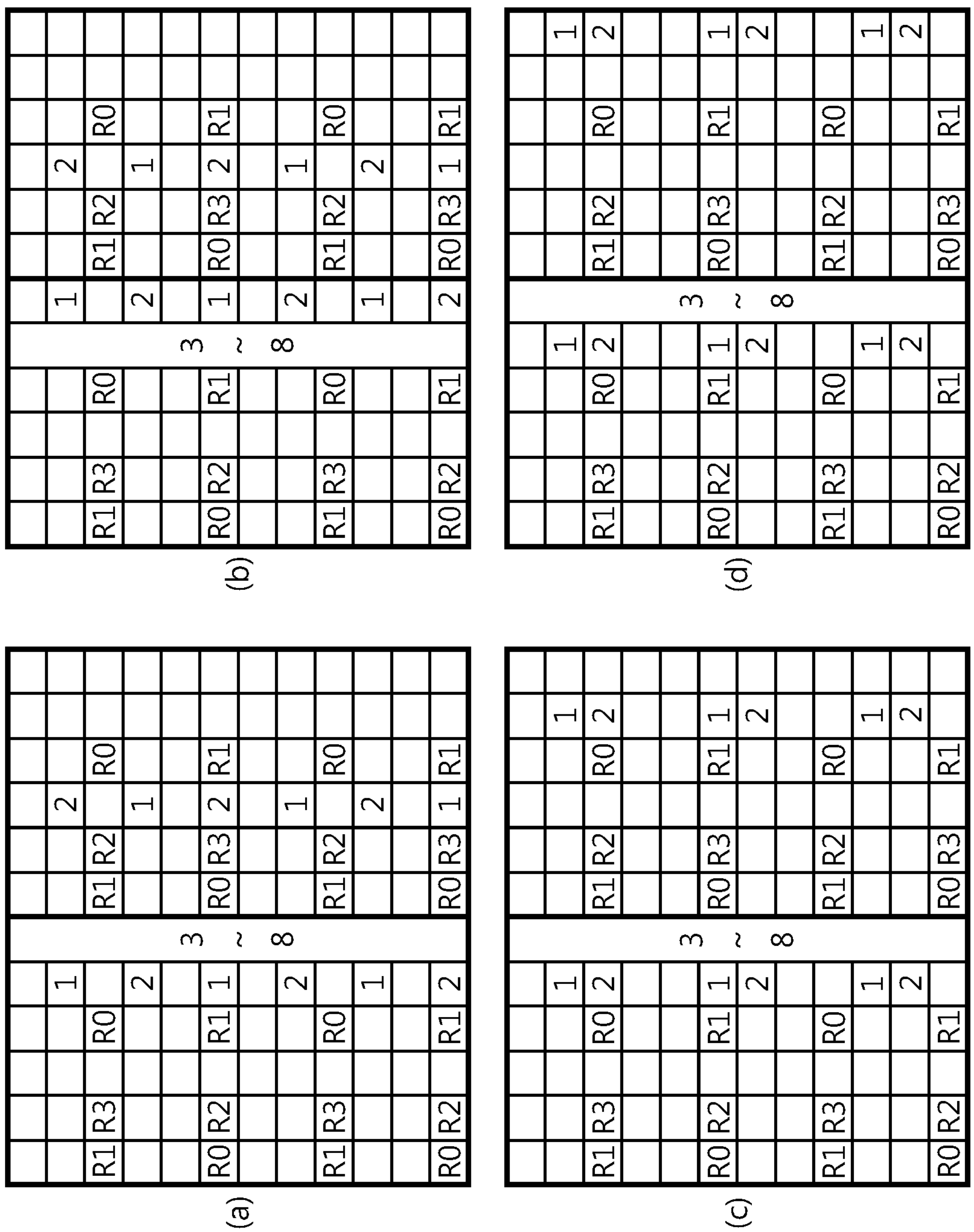
Figure 86:
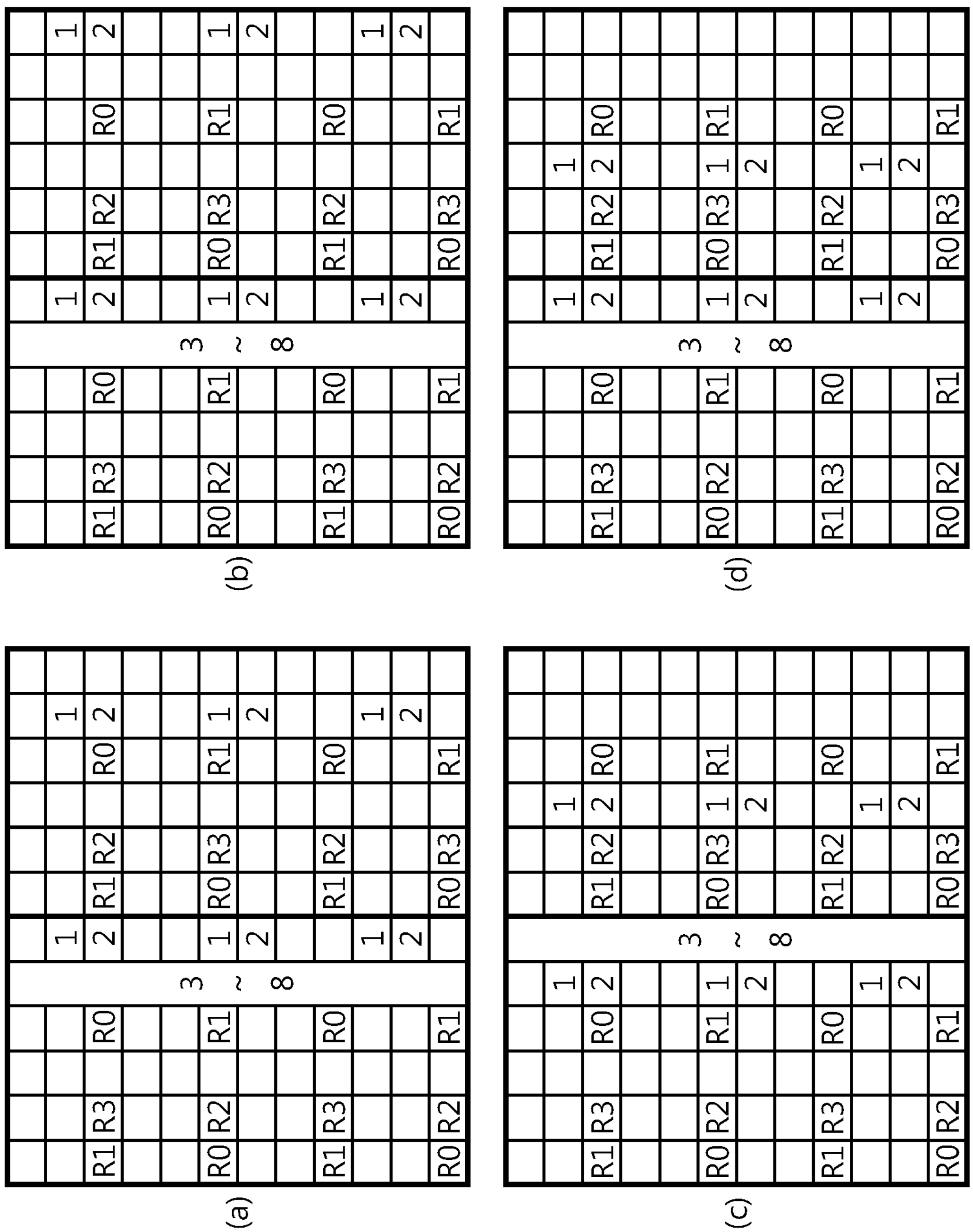

FIGS. 84 to 86 show another example of DMRS patterns according to the proposed method of transmitting a reference signal. FIGS. 84 and 86 illustrate the cases in which in the extended CP, a first DMRS and a second DMRS are mapped over two OFDM symbols and a third DMRS to an eighth DMRS are multiplexed through the CDM method in one OFDM symbol. The first DMRS and the second DMRS can be multiplexed through the FDM method and mapped to two OFDM symbols of the fifth, sixth, ninth, eleventh, and twelfth OFDM symbols (having respective indices 4, 5, 8, and 11) of a subframe. In a corresponding OFDM symbol, the DMRS can be mapped at intervals of two subcarriers or can be mapped to two consecutive subcarriers. The third DMRS to the eighth DMRS can be mapped to one of OFDM symbols to which a legacy CRS, the first DMRS, and the second DMRS are not mapped and in which a PDCCH is not transmitted. To guarantee the performance of channel estimation within one subframe, a DMRS preferably is positioned in an OFDM symbol which is placed at the center of the subframe (e.g., an seventh OFDM symbol). If the seventh OFDM symbol is used for other purposes, the DMRS may be mapped to a sixth or ninth OFDM symbol.

Figure 87:
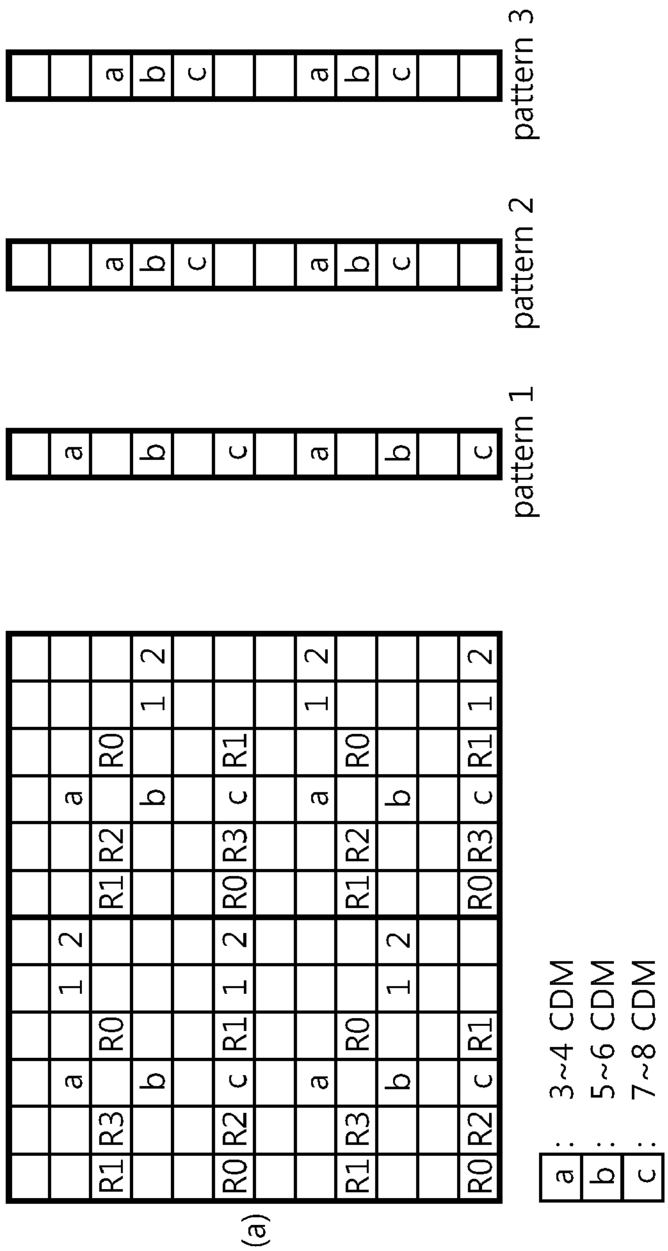

FIG. 87 shows another example of DMRS patterns according to the proposed method of transmitting a reference signal. FIG. 87 illustrates the case in which in the extended CP, a first DMRS and a second DMRS are mapped over four OFDM symbol and a third DMRS to an eighth DMRS are multiplexed through the FDM/CDM hybrid method in two OFDM symbols. The first DMRS and the second DMRS can be multiplexed through the FDM method and mapped to the fifth, sixth, eleventh, and twelfth OFDM symbols (having respective indices 4, 5, 10 and 11) of a subframe. In a corresponding OFDM symbol, the DMRSs are mapped at intervals of four subcarriers. The third DMRS to the eighth DMRS can be mapped to two OFDM symbols of the OFDM symbols to which a legacy CRS, the first DMRS, and the second DMRS are not mapped and in which a PDCCH is not transmitted. In each OFDM symbol, the DMRS of an antenna group, including two of a third antenna to an eighth antenna, can be multiplexed through the CDM method using a Walsh code which has a length of 2, and then mapped. The position of a subcarrier mapped in each OFDM symbol can comply with one of the three patterns shown in FIG. 87-(*b*).

Figure 88:
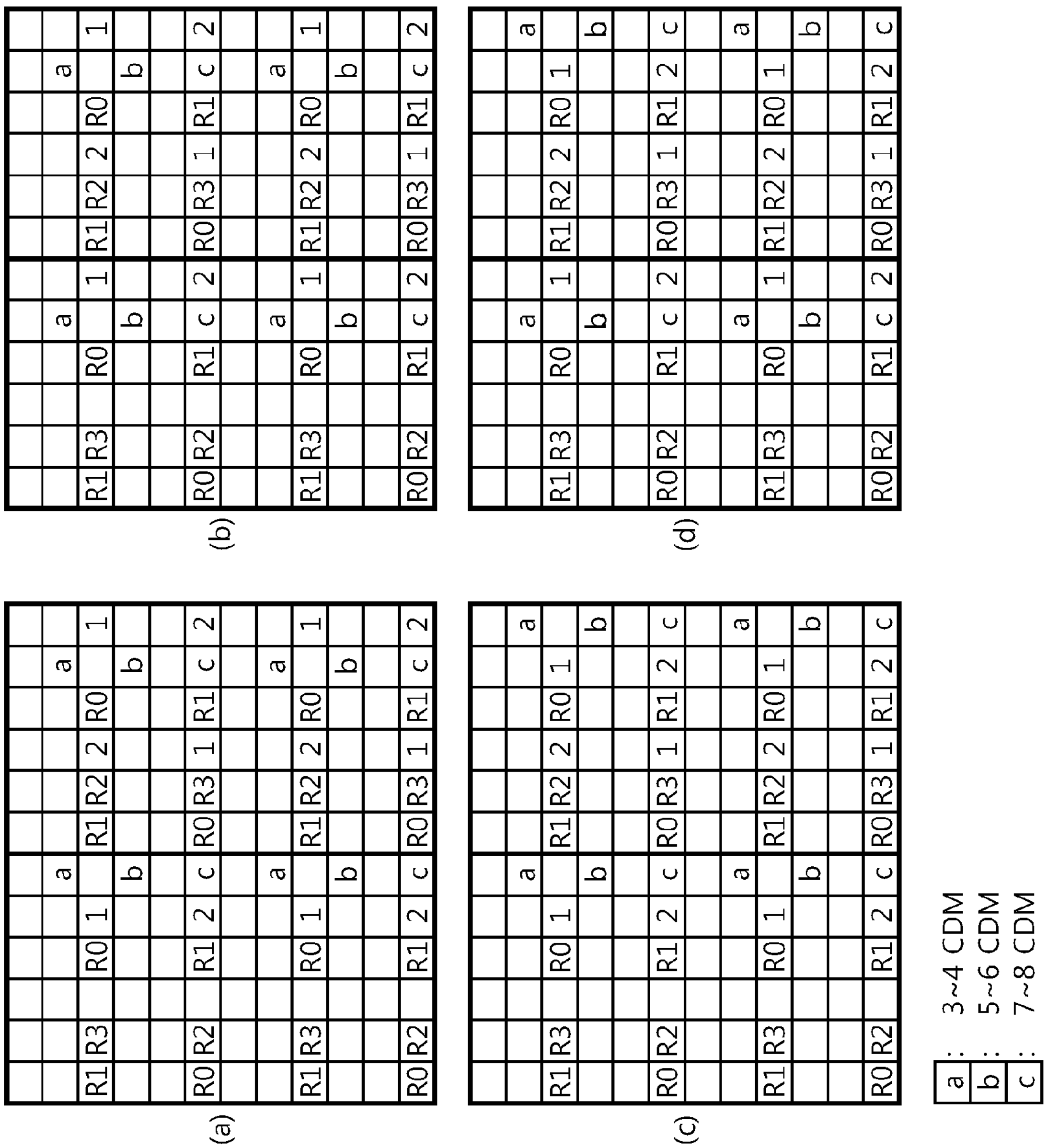
Figure 89:
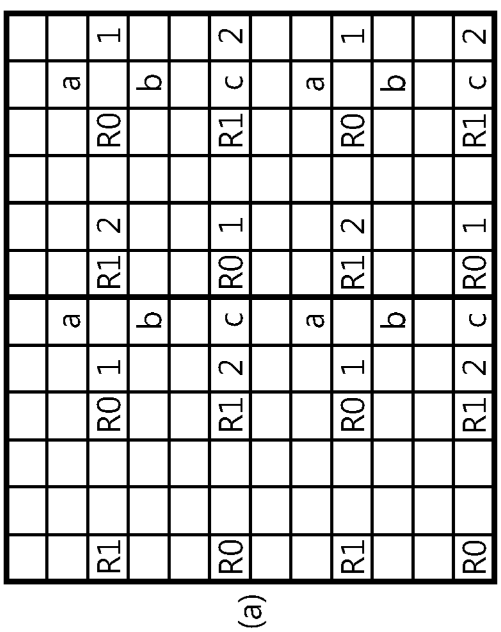
Figure 89:
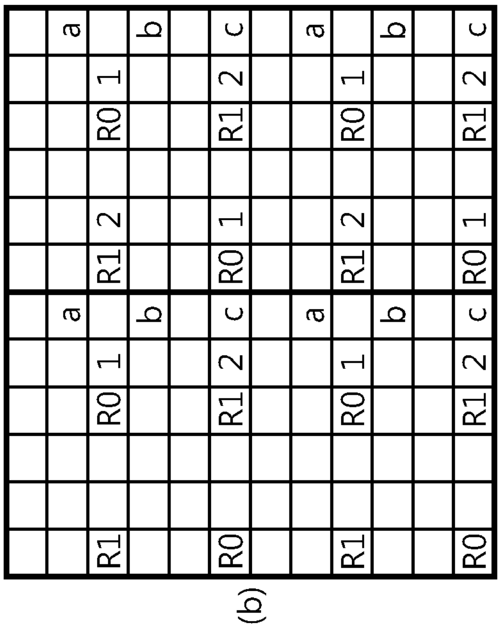
Figure 89:
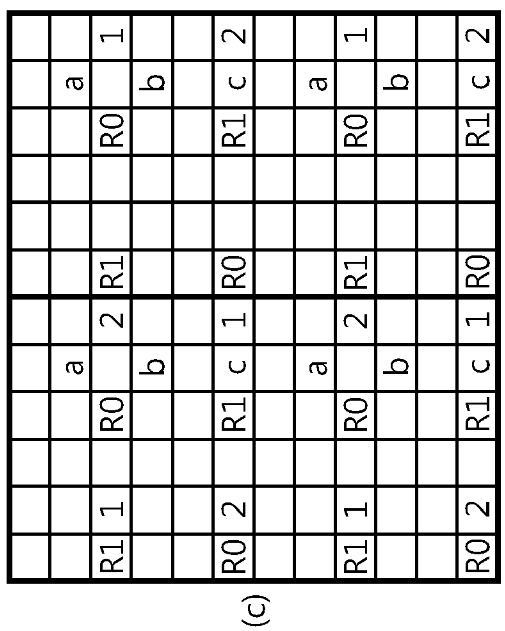
Figure 89:
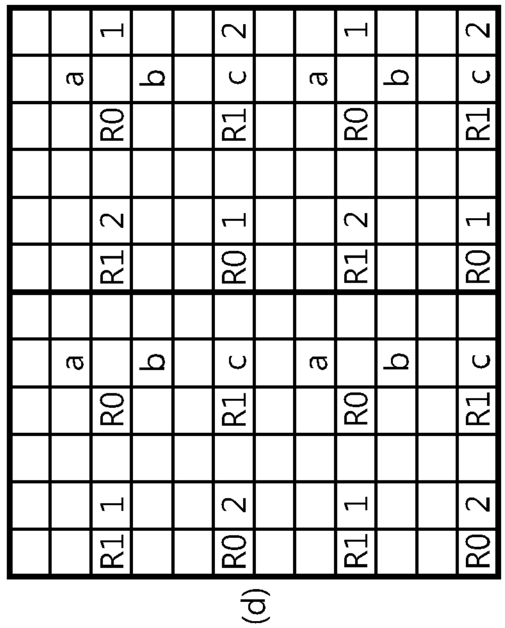

FIGS. 88 and 89 show another example of DMRS patterns according to the proposed method of transmitting a reference signal. FIGS. 88 and 89 illustrate the cases in which in the extended CP, a first DMRS and a second DMRS are mapped over three OFDM symbols and a third DMRS to an eighth DMRS are multiplexed through the FDM/CDM hybrid method in two OFDM symbols. FIG. 88 shows the case in which the number of legacy CRSs is 4. The first DMRS and the second DMRS can be multiplexed through the FDM method and mapped to three OFDM symbols of the fifth, sixth, ninth, eleventh, and twelfth OFDM symbols (having respective indices 4, 5, 8, and 11) of a subframe. FIG. 89 shows the case in which the number of legacy CRSs is 2. The first DMRS and the second DMRS can be multiplexed through the FDM method and mapped to three OFDM symbols of the second, fifth, sixth, eighth, eleventh, and twelfth OFDM symbols (having respective indices 1, 4, 5, 7, 10 and 11) of a subframe. In a corresponding OFDM symbol, the DMRS are mapped at intervals of three subcarriers. The third DMRS to the eighth DMRS can be mapped to two OFDM symbols of the OFDM symbols to which a legacy CRS, the first DMRS, and the second DMRS are not mapped and in which a PDCCH is not transmitted. The position of a subcarrier mapped in each OFDM symbol can comply with one of the three patterns shown in FIG. 87-(*b*). Assuming that the number of OFDM symbols which can transmit the third DMRS to the eighth DMRS is n, a combination $_nC_2$ is possible according to a pattern of the first DMRS and the second DMRS. To guarantee the performance of channel estimation in one subframe, the third DMRS to the eighth DMRS preferably have a symmetrical pattern in each slot.

Figure 90:
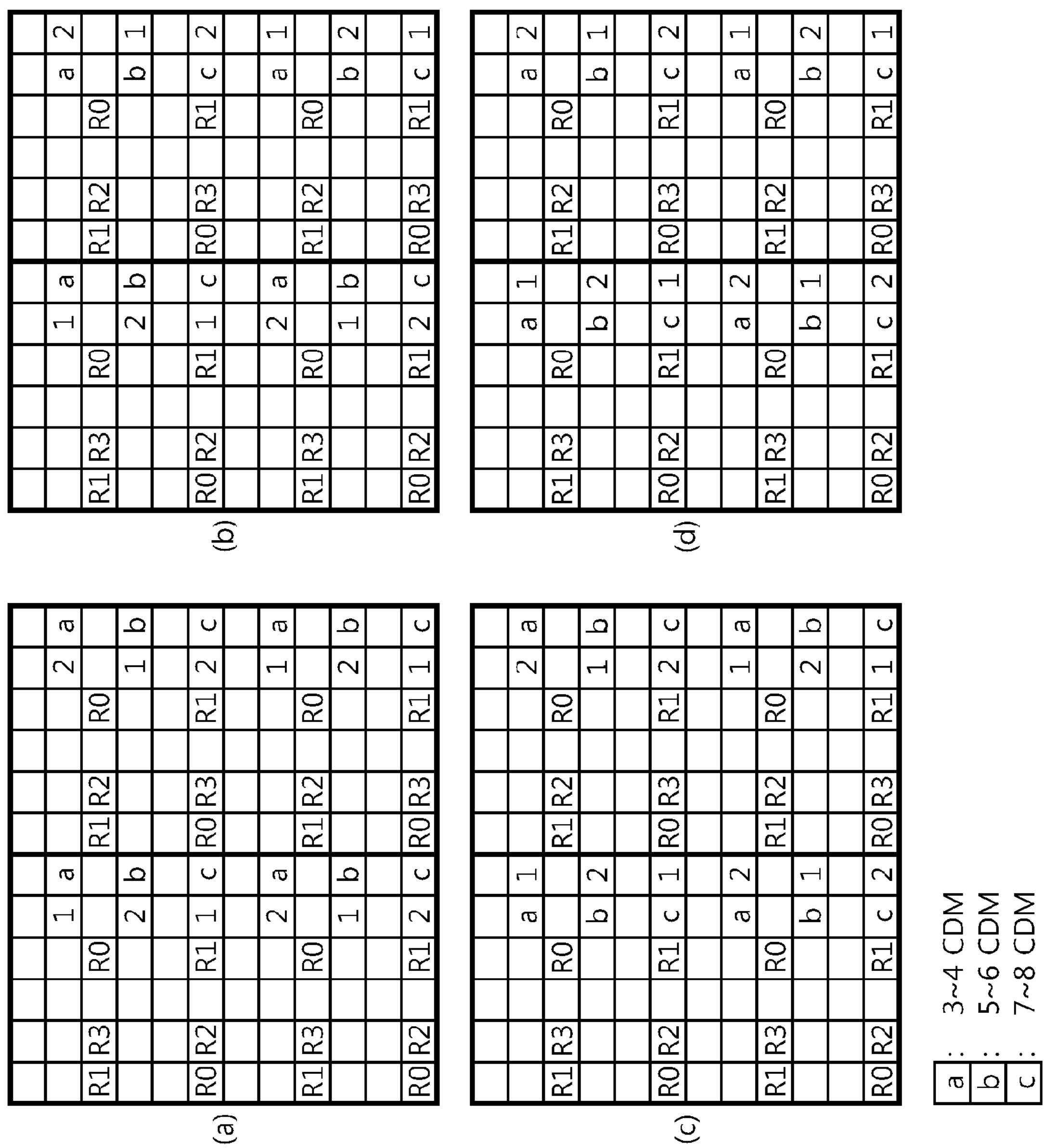
Figure 91:
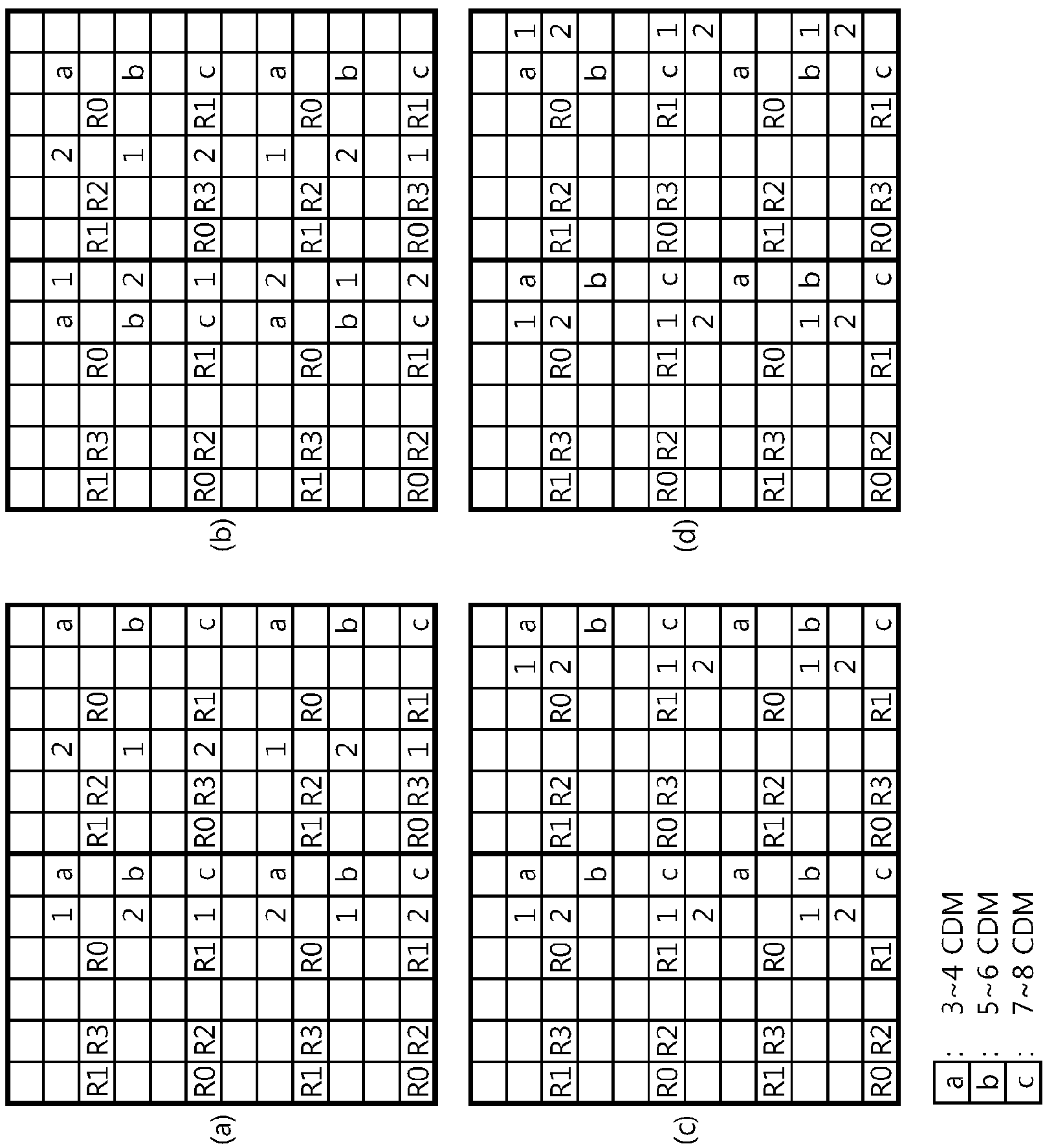
Figure 92:
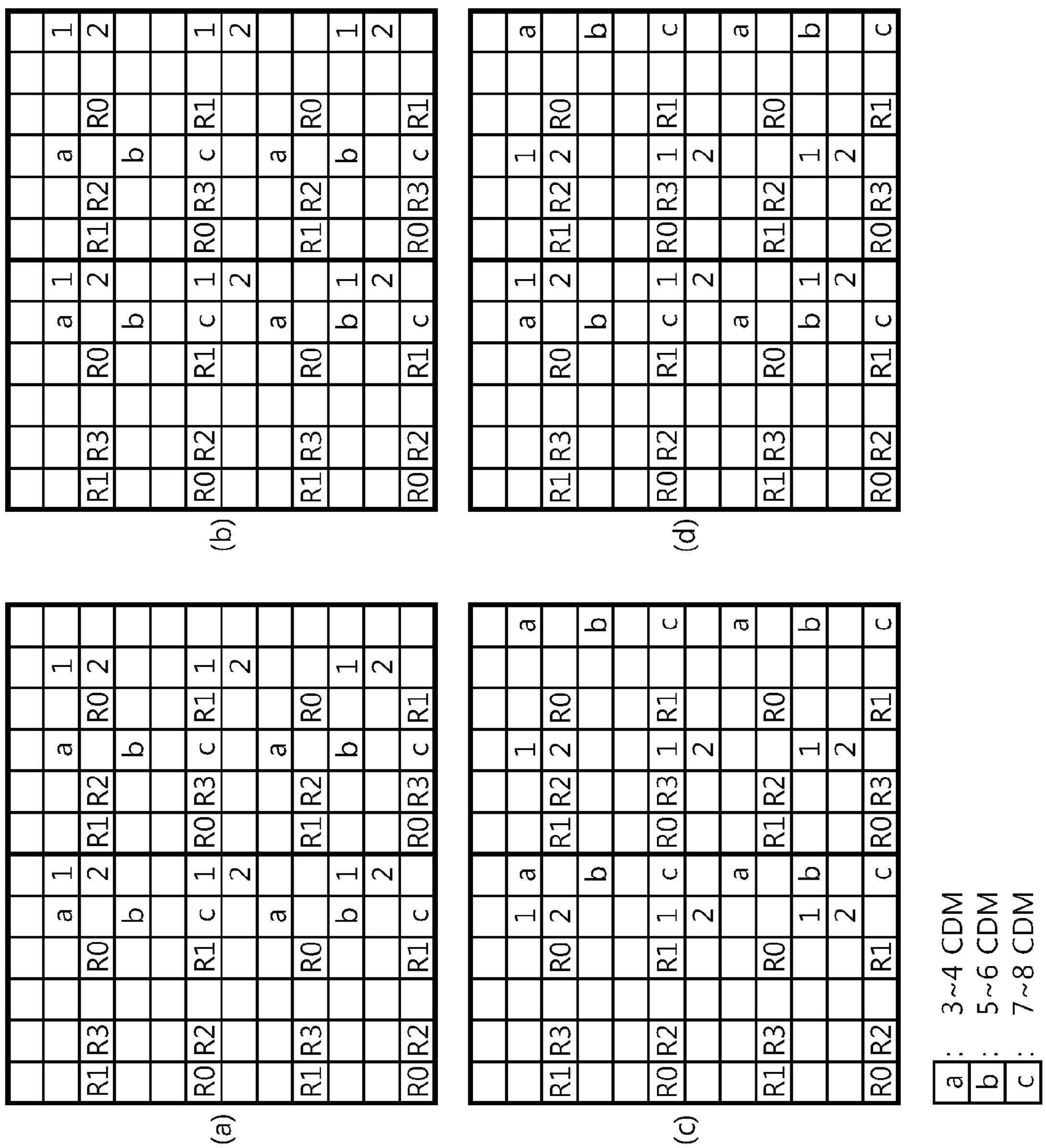

FIGS. 90 to 92 show another example of DMRS patterns according to the proposed method of transmitting a reference signal. FIGS. 90 to 92 illustrate the cases in which in the extended CP, a first DMRS and a second DMRS are mapped over two OFDM symbols and a third DMRS to an eighth DMRS are multiplexed through the FDM/CDM hybrid method in two OFDM symbols. The first DMRS and the second DMRS can be multiplexed through the FDM method and mapped to two OFDM symbols of the fifth, sixth, ninth, eleventh, and twelfth OFDM symbols (having respective indices 4, 5, 8, 10 and 11) of a subframe. In a corresponding OFDM symbol, the DMRS can be mapped at intervals of two subcarriers or two consecutive subcarriers. The third DMRS to the eighth DMRS can be mapped to two OFDM symbols of the OFDM symbols to which a legacy CRS, the first DMRS, and the second DMRS are not mapped and in which a PDCCH is not transmitted. The position of a subcarrier mapped in each OFDM symbol can comply with one of the three patterns shown in FIG. 87-(*b*). Alternatively, the third DMRS to the eighth DRMS may be multiplexed with the first DMRS and the second DMRS through the FDM method and mapped to the OFDM symbol to which the first DMRS and the second DMRS are mapped. Assuming that the number of OFDM symbols capable of sending the third DMRS to the eighth DMRS is n, a combination $_nC_2$ is possible according to a pattern of the first DMRS and the second DMRS. To allocate the third DMRS to the eighth DMRS, one OFDM symbol preferably is assigned to one slot. To guarantee the performance of channel estimation in one subframe, the third DMRS to the eighth DMRS more preferably have a symmetrical pattern in each slot.

Figure 93:
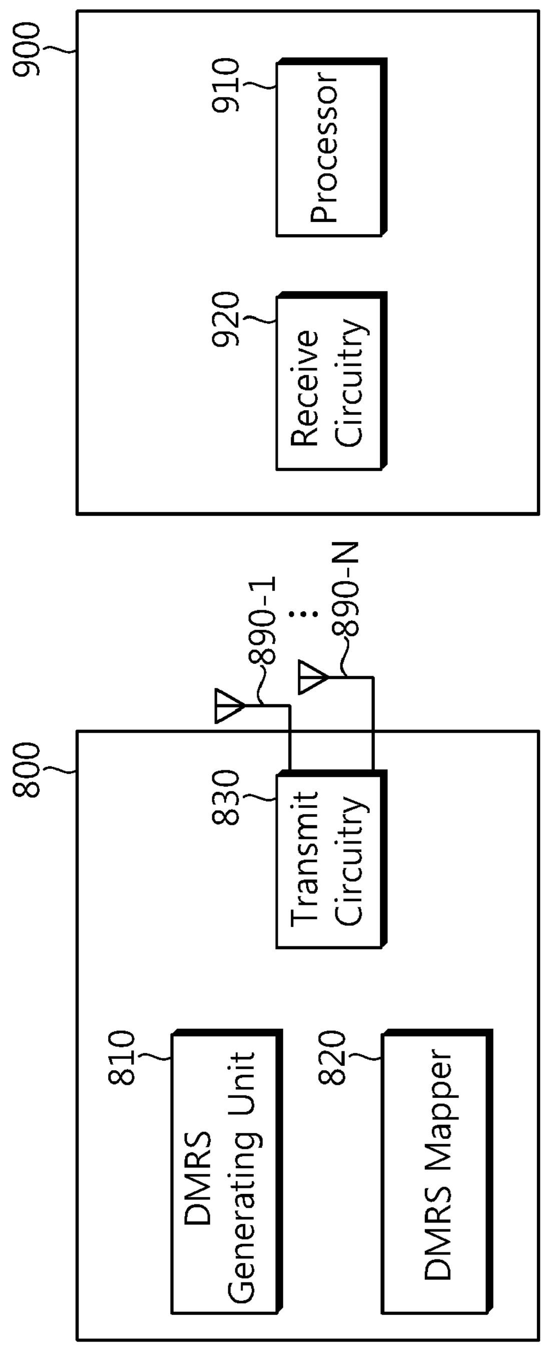
FIG. 93 is a block diagram showing a BS and a UE in which the examples of the present invention are implemented.

FIG. 93 is a block diagram showing a BS and a UE in which the examples of the present invention are implemented.

The BS 800 includes a DMRS generating unit 810, a DMRS mapper 820, and a transmit circuitry 830. The DMRS generating unit 810 generates DMRSs for respective antennas. The DMRS mapper 820 maps the DMRSs to the resource region. The transmit circuitry 830 transmits the DMRSs and a radio signal through a plurality of antennas 890-1, . . . , 890-N. The DMRSs can be multiplexed on the basis of at least one of FDM, CDM, and TDM methods in the resource region and then mapped. Further, in the resource region, the position of an OFDM symbol to which the DMRSs are mapped can be an OFDM symbol to which a PDCCH and a legacy CRS are not mapped. A variety of the DMRS patterns shown in FIGS. 12 to 92 can be generated by the BS 800.

The receiver 900 includes a processor 910 and a receive circuitry 920. The receive circuitry 920 receives a radio signal and a plurality of DMRSs. The processor 910 demodulates the radio signal on the basis of the plurality of DMRSs. The plurality of DMRSs can be multiplexed on the basis of at least one of FDM, CDM, and TDM methods in the resource region and then mapped. Further, in the resource region, the position of an OFDM symbol to which the plurality of DMRSs is mapped can be an OFDM symbol to which a PDCCH and a legacy CRS are not mapped.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting a reference signal in a wireless communication system, the method comprising:

generating demodulation reference signals (DMRSs) for each antenna of a plurality of antennas;

mapping the DMRSs to a resource region; and transmitting each of the mapped DMRSs through a corresponding antenna of the plurality of antennas, wherein the DMRSs are multiplexed using at least frequency division multiplexing (FDM), code division multiplexing (CDM), or time division multiplexing (TDM) methods and mapped to the resource region, wherein a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped, wherein at least a portion of the DMRSs is multiplexed using the CDM method and mapped to two neighbor subcarriers within an OFDM symbol, and wherein the neighbor subcarriers are multiplexed using the CDM method based on an orthogonal sequence having a length of 2.

2. The method of claim 1, wherein a number of the plurality of antennas is 2 or 8.

3. The method of claim 1, wherein the at least a portion of the DMRSs is mapped to a neighbor OFDM symbol within a same subcarrier.

4. The method of claim 3, wherein:

a number of the neighbor OFDM symbols is 2.

5. The method of claim 1, wherein the at least a portion of the DMRSs is further mapped to a resource element to which a legacy dedicated reference signal (DRS) is mapped in the resource region.

6. The method of claim 1, wherein each of the DMRSs is mapped at intervals of regular subcarriers within a corresponding OFDM symbol to which the DMRSs are mapped.

7. A Base Station (BS) in a wireless communication system, the BS comprising:

a demodulation reference signal (DMRS) generating unit for generating DMRSs for each antenna of a plurality of antennas;

a DMRS mapper for mapping the DMRSs to a resource region; and an RF unit for transmitting each of the mapped DMRSs and a radio signal through a corresponding antenna of the plurality of antennas, wherein the DMRSs are multiplexed using at least frequency division multiplexing (FDM), code division multiplexing (CDM), or time division multiplexing (TDM) methods and mapped in the resource region, wherein a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped, wherein at least a portion of the DMRSs is multiplexed using the CDM method and are mapped to two neighbor subcarriers within an OFDM symbol, and wherein the neighbor subcarriers are multiplexed using the CDM method based on an orthogonal sequence having a length of 2.

8. The BS of claim 7, wherein a number of the plurality of antennas is 2 or 8.

9. The BS of claim 7, wherein the at least a portion of the DMRSs is mapped to a neighbor OFDM symbol within a same subcarrier.

10. A User Equipment (UE) in a wireless communication system, the UE comprising:

a receive circuitry for receiving a radio signal and a plurality of demodulation reference signals (DMRSs); and a processor for demodulating the radio signal based on the plurality of DMRSs, wherein the plurality of DMRSs is multiplexed using at least frequency division multiplexing (FDM), code division multiplexing (CDM), or time division multiplexing (TDM) methods and mapped to the resource region, wherein a position of an orthogonal frequency division multiplexing (OFDM) symbol to which the DMRSs are mapped in the resource region is an OFDM symbol to which a physical downlink control channel (PDCCH) and a legacy cell-specific reference signal (CRS) are not mapped, wherein at least a portion of the DMRSs is multiplexed using the CDM method and mapped to two neighbor subcarriers within an OFDM symbol, and wherein the neighbor subcarriers are multiplexed using the CDM method based on an orthogonal sequence having a length of 2.

11. The UE of claim 10, wherein the at least a portion of the DMRSs is mapped to a neighbor OFDM symbol within a same subcarrier.

12. The UE of claim 10, wherein to at least a portion of the DMRSs is multiplexed using the CDM method and mapped to the two neighbor subcarriers within a same OFDM symbol.

* * * * *